(12) United States Patent
Gledhill et al.

(10) Patent No.: US 7,049,511 B2
(45) Date of Patent: May 23, 2006

(54) CONNECTION BOX STABILIZER

(75) Inventors: Dale C. Gledhill, Sandy, UT (US);
Brent L. Kidman, Spanish Fork, UT (US)

(73) Assignee: Quixemble, Inc., Salt Lake City, UT (US)

( * ) Notice: Subject to any disclaimer, the term of this patent is extended or adjusted under 35 U.S.C. 154(b) by 0 days.

(21) Appl. No.: 10/811,764

(22) Filed: Mar. 29, 2004

(65) Prior Publication Data

US 2004/0242061 A1    Dec. 2, 2004

Related U.S. Application Data

(63) Continuation of application No. 10/342,701, filed on Jan. 15, 2003, now Pat. No. 6,840,800.

(51) Int. Cl.
*H01H 9/02* (2006.01)

(52) U.S. Cl. .......................................... 174/58; 220/3.9

(58) Field of Classification Search ................ 439/538, 439/539, 57, 58, 571, 572, 569, 527; 220/3.9; 174/58

See application file for complete search history.

(56) References Cited

U.S. PATENT DOCUMENTS

| | | | |
|---|---|---|---|
| 867,624 A | 10/1907 | Warthen | |
| 1,113,762 A | 10/1914 | Eckman | |
| 1,933,358 A | 10/1933 | Almcrantz | |
| 1,964,535 A | 6/1934 | Schreiber | |
| 2,043,865 A | 6/1936 | Place | |
| 2,149,719 A | 3/1939 | Arnest | |
| 2,512,188 A | 6/1950 | Wait et al. | |
| 2,740,873 A | 3/1956 | Cronk | |
| 2,980,756 A | 4/1961 | Kelleher | |
| 3,155,808 A | 11/1964 | Wiley | |
| 3,168,612 A | 2/1965 | Sorenson | |
| 3,488,428 A | 1/1970 | Smith | |
| 3,662,085 A | 5/1972 | Robinson et al. | |
| 3,767,151 A | 10/1973 | Seal et al. | |
| 3,770,872 A | 11/1973 | Brown | |
| 3,814,834 A | 6/1974 | Glader | |
| 3,848,764 A | 11/1974 | Salg | |
| 3,859,454 A | 1/1975 | Mann | |
| 3,905,570 A | 9/1975 | Nieuweld | |
| 3,908,235 A | 9/1975 | Teillard et al. | |
| 3,928,716 A | 12/1975 | Marrero | |
| 3,953,933 A | 5/1976 | Goldstein | |
| 3,955,463 A | 5/1976 | Hoehn | |
| 4,057,164 A | 11/1977 | Maier | |
| 4,062,470 A * | 12/1977 | Boteler | 220/3.3 |
| 4,105,862 A | 8/1978 | Hoehn | |
| 4,263,472 A | 4/1981 | Maheu | |
| 4,281,773 A | 8/1981 | Mengeu | |

(Continued)

FOREIGN PATENT DOCUMENTS

CA    1277409    12/1990

*Primary Examiner*—Phuong Dinh
(74) *Attorney, Agent, or Firm*—Pate Pierce & Baird

(57) ABSTRACT

A connection box assembly comprising a connection box having a proximal end shaped to receive a fastener and a distal end, spaced in the lateral direction from the proximal end, having a stop and a slide. The assembly may include a spacer shaped to be inserted, without the use of tools, within the slide until the spacer abuts the stop. The spacer may be adjustable in length. The spacer may be arranged to extend from the proximal end of the connection box in the transverse direction when inserted into the slide and abutted against the stop.

36 Claims, 38 Drawing Sheets

U.S. PATENT DOCUMENTS

| | | | |
|---|---|---|---|
| 4,295,003 | A | 10/1981 | Borja et al. |
| 4,306,109 | A | 12/1981 | Nattel |
| 4,311,422 | A | 1/1982 | Jackovitz |
| 4,315,100 | A | 2/1982 | Haslbeck et al. |
| 4,399,922 | A | 8/1983 | Horsley |
| 4,580,689 | A | 4/1986 | Slater |
| 4,645,089 | A | 2/1987 | Horsley |
| 4,669,797 | A | 6/1987 | Bourdon |
| 4,688,693 | A | 8/1987 | Medlin, Jr. |
| 4,732,356 | A | 3/1988 | Medlin, Sr. |
| 4,793,059 | A | 12/1988 | Moreau et al. |
| 4,832,297 | A | 5/1989 | Carpenter |
| 4,837,406 | A | 6/1989 | Emmons |
| 4,843,189 | A | 6/1989 | Jorgensen et al. |
| 4,844,275 | A | 7/1989 | Schnell et al. |
| 4,898,357 | A | 2/1990 | Jorgensen et al. |
| 4,903,851 | A | 2/1990 | Slough |
| 4,909,692 | A | 3/1990 | Hendren |
| 4,936,396 | A | 6/1990 | Lockwood |
| 4,948,317 | A | 8/1990 | Marinaro |
| 4,954,667 | A | 9/1990 | Jorgensen et al. |
| 4,960,964 | A | 10/1990 | Schnell et al. |
| 4,964,525 | A | 10/1990 | Coffey et al. |
| 4,974,888 | A | 12/1990 | Childers |
| 4,978,092 | A * | 12/1990 | Nattel ................. 248/205.1 |
| 5,031,785 | A | 7/1991 | Lemme |
| 5,084,596 | A | 1/1992 | Borsh et al. |
| 5,153,816 | A | 10/1992 | Griffin |
| 5,170,013 | A | 12/1992 | Borsh et al. |
| 5,170,014 | A | 12/1992 | Borsh |
| 5,176,345 | A | 1/1993 | Medlin |
| 5,180,886 | A | 1/1993 | Dierenbach et al. |
| 5,189,259 | A | 2/1993 | Carson et al. |
| 5,223,673 | A | 6/1993 | Mason |
| 5,224,673 | A | 7/1993 | Webb |
| 5,289,934 | A * | 3/1994 | Smith et al. ................. 220/3.7 |
| RE34,786 | E | 11/1994 | Slough |
| 5,407,088 | A | 4/1995 | Jorgensen et al. |
| 5,477,010 | A | 12/1995 | Buckshaw et al. |
| 5,538,437 | A | 7/1996 | Bates, III et al. |
| 5,590,858 | A | 1/1997 | Bourassa et al. |
| 5,595,362 | A | 1/1997 | Rinderer et al. |
| 5,675,125 | A | 10/1997 | Hollinger |
| 5,696,350 | A | 12/1997 | Anker |
| 5,723,817 | A | 3/1998 | Arenas et al. |
| 5,744,750 | A | 4/1998 | Almond |
| 5,833,110 | A * | 11/1998 | Chandler et al. ............ 220/3.9 |
| 5,842,822 | A | 12/1998 | Everett et al. |
| 5,900,584 | A | 5/1999 | Cady et al. |
| 5,965,845 | A | 10/1999 | Reiker |
| 6,005,308 | A | 12/1999 | Bryde et al. |
| 6,066,805 | A | 5/2000 | Bordwell et al. |
| 6,107,568 | A | 8/2000 | Schnell et al. |
| 6,147,304 | A * | 11/2000 | Doherty ....................... 174/48 |
| 6,207,898 | B1 | 3/2001 | Reiker |
| 6,218,617 | B1 | 4/2001 | Estanislao et al. |
| 6,257,925 | B1 | 7/2001 | Jones |
| 6,368,141 | B1 | 4/2002 | VanAntwerp et al. |
| 6,384,334 | B1 | 5/2002 | Webb |
| 6,410,850 | B1 | 6/2002 | Abel et al. |
| 6,522,269 | B1 | 2/2003 | Blanc et al. |

\* cited by examiner

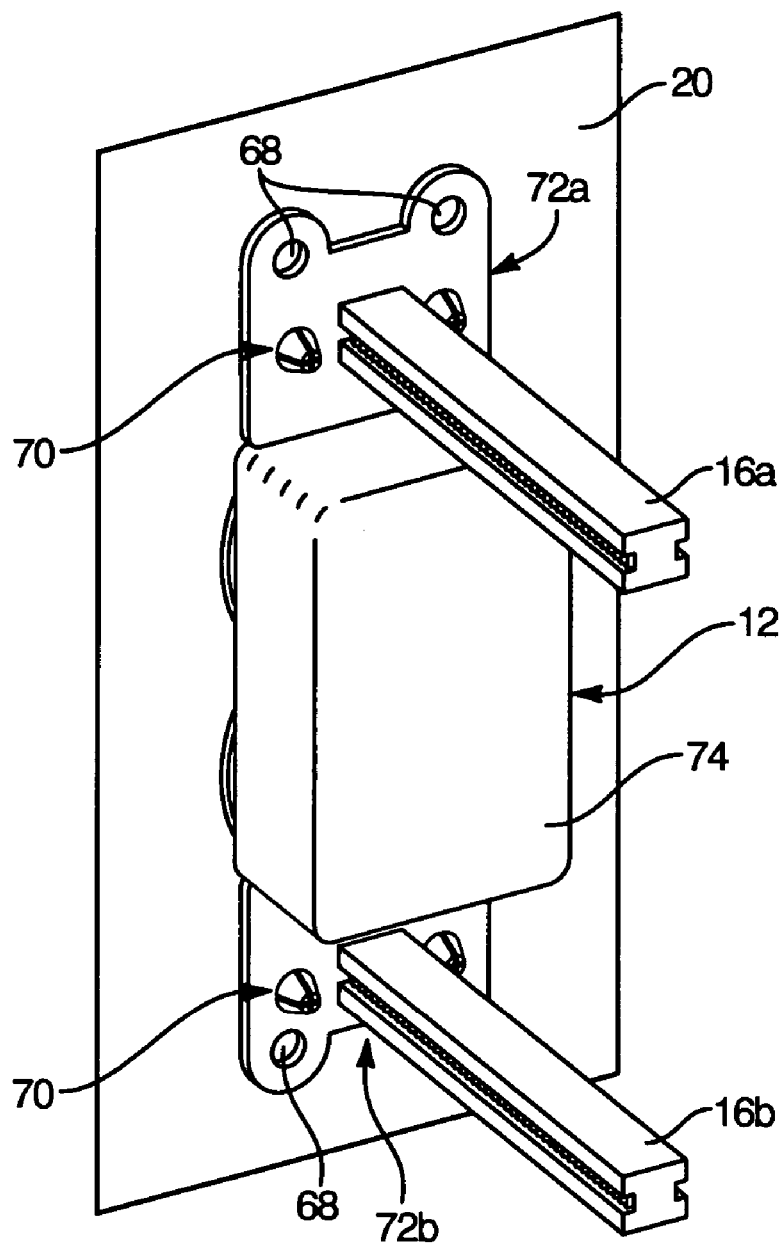
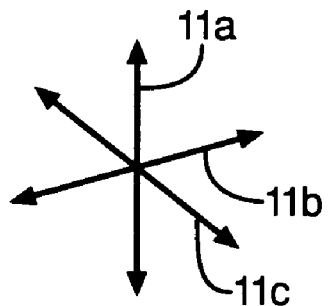
FIG. 13

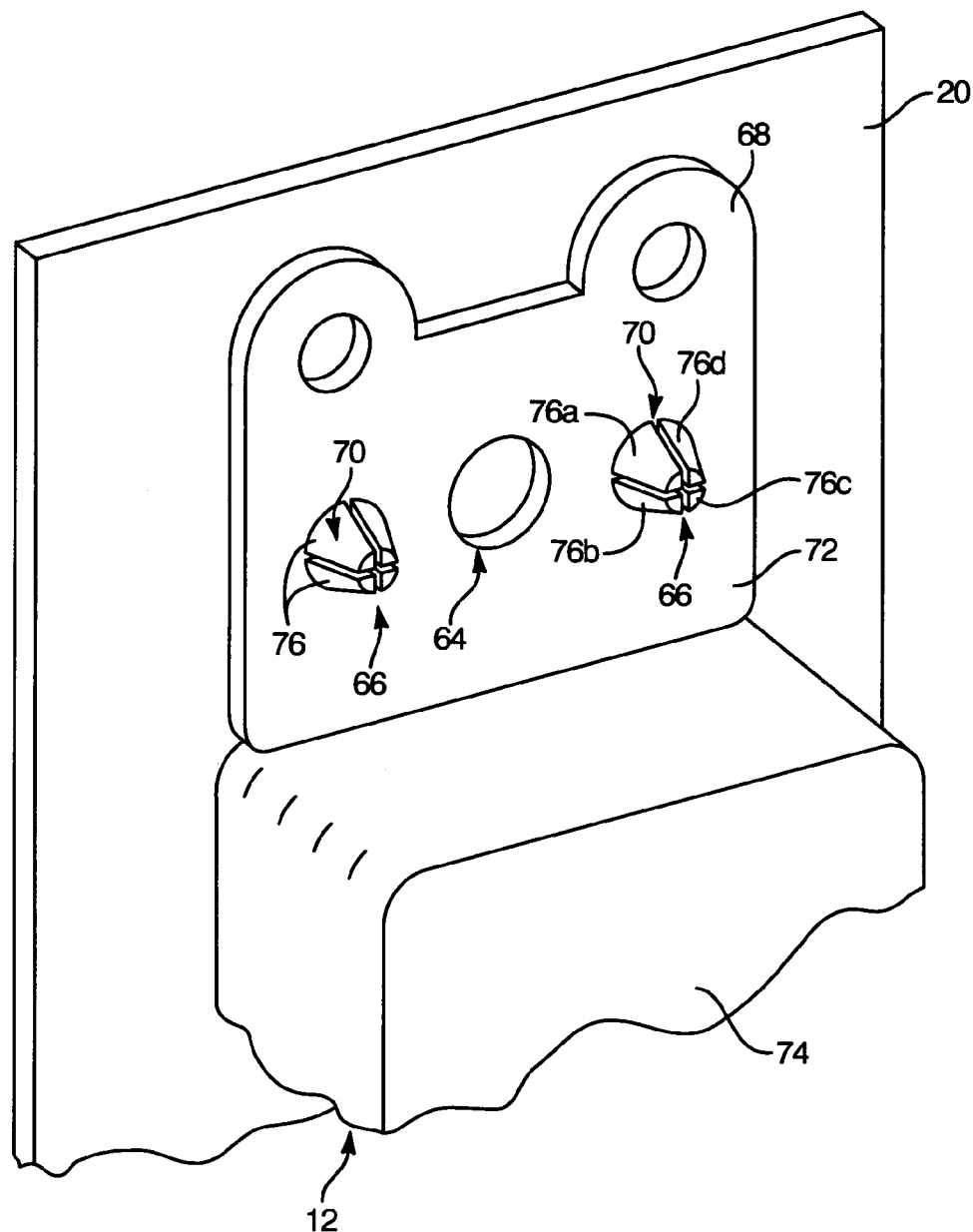
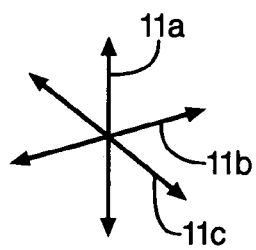
FIG. 14

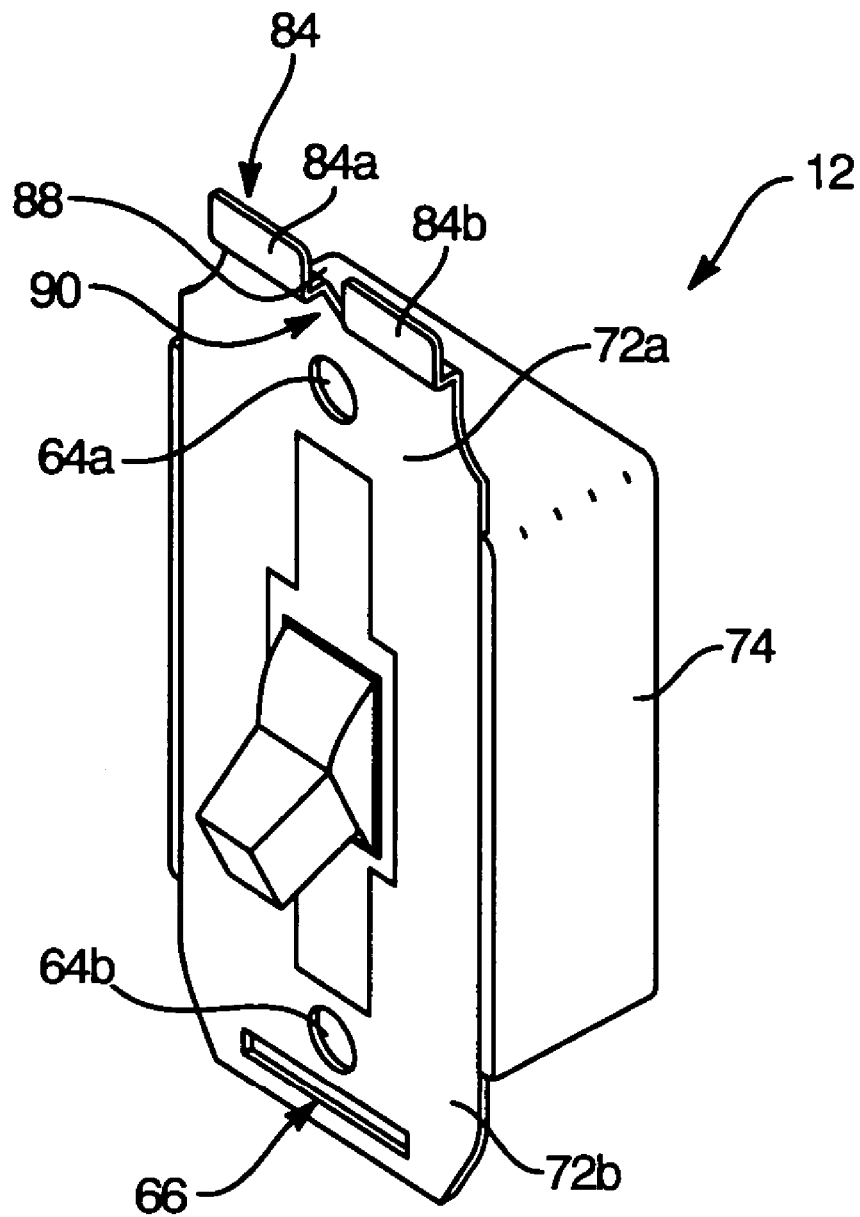
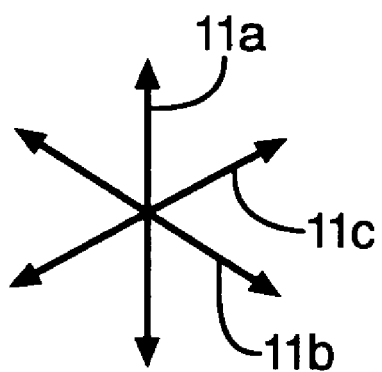
FIG. 18

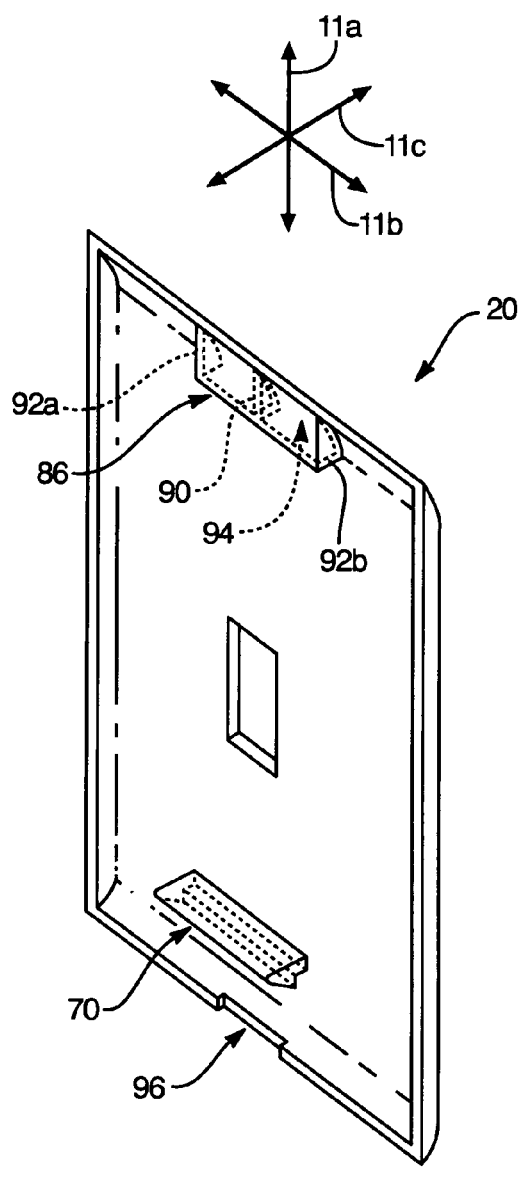
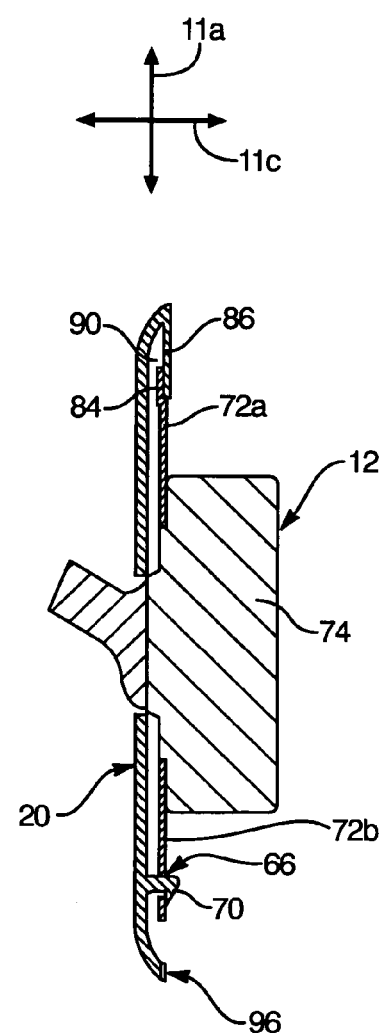
FIG. 19      FIG. 20

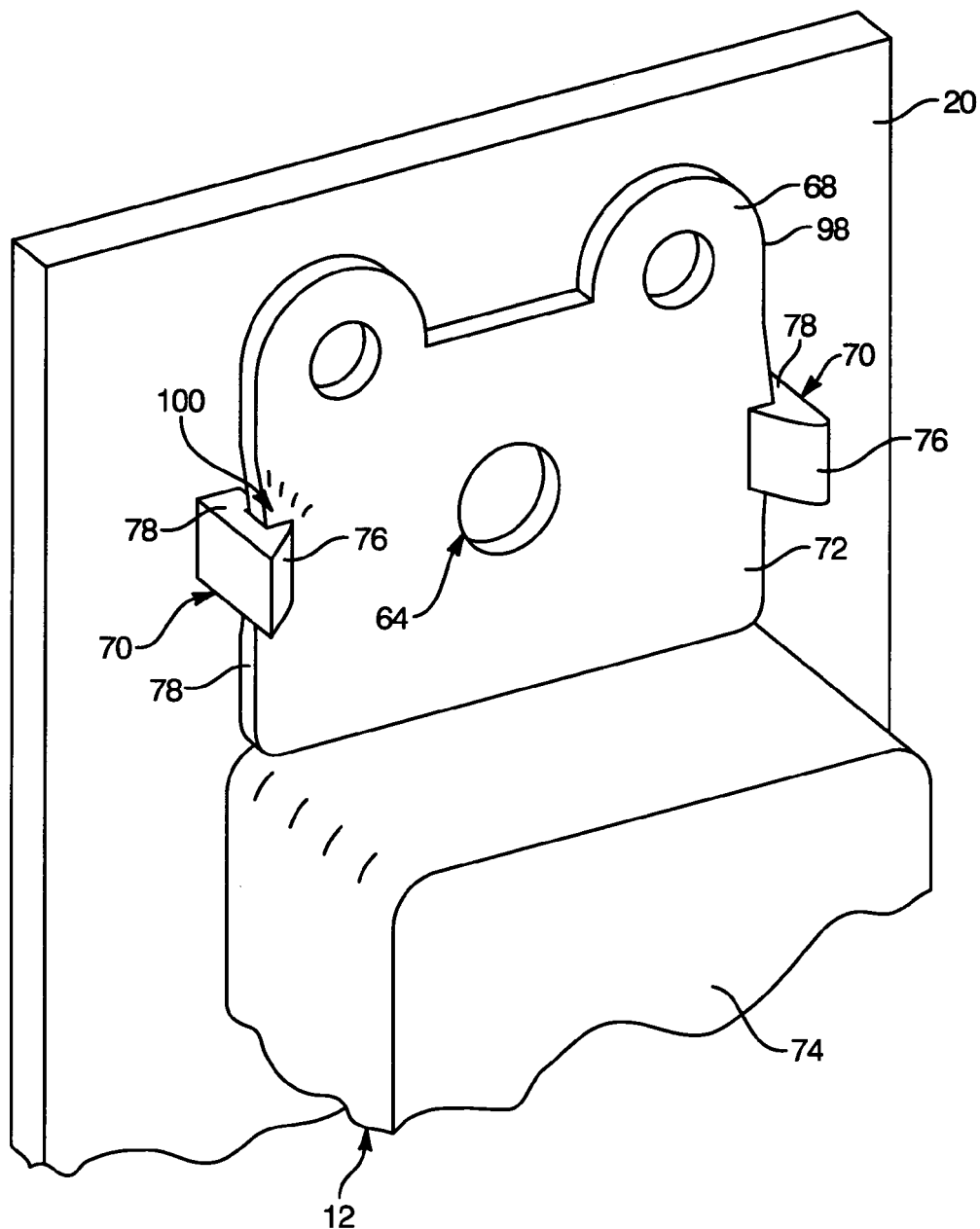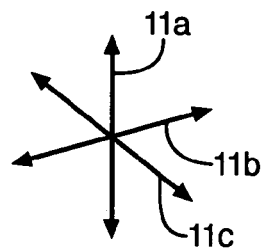
FIG. 21

SECTION A-A

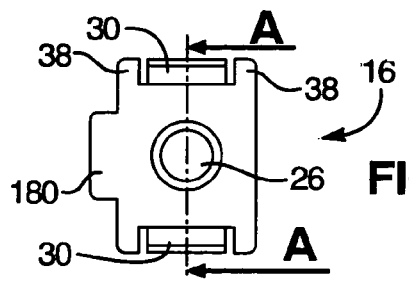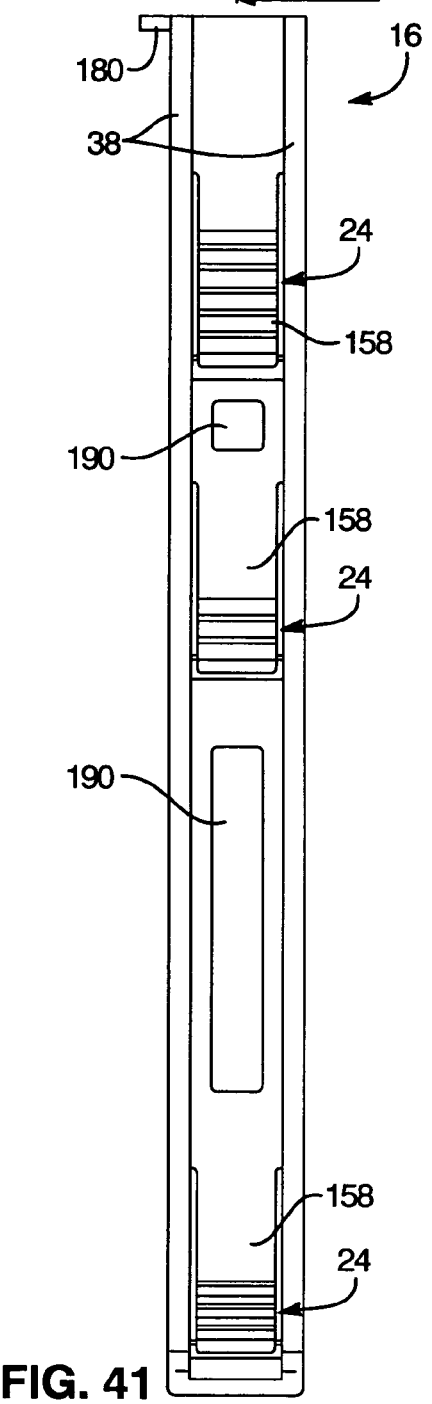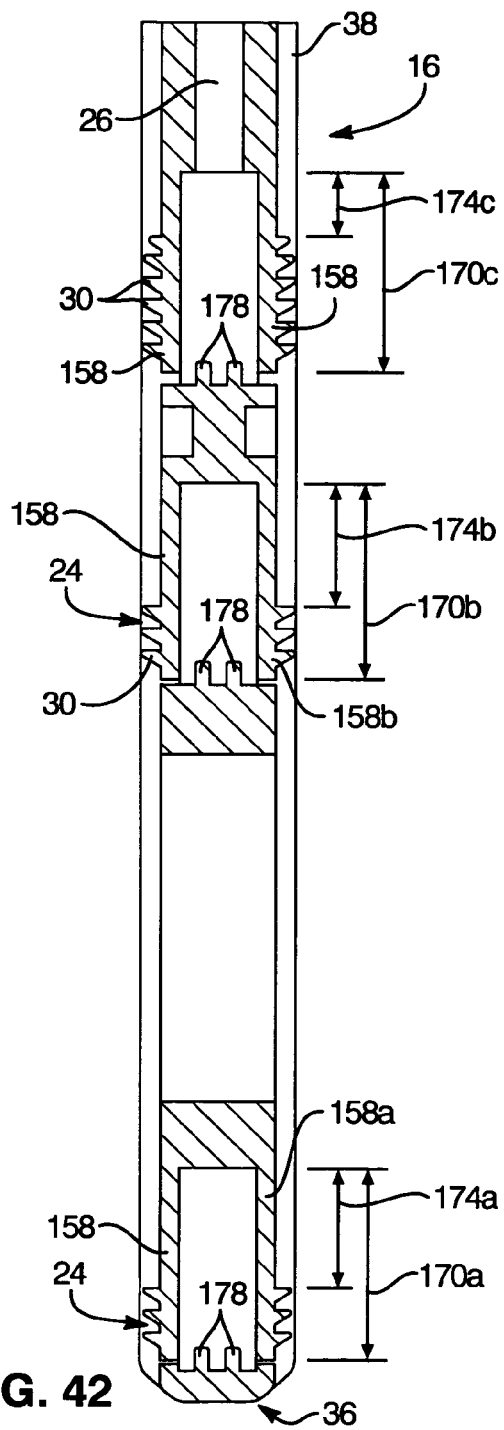
FIG. 40
SECTION A-A
FIG. 41
FIG. 42

CONNECTION BOX STABILIZER

RELATED APPLICATIONS

This application is a continuation of U.S. patent application Ser. No. 10/342,701 filed Jan. 15, 2003 now U.S. Pat. No. 6,849,800, entitled DEFLECTING SECUREMENT ANCHOR FOR ELECTRICAL FIXTURES.

BACKGROUND

1. The Field of the Invention

This invention relates to fixture anchoring and, more particularly, to novel systems and methods for facilitating connection box assembly.

2. The Background Art

Manually installing screws or other fasteners is often time consuming. Additionally, in certain installations, the installer must employ his or her hands to hold several components as well as rotate a tool transferring rotation to a screw or other type of fastener. Maintaining all of the components in proper alignment is often difficult and requires skill. In any case, the complexity slows the installation process.

Power tools may simplify the installation process by providing the motion (e.g. rotation) necessary to advance or install a fastener. The power tool must, however, be held and positioned in a manner similar to a manual tool. Thus, the use of power tools may not significantly lessen the demands on the installer.

An electrical connection box assembly is one example of a time consuming fastener installation. Once an electrical fixture has been wired, the fixture is typically secured inside a connection box. Securement of the electrical fixture to the connection box often involves the installation of multiple screws. These screws are generally over an inch long and are relatively finely threaded. The length of the screws may be selected to accommodate various connection box placements and wall paneling thicknesses. To complete a conventional electrical connection box assembly, a face plate is secured to the fixture by another screw. Similar problems may be encountered in the installation of connections boxes used for a wide variety of devices and systems, including without limitation telephone, stereo, computer network, information systems, cable television system, and security systems fixtures.

The installation of the connection box screws requires an installer concurrently to hold a fixture, maintain screw alignment, and provide rotation to the screw. Often it is difficult to initiate engagement between the screw and the receiving hole. Such difficulty typically arises because the receiving hole may be obscured by the wall paneling or recessed into the wall. Once the screw is in engagement with the receiving hole, the time consuming and often laborious task of advancing the finely threaded screw remains.

Face plate screws and other securement devices may be unsightly as well as time consuming and laborious to install. Screws used to secure face plates to connection boxes and fixtures are typically painted and are, therefore, exposed to chipping, tarnishing, wear, and oxidation. In certain applications, it may be desirable to use a snap-on face plate to provide fast securement without the use of screws to provide securement.

Fixture installation may consume a large portion of an electrician's time budget for any given project. If the amount of time needed to install electrical fixtures were reduced, both the installer and the financier (e.g. home owner, developer, or the like) may realize large economic rewards.

Attempts have been made to provide quick assembling connection boxes and fixture assemblies. Quick assembling devices typically involve at least some rotation of the fixture screws and, therefore, require the use of tools for installation. Often these devices are limited in how well they are able to engage the threads of the fixture screws. Thus, such devices may not provide a reliable and solid securement between the fixture and connection box.

Typical screwless face plates require additional components to enable securement to the electrical fixture. These additional components increase manufacturing cost as well as installation time.

What is needed is an anchor that provides a strong and reliable securement between a fixture and associated connection box. Such an anchor would also provide for quick and simple installation thereof. Additionally, a screwless face plate that requires no additional components to accomplish a reliable securement would be an advancement in the art. Such a connection box assembly would greatly reduce the time, skill level, and effort required to assemble and complete connection box installation (e.g. electrical fixture installation or the like).

BRIEF SUMMARY AND OBJECTS OF THE INVENTION

In view of the foregoing, it is a primary object of the present invention to provide an apparatus and method requiring minimal time, effort, and skill to install.

It is a further object of the invention to provide a connection box apparatus and method that may be installed without screw rotation.

Consistent with the foregoing objects, and in accordance with the invention as embodied and broadly described herein, a method and apparatus are disclosed. An embodiment in accordance with the present invention may provide an apparatus for securing a fixture to a connection box. In a factory manufacturing process an anchor may be secured to a fixture. In one embodiment, the anchor is secured to the fixture by a releasable fastener. The anchor may have an engagement mechanism formed therewith.

A connection box may be provided to house lines or wires originiating from a signal source to terminate therein. The lines may provide a connection for the fixture. A receiver may be associated with the connection box. The receiver may have an engagement mechanism formed to receive and retain the engagement mechanism of the anchor. Thus, the anchor and receiver may be intermediaries in the securement of the fixture to the connection box.

In certain applications, screws and other securement devices may be unsightly. In these applications it may be desirable to provide a snap-on face plate to provide fast securement without the use of screws. Face plates are often secured to fixtures to cover and hide the wiring and access holes therebehind. Face plates in accordance with the present invention may have engagement prongs. These prongs may be inserted through apertures in a corresponding fixture to maintain the face plate aligned securely thereagainst.

In selected embodiments in accordance with the present invention, an installer may first connect a fixture to the lines or wires housed in a connection box. A face plate may be installed by simply pressing the engagement prongs through the appropriate apertures in the fixture. Once a fixture has been connected to the lines and a face plate applied, the fixture may be secured to the connection box by inserting one or more of the attached anchors into corresponding receivers associated with the connection box. The anchors may be inserted a selected distance into the receivers until the face plate is properly positioned. Insertion of an anchor into a receiver may be accomplished without the aid of tools.

The method of engagement between the engagement mechanism of the receiver and that of the anchor may be selected to provide a fast, clean securement. In selected embodiments, the engagement mechanism of the receiver may be a barb configured to engage a series of teeth provided as part of the engagement mechanism of the anchor. In other embodiments, the engagement mechanism of the anchor may be a barb configured to engage a series of teeth provided as part of the engagement mechanism of the receiver. The engagement between the anchor and receiver may provide a single or multiple locking positions and may have single or multiple teeth engaging single or multiple teeth.

By applying embodiments in accordance with the present invention, a fixture may be secured to a connection box in a comparatively short amount of time. Embodiments in accordance with the present invention may be particularly advantageous when it is desirable to preserve the ability to remove the fixture from the connection box. For example, an electrician or computer network technician may need to remove a fixture to gain access to the lines or wiring tucked therebehind. In such a situation, the face plate may be "popped" off and the fasteners holding the fixture to the anchors may be released, thus freeing the fixture. Each anchor may maintain engagement with its corresponding receiver. After the revisions are complete, the fixture may once again be secured to the anchors by the installation of the fastener previously released.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 13 is a perspective view of a complete assembly prepared for installation in accordance with the present invention;

FIG. 14 is a partial perspective view of a face plate and fixture assembly in accordance with the present invention;

FIG. 18 is a perspective view of a fixture with a flange modified in accordance with the present invention to engage the screwless face plate;

FIG. 19 is a perspective view of an embodiment of a screwless face plate in accordance with the present invention for securement to the fixture of FIG. 18;

FIG. 20 is a side cross-sectional view of an engagement between the fixture of FIG. 18 and the screwless face plate of FIG. 19;

FIG. 21 is a partial perspective view of alternative engagement between a screwless face plate and an fixture in accordance with the present invention;

FIG. 40 is an end elevation view of the anchor in FIG. 39;

FIG. 41 is a side elevation view of the anchor in FIG. 39;

FIG. 42 is a cross-sectional view of the anchor in FIG. 39;

DETAILED DESCRIPTION OF THE PREFERRED EMBODIMENTS

It will be readily understood that the connection box assemblies of the present invention, as generally described and illustrated in the Figures herein, could be arranged and designed in a wide variety of different configurations. Thus, the description herein is not intended to limit the scope of the invention, but is merely representative of certain presently preferred embodiments of devices and systems in accordance with the invention. Those of ordinary skill in the art will, of course, appreciate that various modifications to the details herein may easily be made without departing from the essential characteristics of the invention, as described. Thus, the following information is intended only by way of example, and simply illustrates certain presently preferred embodiments consistent with the invention.

Figure 1:
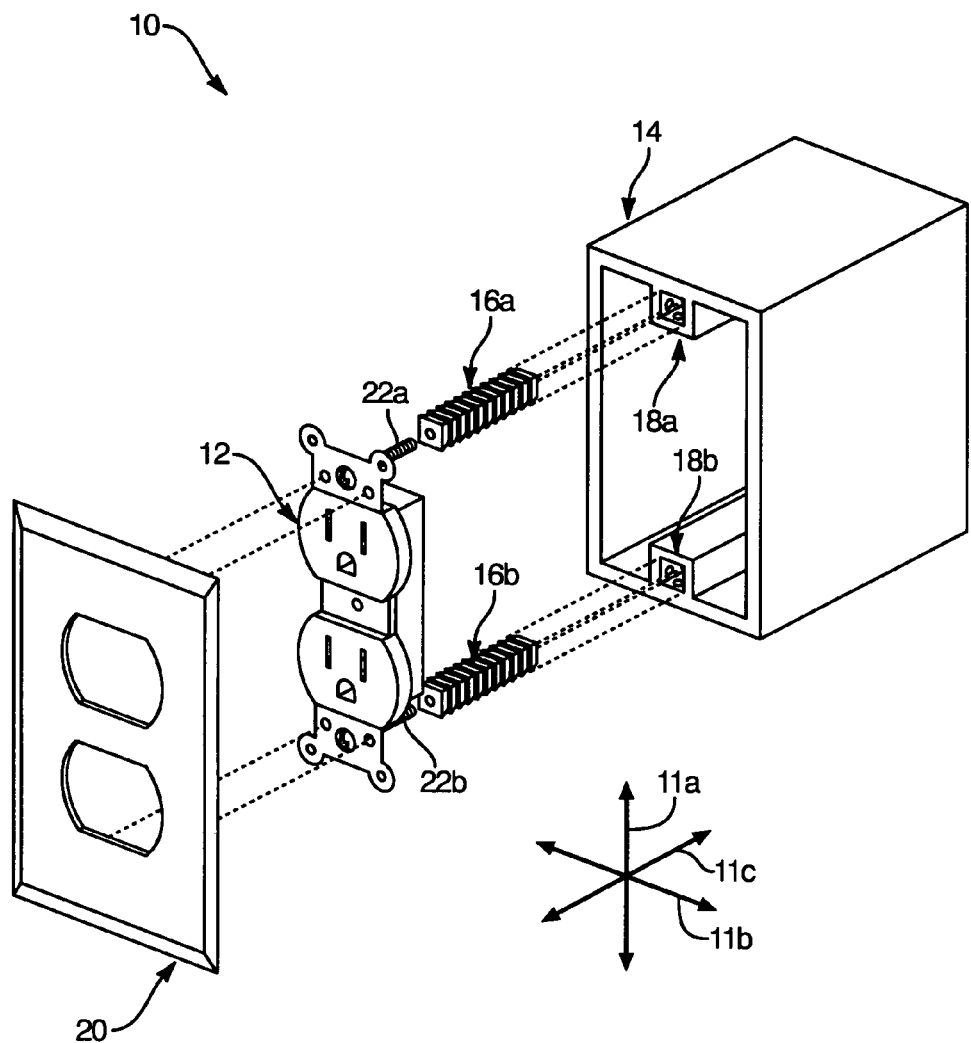
FIG. 1 is an exploded perspective view of a connection box assembly in accordance with the present invention.

Referring to FIG. 1, in discussing the Figures, it may be advantageous to establish a reliable coordinate system to aid in the description of several of the embodiments in accordance with the present invention. Coordinate axes 11 may be defined by longitudinal 11a, lateral 11b, and transverse directions 11c substantially orthogonal to one another.

A connection box assembly 10 in accordance with the present invention may provide an apparatus for securing a fixture 12 to a connection box 14. In a factory manufacturing process, an anchor 16 may be secured to the fixture 12. The connection box 14 to which the fixture 12 is to be secured may have a receiver 18 associated therewith for admitting and retaining the anchor 16. Thus, the anchor 16 and receiver 18 may be intermediaries in the securement of the fixture 12 to the connection box 14. A face plate 20 may be provided to cover and hide the wiring and access holes therebehind.

A fixture 12 may be any suitable piece for which securement is desired. For example, a fixture 12 may be a power receptacle, power switch, light fixture, telephone jack, network jack, cable connector, stereo system connector, information system connector, or any other unit 12 for which permanent or removable securement to a connection box 14 may be desired. In a similar manner, the connection box 14 may be any box to which a fixture 12 may be secured. A connection box 14 may be constructed of any suitable material. Suitable materials may include without limitation metals, polymers, composites, and the like. Additionally, a connection box 14, in accordance with the present invention, may be of any suitable size. For example, a connection box 14 may be a single gang, double gang, triple gang, quadruple gang, quintuple gang, or the like. The concepts presented herein are illustrated as a single gang box, however, the principles and concepts may easily be expanded to multiple-gang connection boxes.

Embodiments in accordance with the present invention may be particularly well suited to assemblies that may be assembled in the field (i.e. not in a factory). Such field assemblies need not be limited to connection box assemblies 10. Embodiments in accordance with the present invention may provide convenience and ease of assembly in the field where less than perfect conditions are often encountered.

An anchor 16 in accordance with the present invention may be constructed, formed, machined, extruded, molded, cast, or otherwise made from any suitable material. Suitable materials may include without limitation metals, polymers, composites, or the like. For example, in certain embodiments, an anchor 16 may be formed of a polymer in a molding process.

An anchor 16 may be secured to a fixture 12 in any suitable manner. In certain embodiments, an anchor 16 may be secured to a fixture 12 by a fastener 22 such as a bolt, rivet, screw, engagement prong, engagement hook, or the like. In other embodiments, an anchor 16 may be glued or otherwise bonded to a fixture 12. Additionally, an anchor 16 may be formed as an integral part of the fixture 12.

Each form of attachment between the anchor 16 and the fixture 12 may have particular advantages. In certain applications, such as the installation of power receptacles 12, switches 12, computer network outlets 12, cable television outlets 12, and the like an installer may need to remove a fixture 12 to gain access to something (e.g. wiring) tucked therebehind. In such a situation, screws 22 may provide an ideal attachment between the anchor 16 and the fixture 12. The screws 22 may be removed, thus freeing the fixture 12. The anchors 16 may maintain engagement with the connection box 14. After the revisions are complete the fixture 12 may once again be secured to the anchors 16 by the insertion of the screws 22 previously removed.

In selected applications, multiple points of securement between a fixture 12 and a connection box 14 may exist. In such situations, an anchor 16 in accordance with the present invention may be applied to all or a subset of the securement locations. For example, power receptacles 12 and switches 12 are typically secured to connection boxes 14 by two screws spaced from each other in a longitudinal direction 11a. An anchor 16a, 16b may be applied to fasteners 22a, 22b respectively. Similarly, a connection box 14 may have multiple receivers 18a, 18b to engage both anchors 16a, 16b, respectively.

The method of engagement between a receiver 18 and an anchor 14 may be selected to provide a fast, clean securement. By so doing, the fixture 12 may be secured to the connection box 14 in a minimum amount of time. For example, installers (e.g. electricians, network technicians, cable television installers, and the like) spend a large portion of their installation time screwing fixtures 12 to connection boxes 14. In certain embodiments in accordance with the present invention, a fastener 22 (e.g. screw 22) may be introduced to secure an anchor 16 to the appropriate locations on a fixture 12 by a manufacturing machine. Thus, the installation of the fastener 22 may be performed in ideal conditions with proper alignment and fast tool speeds. In the field, when an installer installs the fixture 12, the time consuming screw installation no longer needs to be performed. An anchor 16 may simply be inserted into a receiver 18.

The embodiments of the fixture 12, connection box 14, anchors 16a, 16b, receivers 18a, 18b, and face plate 20, as illustrated in FIG. 1 may be arranged and designed in a wide variety of different configurations that fall within the scope of the present invention. Thus, the description hereinabove is not intended to limit the scope of the possible embodiments, but is merely representative of certain presently preferred embodiments of devices and systems in accordance with the invention. The information is intended only by way of example.

Figure 2:
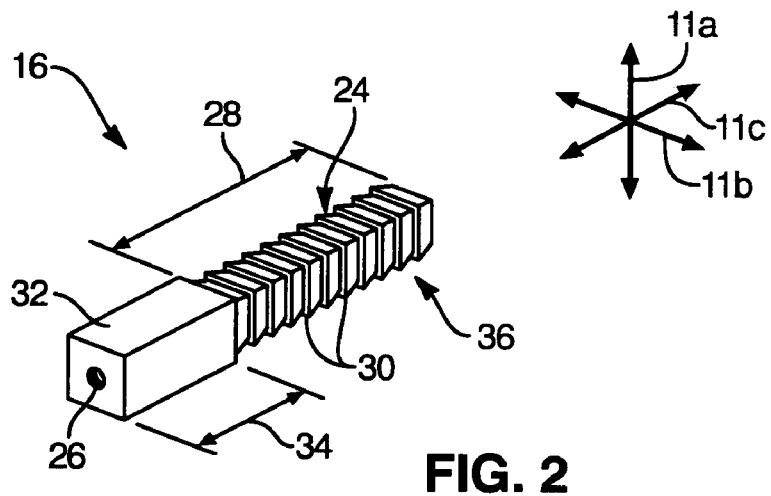
FIG. 2 is a perspective view of one embodiment of an anchor in accordance with the present invention.

Referring to FIG. 2, an anchor 16 in accordance with the present invention may have an engagement mechanism 24 configured to provide a mechanical grip with a receiver 18. If an anchor 16 is to be secured to a fixture 12 by a bolt 22 or screw 22, an aperture 26 may be formed therein. The aperture 26 may extend completely or only partially through the anchor 16 in a transverse direction 11c.

A length 28 of the engagement mechanism 24 may be selected to provide a desired number of engagement locations 30. In selected embodiments, each engagement location 30 is a tooth 30. Additionally, the engagement length 28 and the number of engagement locations 30 may be selected to permit insertion of the anchor 16 a desired distance into the receiver 18. Thus, providing a desired alignment of the fixture 12 with respect to the connection box 14.

In selected embodiments, an anchor 14 in accordance with the present invention may include a spacer 32. The length 34 of the spacer 32 may be selected to provide additional control over the spacing of the fixture 12 in relation to the connection box 14.

In certain embodiments, one end 36 of the anchor 16 may be formed to promote easy insertion into the receiver 18. For example, an end 36 may be pointed, rounded, tapered, or otherwise formed.

An anchor 16 in accordance with the present invention may have any suitable cross-section. For example, the cross-section may be rectangular, circular, triangular, oval, an unconventional shape, or the like. The cross-sectional shape of an anchor 16 may be selected to resist rotation about a transverse axis 11c once installed inside a receiver 18. For example, an anchor 16 having a generally circular cross-section may have a key-way formed therein to correspond to a key formed or located in the receiver 18.

The shape and configuration of a receiver 18 may be selected to match and complement the particular shape of a selected anchor 16. For example, if an anchor 16 having a rectangular cross section is desired, the receiver 18 may be formed to have a generally rectangular shape. Thus, the receiver 18 may admit the anchor 16 and hold the anchor 16 securely without motion (e.g rotation about a transverse axis 11c) therebetween.

Figure 3:
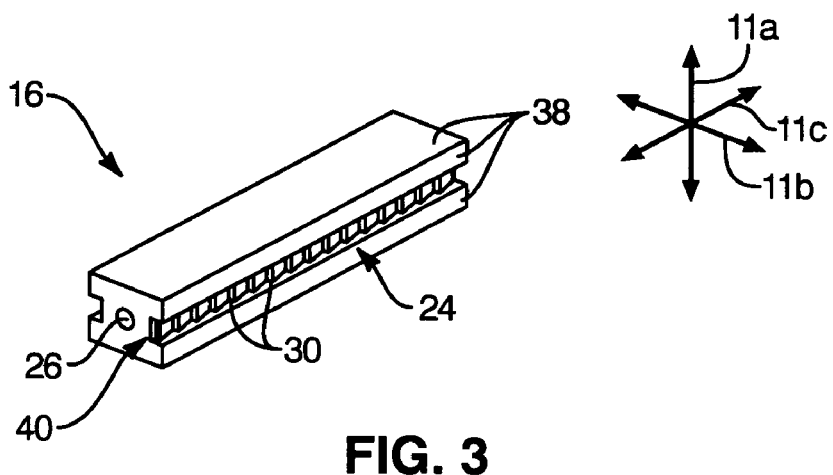
FIG. 3 is a perspective view of an alternative embodiment of an anchor in accordance with the present invention.

Referring to FIG. 3, in certain embodiments, an anchor 16 may have multiple sliding surfaces 38 to promote ease of insertion and proper alignment. A recessed groove 40 may be formed in one or more surfaces 38 of the anchor 16 to provide a location for disposition of an engagement mechanism 24. Such an engagement mechanism 24 may be recessed to reduce the risk of interfering with proper insertion of the anchor 16 into the receiver 18.

Figure 4:
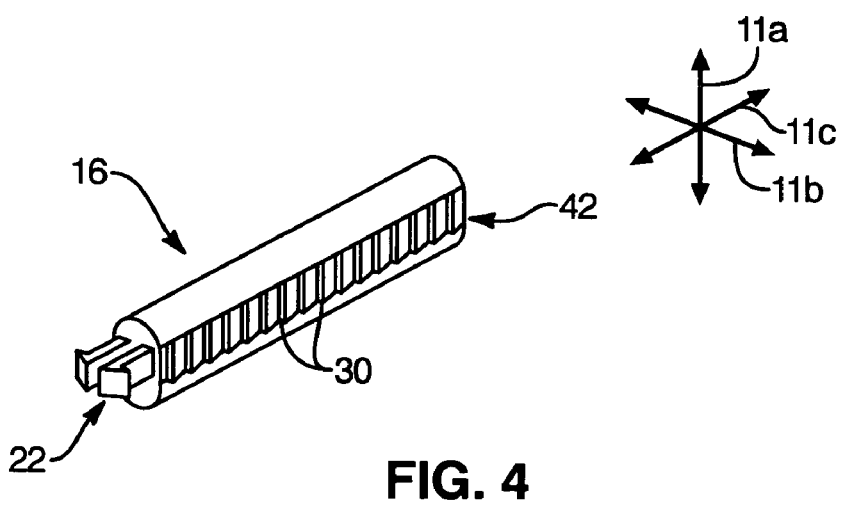
FIG. 4 is a perspective view of another alternative embodiment of an anchor in accordance with the present invention.

Referring to FIG. 4, an anchor 16 may have a generally circular cross-section. In such an embodiment, the anchor may include a single flat 42 or may include a plurality of flats 42 that provide a location for disposition of an engagement mechanism 24. The flats 42 may also provide a location for a corresponding receiver 18 to engage the anchor 16 to resist rotation about a transverse axis 11c.

FIG. 4 also illustrates an alternative embodiment of a fastener 22 in accordance with the present invention. Opposing engagement hooks 22 may be shaped to promote insertion into a corresponding aperture in a fixture 12. The engagement hooks 22 may be formed to engage an aperture of any suitable shape (e.g. circular, oval, triangular, or the like). The illustrated engagement hooks 22 have been formed in a shape to fit a square aperture. A square aperture may provide a mechanism to resist rotation of the anchor 16 about a transverse axis 11c with respect to a corresponding fixture 12. Engagement hooks 22 in accordance with the present invention may flex to allow an anchor 16 to be separated from the fixture 12 to which the anchor 16 is attached. Once separated, the anchor 16 and fixture 12 may be reattached by reinserting the engagement hooks 22 of the anchor 16 through the corresponding aperture in the fixture 12.

The embodiments of anchors 16, as illustrated in FIGS. 2–4 could be arranged and designed in a wide variety of different configurations that fall within the scope of the present invention. Thus, the description hereinabove is not intended to limit the scope of the possible embodiments, but is merely representative of certain presently preferred embodiments of devices and systems in accordance with the invention. The information is intended only by way of example and not by way of limitation.

Figure 5:
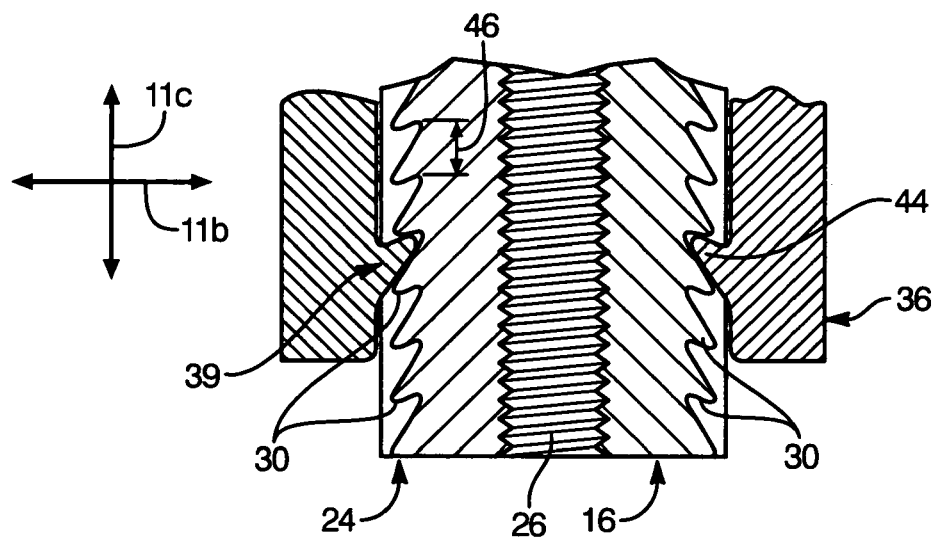
FIG. 5 is a top cross-sectional view of an engagement between an anchor and receiver in accordance with the present invention.
Figure 6:
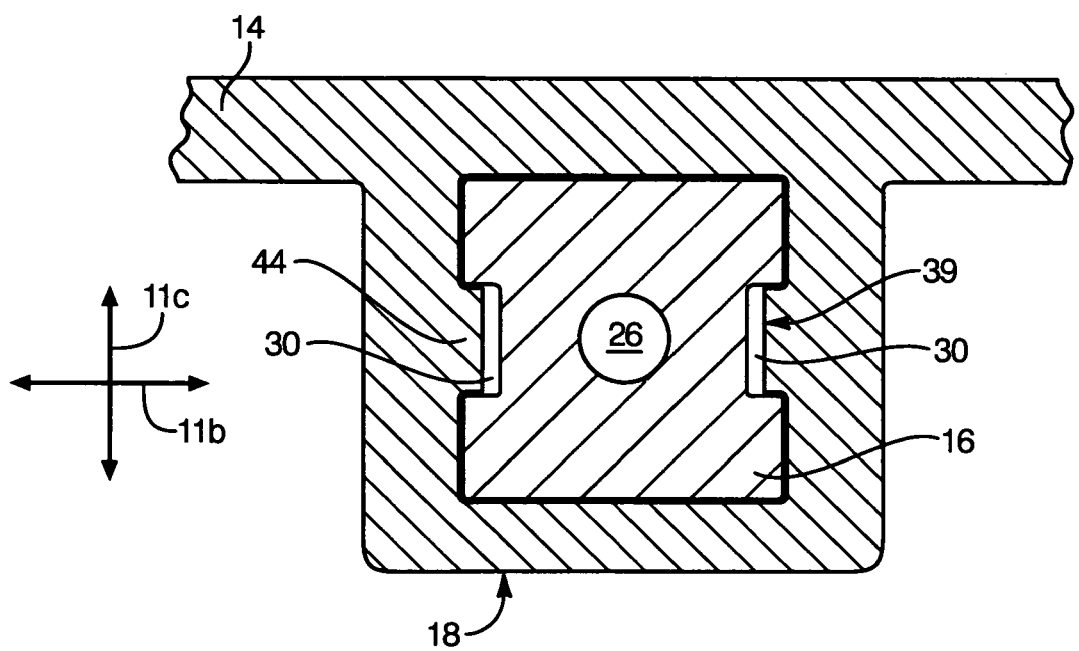
FIG. 6 is a front cross-sectional view of the engagement of FIG. 5.

Referring to FIGS. 5–6 while continuing to refer generally to FIGS. 1–4, as discussed hereinabove, an anchor 16 in accordance with the present invention may have multiple sliding surfaces 38. The sliding surfaces 38 may maintain proper alignment of the anchor 16 with respect to the receiver 18.

In selected embodiments, a receiver 18 in accordance with the present invention may include an engagement mechanism 39. This engagement mechanism 39 may be configured to engage the engagement mechanism 24 of an anchor 16. In selected embodiments, an engagement mechanism 39 may comprise hooks 44 or barbs 44. These barbs 44 may extend from the receiver 18 with a shape selected to engage the teeth 30 of the anchor 16. The engagement of the hooks 44 and teeth 30 may be selected to provide unidirectional motion so that an anchor 16 may be easily inserted yet resist removal in a transverse direction 11c. The number of teeth 30 and the incremental distance 46 therebetween may be selected to provide a continuum of possible locking positions between the anchor 16 and the receiver 18.

Figure 7:
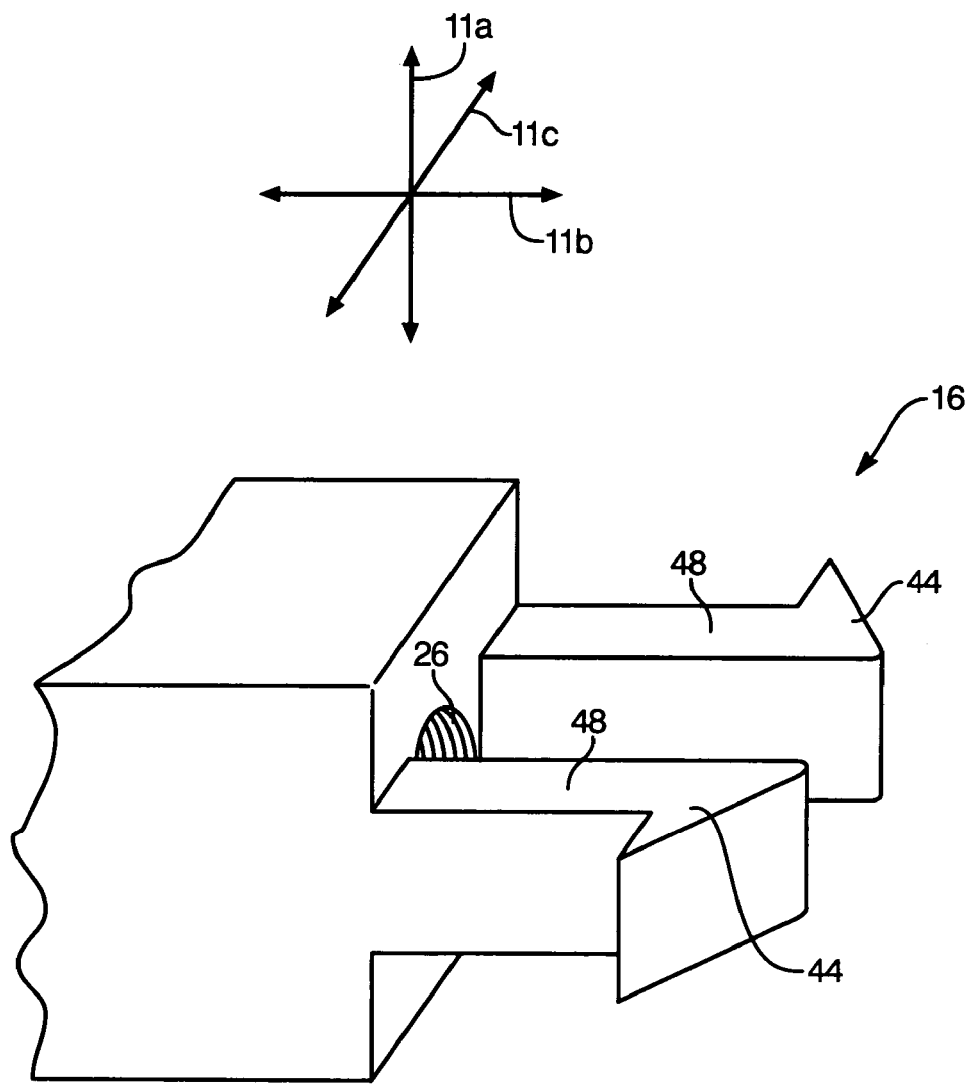
FIG. 7 is a partial perspective view of an alternative embodiment of an anchor in accordance with the present invention.
Figure 8:
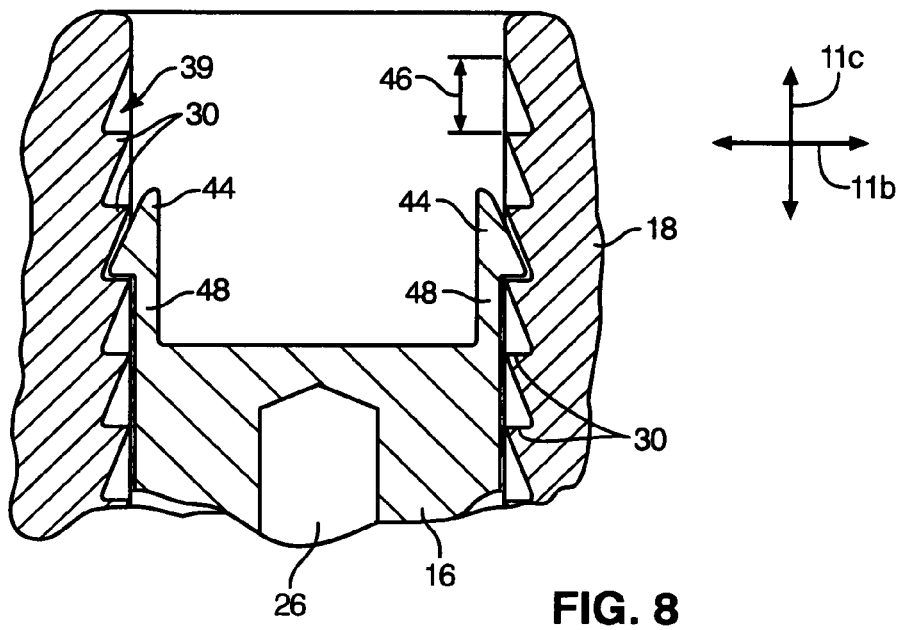
FIG. 8 is a top cross-sectional view of an alternative engagement between an anchor and receiver in accordance with the present invention.

Referring to FIGS. 7–8 while continuing to refer generally to FIGS. 1–6, in an alternative embodiment, an anchor 16 may include a single hook 44. In selected embodiments, an anchor 16 may include multiple hooks 44. A flexible region 48 may permit a hook 44 to flex as it "clicks" or passes over the teeth 30 of a receiver 18. As discussed hereinabove and as best shown in FIG. 8, the number of teeth 30 and the incremental distance 46 therebetween may be selected to provide a continuum of possible locking positions between the anchor 16 and the receiver 18.

Figure 9:
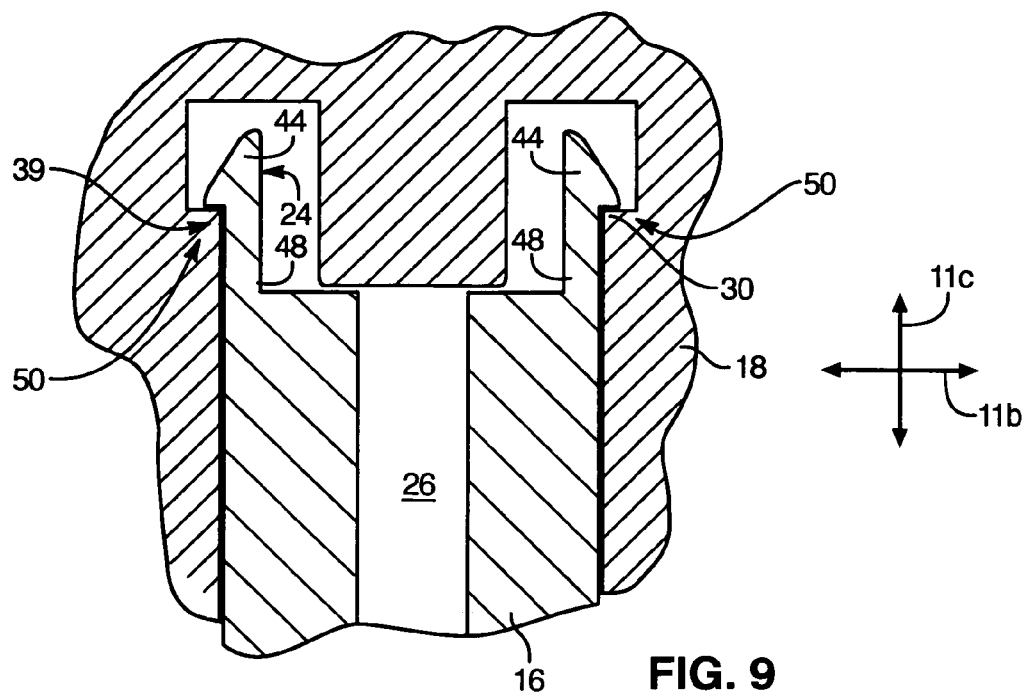
FIG. 9 is a top cross-sectional view of another alternative engagement between an anchor and receiver in accordance with the present invention.

Referring to FIG. 9, in selected embodiments, the engagement between an anchor 16 and a receiver 18 may not be incremental, rather a single locking position may be defined. In such an embodiment, the anchor 16 may be inserted into the receiver 18 until a lock 50 is activated. In selected embodiments, a lock 50 may consist of a hook 44 secured on the distal end of a flexible region 48. A stop 52 may provide a register to correctly position the anchor 16 with respect to the receiver 18. When the anchor 16 is inserted to the stop 52, a hook 44 may engage an engagement location 30 of the receiver 18.

Figure 10:
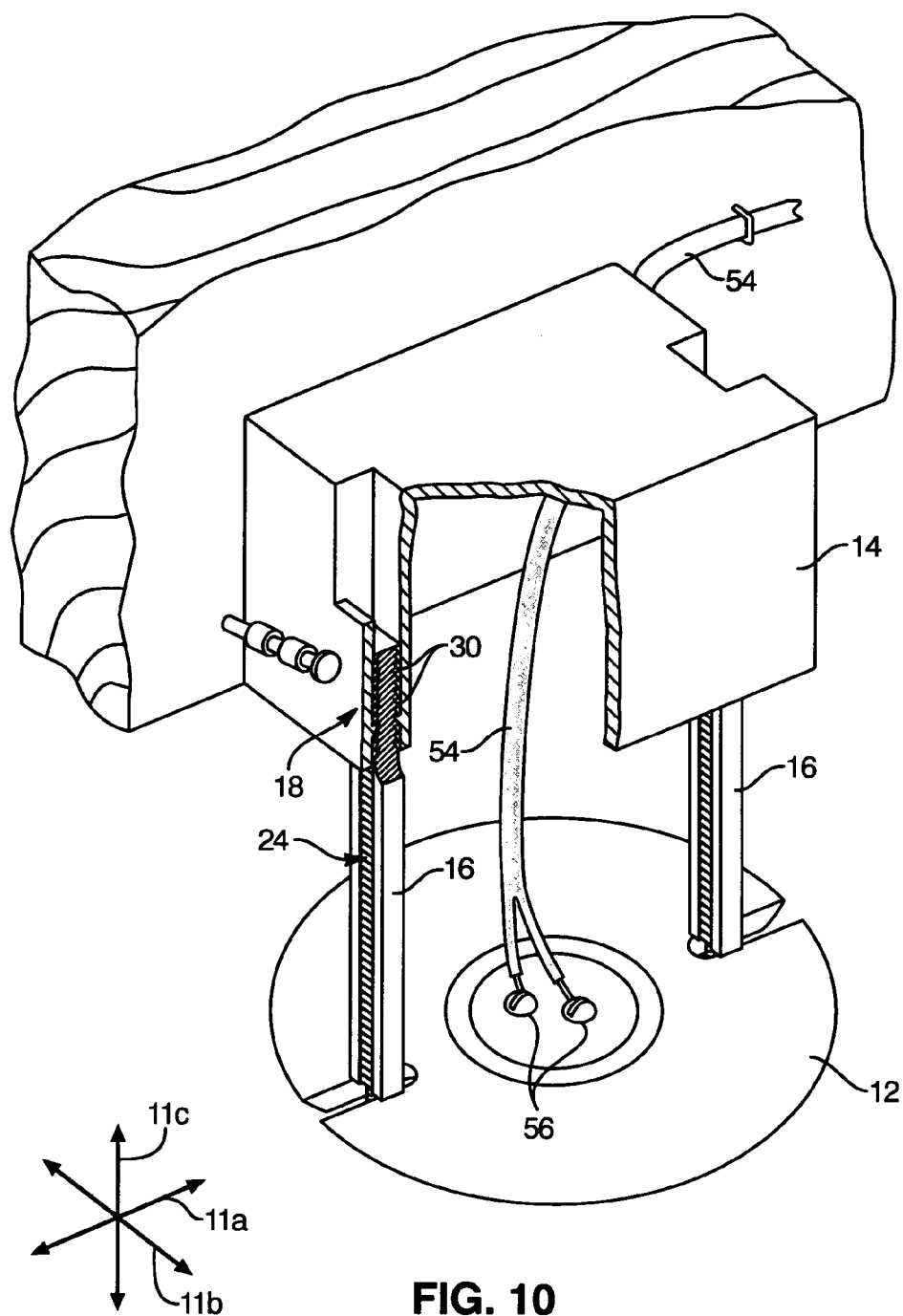
FIG. 10 is a partial cutaway, perspective view of an application of a quick assembling connection box in accordance with the present invention.

Referring to FIG. 10, the length 28 (see FIG. 2) of the engagement mechanism 24 may be selected to best match the particular application to which the engagement mechanism 24 may be applied. For example, the installation of a light fixture 12 may be simplified by employing a comparatively long anchor 16 having a similarly long engagement mechanism 24. In such an application, two long anchors 16 may be secured to the fixture 12. The anchors 16 may be introduced into the corresponding receivers 18 a distance sufficient to engage the engagement mechanisms 39 thereof. The anchors 16 may then hold the fixture 12 in place while the installer proceeds to connect the necessary wires 54. Upon completion of the connecting of the wires 54, the fixture 12 may be pushed in a transverse direction 11c until a proper position is achieved. Thus, the installer need not hold the fixture 12 while connecting wires 54 and tightening terminal screws 56.

Figure 11:
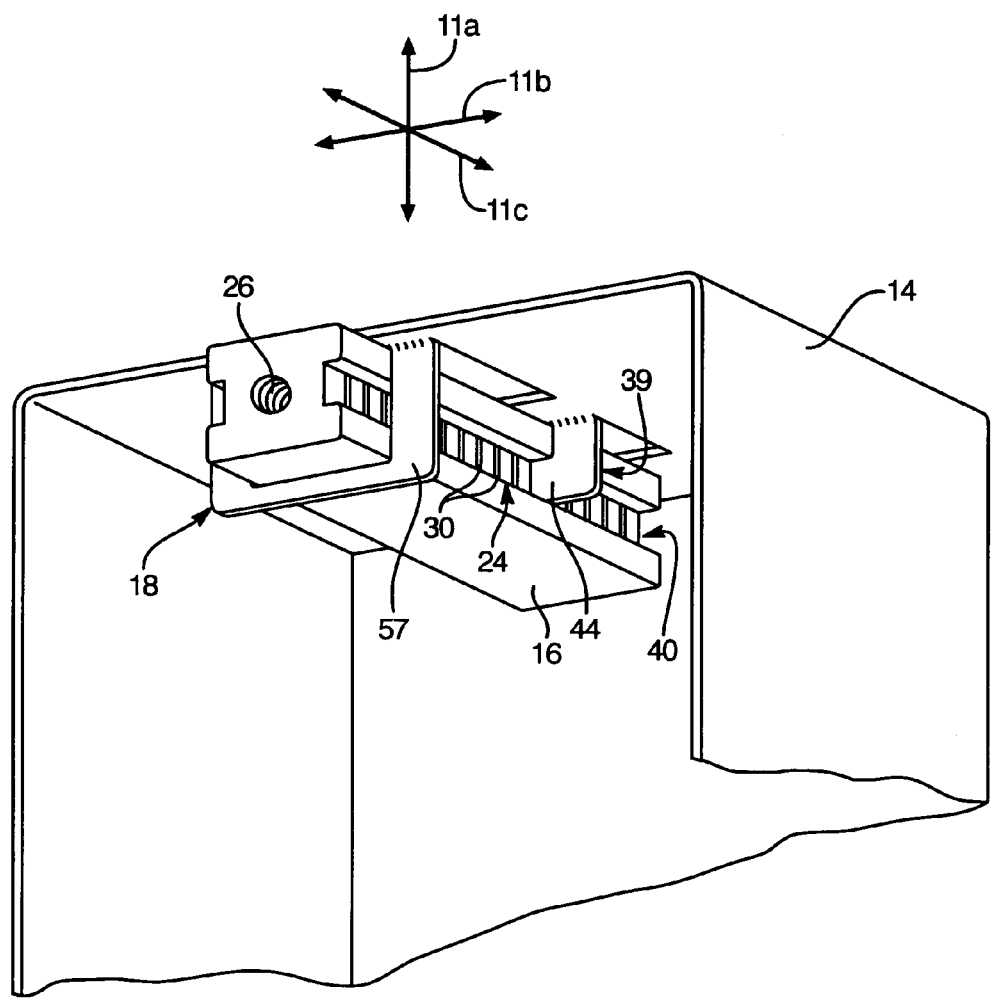
FIG. 11 is a perspective view of a receiver in accordance with the present invention formed as part of a metal connection box.

Referring to FIG. 11, a receiver 18 may be associated with a connection box 14 in any suitable manner. In selected embodiments, the receiver 18 may be formed as an integral part of the connection box 14. This forming may be part of a molding process. That is, the receiver 18 may be molded as part of the connection box 14 in its original forming process. FIG. 11 illustrates an embodiment in which the receiver 18 is formed by stamping selected shapes from a metal connection box 14 and then bending the cut portions in a selected direction to form a guide 57 and an engagement mechanism 39. In an alternative embodiment, a receiver 18 may be formed (e.g. molded, extruded, cast, machined, stamped, or the like) and then joined to the connection box 14. Such a joining may be accomplished by bolting, screwing, welding, gluing, bonding, or the like.

Figure 12:
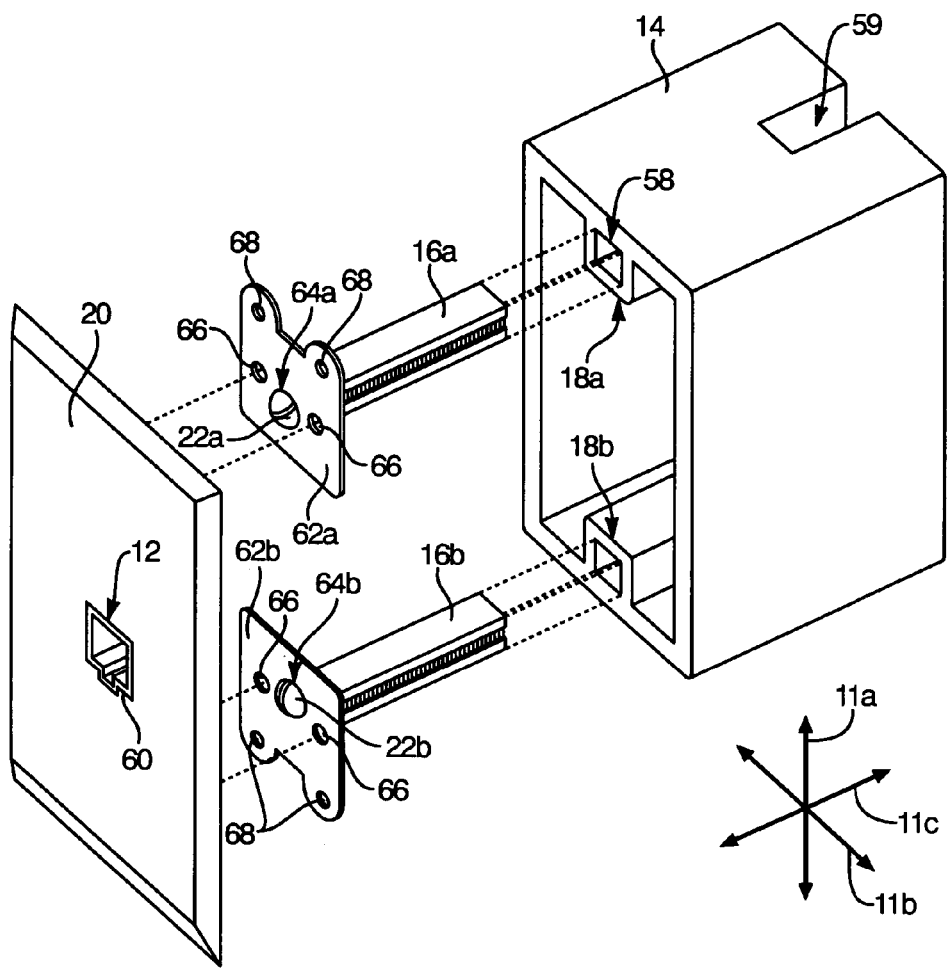
FIG. 12 is an exploded perspective view of an alternative embodiment of a face plate and fixture assembly in accordance with the present invention.

Referring to FIG. 12, connection boxes 14 are typically installed and wired before the installation of the wall paneling (e.g., ceiling paneling and the like). Fixtures 12 and face plates 20 are typically installed after the installation of the wall paneling. The installation of wall paneling often involves the application of dry wall compound. It is very common for clumps of dry wall compound to be inadvertently introduced inside a previously installed connection box 14. Receivers 18 in accordance with the present invention may be formed in a manner to greatly limit the adverse effects of misplaced dry wall compound.

For example, if dry wall compound were placed in the receiver entrance 58, the receiver may be formed to have an open back exit 59. Thus, anchor 16 may be inserted into the receiver 18 and any clump of dry wall compound may simply be pushed out the back 59 of the receiver 18. The back 59 may be open to the exterior of the connection box 14. The back 59 may also be configured to open to the interior of the connection box 14. In such a configuration, a dry wall compound clump will be pushed to the interior of the connection box 14 where it can do no harm.

Embodiments in accordance with the present invention may be applied to any unit 12 for which permanent or removable securement to a connection box 14 is desired. Data terminals such as phone jacks, network jacks, cable connections, and the like may not have a fixture 12 associated therewith. These applications may deliver a transmission line to a jack 60 or connector 60 mounted directly in a face plate 20. The face plate 20 provides the structure and support for the jack 60, and indeed may provide many of the same functions as a fixture 12. Typically these face plates have been secured directly to a corresponding connection box by multiple screws. Installation of such screws presents difficulties similar to those encountered in the installation of fixtures 12.

FIG. 12 illustrates one embodiment of a jack connection box assembly 10 in accordance with the present invention. Interface members 62a, 62b may provide an interface between a face plate 20 and anchors 16a, 16b. In selected embodiments, the interface members 62 may include an aperture 64 to accommodate securement of an anchor 16. Additional apertures 66 may provide locations for the face plate 20 to engage the interface members 62. In certain embodiments, extensions 68 or "dog ears" 68 may be incorporated to hold each interface member 62 flush with the wall paneling.

The interface members 62 may be formed in any suitable shape for providing adequate engagement between an anchor 16 and a face plate 20. In one embodiment, the interface members 62 are generally flat pieces having multiple apertures 64, 66 and extensions 68. The interface members 62 may be constructed of any suitable material. In selected embodiments, interface members 62 may be formed by stamping sheet metal. In alternative embodiments, interface members 62 may be molded from a polymer, a composite, or the like.

Figure 15:
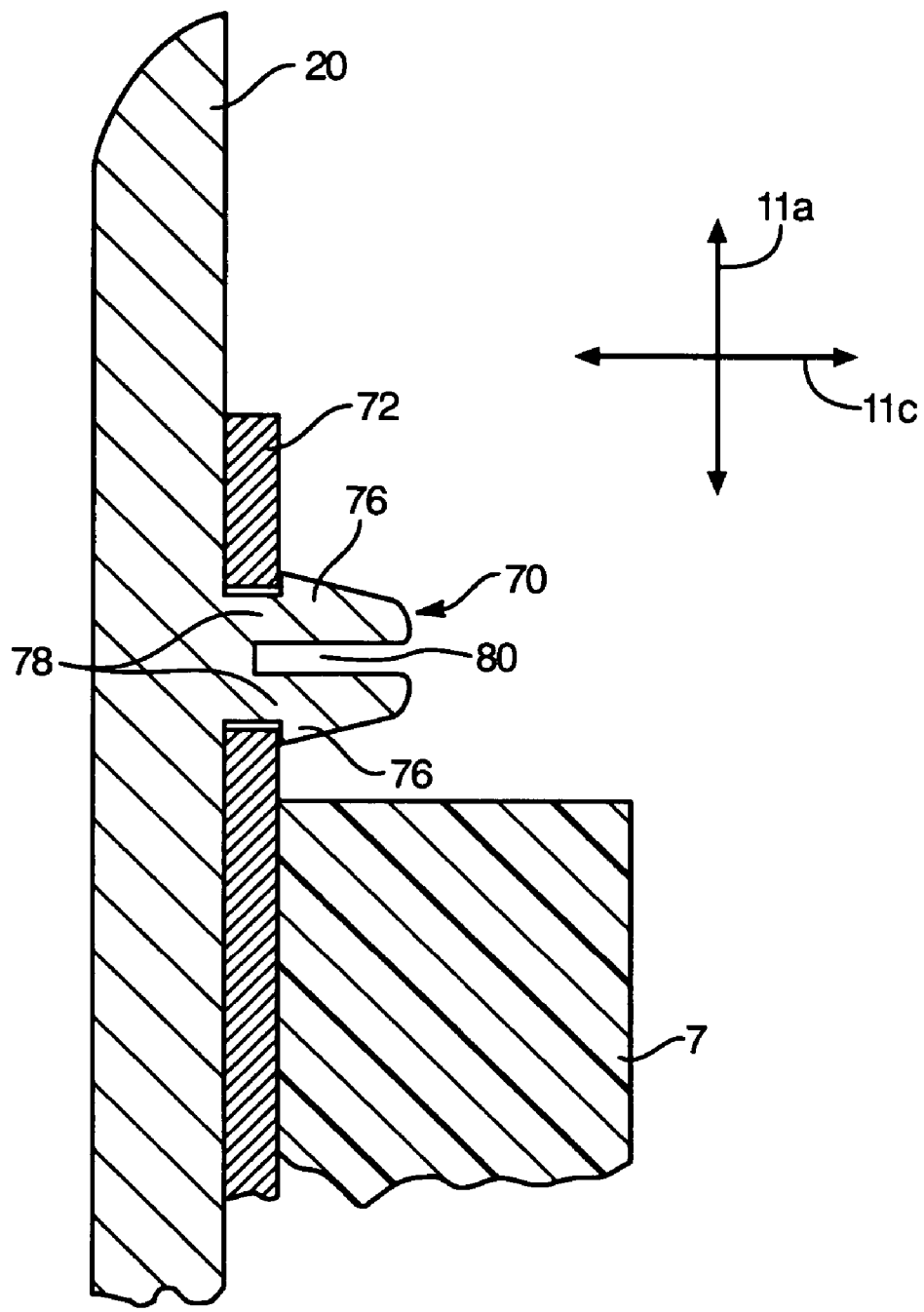
FIG. 15 is a side cross-sectional view of a screwless face plate assembly in accordance with the present invention.

Referring to FIGS. 13–15, as discussed hereinabove, after the installation of a fixture 12, a face plate 20 is typically secured thereto to hide the under workings from view. Conventional face plates 20 are often secured by at least one screw. Screws and other securement devices may be unsightly. Screws used to secure face plates 20 to receptacles and switches are typically painted and are, therefore, exposed to chipping, tarnishing, wear, oxidation, and the like. In such applications, it may be desirable to provide a snap-on assembly to provide fast securement of a face plate 20 without the use of screws.

FIGS. 13–15 illustrate one embodiment of a screwless face plate 20 in accordance with the present invention. In selected embodiments, a face plate 20 may include engagement prongs 70. The engagement prongs 70 may engage a fixture 12 and maintain the face plate 20 aligned and secured thereto. Thus, once a face plate 20 has been attached, a complete fixture 12 assembly may be quickly and easily wired and then secured to a corresponding connection box 14.

Selected fixtures 12 in accordance with the present invention may include flanges 72. Flanges 72a, 72b may extend away from a main body 74 of a fixture 12 in a longitudinal direction 11a. In selected embodiments, the flanges 72 may include an aperture 64 to accommodate the securement of an anchor 16. Additional apertures 66 may provide locations for the engagement prongs 70 of the face plate 20 to engage the flanges 72. In certain embodiments, extensions 68 or "dog ears" 68 may be selected to hold the fixture 12 flush with the wall paneling.

Engagement prongs 70 in accordance with the present invention may be formed to have multiple hooks 76a, 76b, 76c, 76d. The hooks 76 may be secured to the face plate 20 by flexible necks 78a, 78b, 78c, 78d, respectively. A flex clearance 80 may be provided between the hooks 76 so that as the prong 70 is inserted through an aperture 66, the hooks 76 may deflect toward each other, thus, effectively reducing the diameter of the prong 70. Once the prong 70 has passed through the aperture 66, the hooks 76 may return to their neutral position and engage the edges of the aperture 66.

Figure 16:
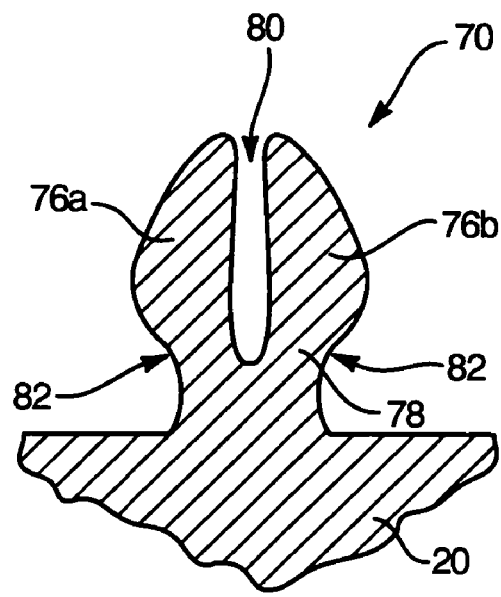
FIG. 16 is a side cross-sectional view of an engagement prong in accordance with the present invention.
Figure 17:
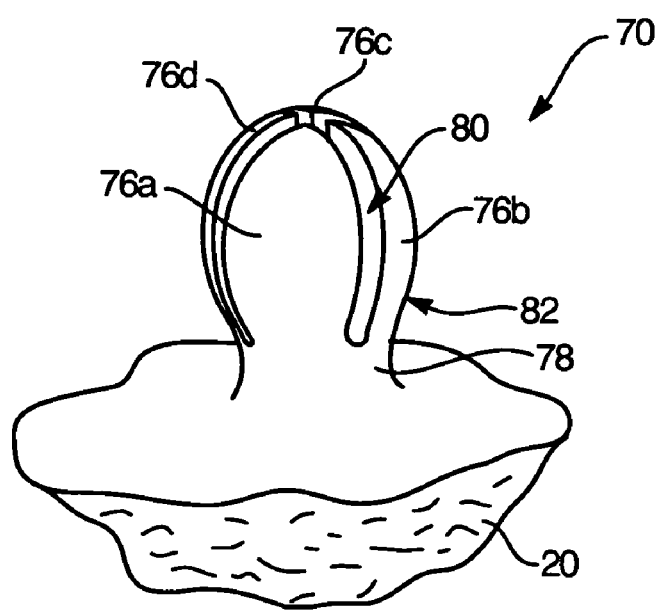
FIG. 17 is a perspective view of an engagement prong in accordance with the present invention.

Referring to FIGS. 16 and 17, in selected embodiments, the hooks 76 may be shaped to release at a desired removal loading, thus, once the face plate 20 is removed, the face plate 20 may be used again. For example, the hooks 76 may be provided with an inside taper 82. The inside taper 82 may allow each hook 76 to gradually flex and bend towards the flex clearance 80 as the face plate 20 is pulled away from the fixture 12 so that the effective diameter of the engagement prong 70 may be reduced and the prong 70 may be removed from the aperture 66. In an alternative embodiment, a face plate 20 in accordance with the present invention may be removed by applying sufficient force to fail the hooks 66.

A screwless face plate 20 in accordance with the present invention may be formed of any suitable material. This material may be selected based on several characteristics including cost, aesthetics, dielectric constant, thermal capacity, strength, toughness, flexibility, formability, and the like.

Engagement prongs 70 in accordance with the present invention may have any suitable configuration. The number of prongs 70 may range from one to several and be selected to provide a balanced securement between a face plate 20 and a fixture 12. The number of hooks 76 making up each prong 70 may also range from one to several depending on a desired engagement strength, ease of manufacture, ease of installation, ease of removal, and the like. In certain embodiments, the engagement strength may be balanced with a desired release loading. The general shape or contour of the prongs 70 may also be selected to provide a desired engagement strength, ease of manufacture, ease of installation, ease of removal, and the like.

Referring to FIGS. 18–20, alternative embodiments in accordance with the present invention may employ alternative methods for securing a screwless face plate 20 to a fixture 12. In one alternative embodiment, a flange 72a of a fixture 12 may have an engagement lip 84 formed therein. A extension 86 may be formed in association with a corresponding face plate 20. The engagement lip 84 may be configured to fit behind the extension 86 to hold the upper portion of the face plate 20 to the flange 72a.

An aperture 66 may be formed in a flange 72b of the fixture 12. A corresponding engagement prong 70 may be formed in association with the face plate 20. The prong 70 illustrated in FIGS. 18–19 is an example of a single hook, rectangular prong 70. The aperture 66 may be shaped to correspond to the design of the prong 70. In selected embodiments, the lip 84/extension 86 and aperture 66/prong 70 combinations may cooperate to secure the face plate 20 to the fixture 12. Such an embodiment may be installed by first inserting the lip 84 behind the extension 86 and then rotating the face plate 20 down against the fixture 12 until the prong(s) 70 may be inserted into the corresponding aperture(s) 66. The prong 70 engagement may provide a tie to resist the tendency of the lip 84 to disengage from the extension 86.

An engagement lip 84 in accordance with the present invention may be divided into multiple engagement lips 84. In selected embodiments, an upper flange 72a may be formed into two lips 84a, 84b. The lips 84a, 84b may be separated by a notch 88. A stop 90 may be formed as part of a corresponding extension 86. The stop 90 may fit into the notch 88 to prevent lateral motion between the upper flange 72a and the face plate 20.

In certain embodiments, ends 92 may form an enclosure 94 in combination with an extension 86 and corresponding face plate 20. The ends 92 may function to laterally retain the lip 84 of a flange 72a, when assembled.

In selected embodiments, a face plate 20 in accordance with the present invention may have an access notch 96. In certain embodiments, an access notch 96 may simply provide a hold to permit the application of force to "pop" a face plate 20 from a corresponding fixture 12. In alternative embodiments, the access notch 96 may provide access behind the face plate 20 to a slender tool. The slender tool may then be used to assist in the release of an engagement prong 70.

Referring to FIG. 21, an alternative embodiment of an engagement between a screwless face plate 20 and a fixture 12 may involve the engagement of an edge 98 of the flanges 72 of the fixture 12. One or more of the engagement prongs 70 of the face plate 20 may be configured to engage an edge 98. In selected embodiments, the prongs 70 may be formed to have a hook 76 and a flexible neck 78. In certain embodiments, a flange 72 may include a formation 100 to resist motion in a longitudinal direction 11a of a face plate 70 with respect thereto. Such a formation 100 may be formed by bending, cutting and bending, notching, or similarly modifying the edge 98 to resist sliding of a prong 70 therealong in a longitudinal direction 11a.

Figure 22:
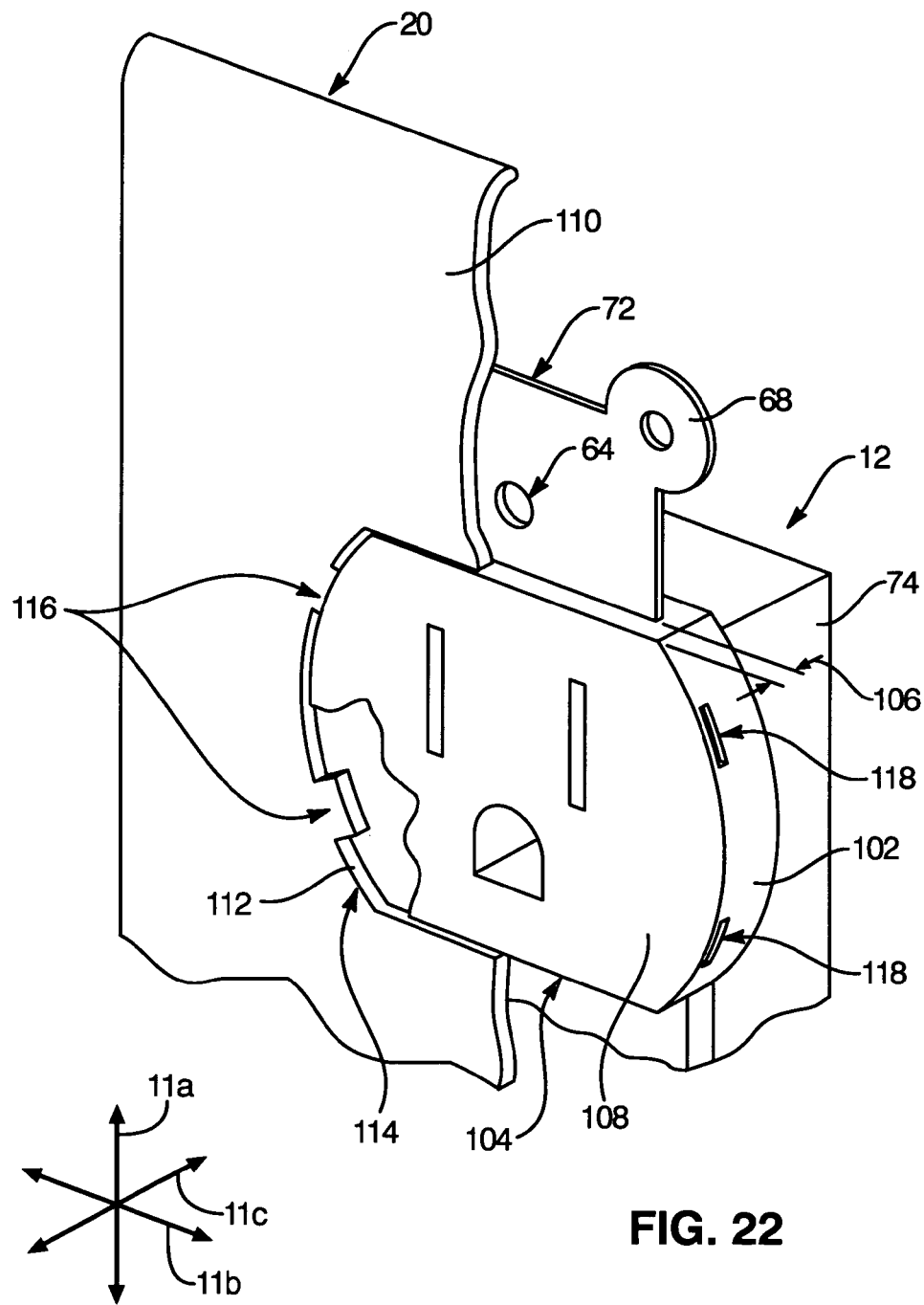
FIG. 22 is a cutaway, partial perspective view of alternative engagement between a screwless face plate and a fixture in accordance with the present invention.

Referring to FIG. 22, an alternative embodiment of an engagement between a screwless face plate 20 and a fixture 12 may involve an engagement between a face plate 20 and an interface 104 of a fixture 12. Typically, the interface 104 of a fixture 12 extends a selected distance 106 to provide a flush joint with a face plate 20. That is, the interface 104 extends to provide a facing 108 that may be substantially coplanear with a surface 110 of the face plate 20, thereby improving aesthetic appeal. The area of the facing 108 may be selected to correspond to a selected interface 104. Power outlet plugs 104 provide a relatively large surface area. In contrast, switches 104 typically have a toggle central unit and a thin border providing minimal surrounding facing 108.

The extension distance 106 of the electrical interface 104 provides the surface (substantially perpendicular to the facing 108) of an edge 102. An edge 112 of an aperture 114 (the aperture 114 may admit the interface 104 through the face plate 20) may be configured to engage the edge 102 of the interface 104. This engagement may be of any suitable form. For example, the engagement may involve any suitable combination of tabs, recesses, hooks, shoulders, and the like.

In selected embodiments, the engagement between the edges 102, 112 may involve tabs 116 formed on the face plate 20 and recesses 118 formed in the interface 104. The shape, number, and location of these corresponding pairs may be selected to provide a desired engagement strength, magnitude, and balance. Engagement strength refers to the amount of force required to apply and secure the face plate 20 to the fixture 12 or, alternatively, the force required to separate the face plate 20 from the fixture 12. The engagement strength may be selected to provide fast "snap-on" assembly without risking inadvertent removal of the face plate 20 and possible electrical shock resulting therefrom.

Figure 23:
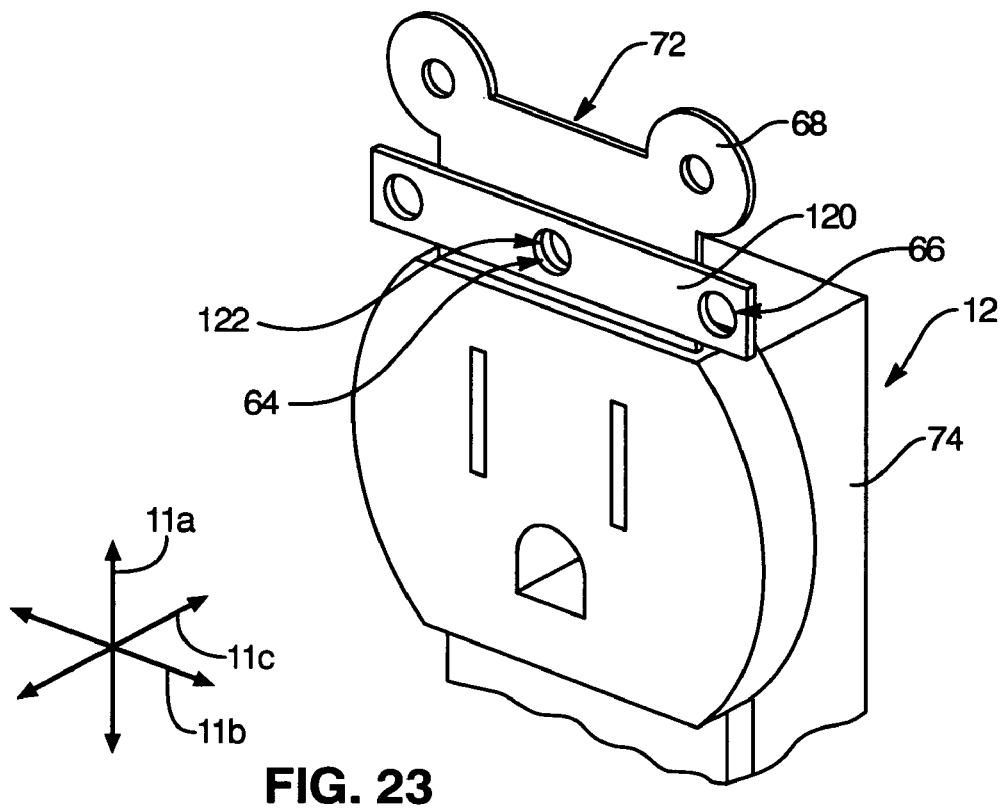
FIG. 23 is a perspective view of a fixture with an adapter in accordance with the present invention.
Figure 24:
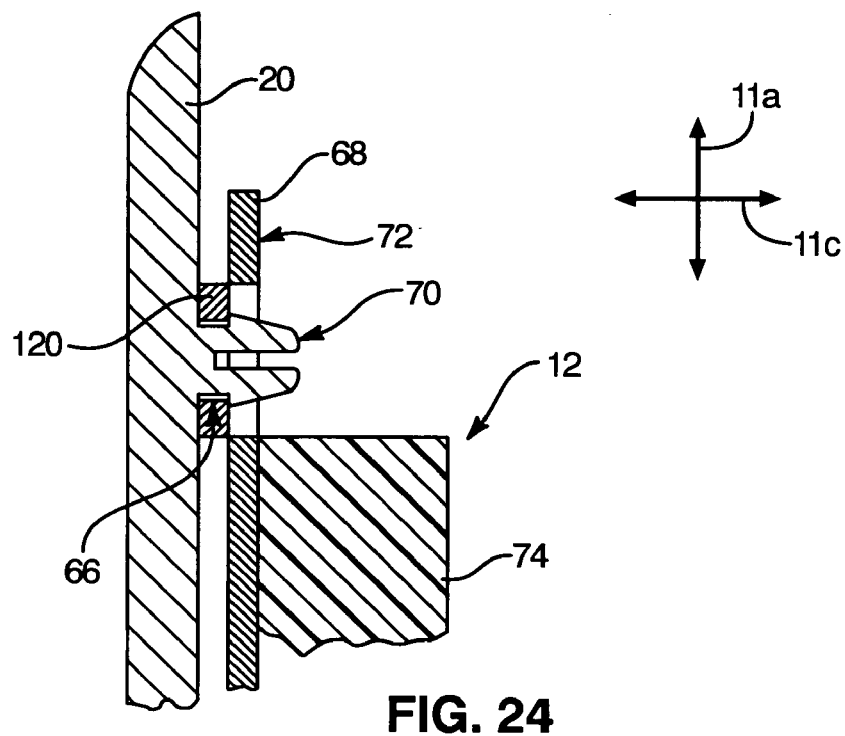
FIG. 24 is a side cross-sectional view of a fixture with an adapter in accordance with the present invention.

Referring to FIGS. 23 and 24, an adapter 120 may be provided to convert or retrofit a conventional fixture 12 to receive a screwless face plate 20. In selected embodiments, an adapter 120 in accordance with the present invention may include an aperture 122 corresponding to aperture 64 of a flange 72. A fastener 22 used to secure an anchor 16 to a fixture 12 may also pass through the aperture 122 to hold an adapter 120 in place against the flange 72. The adapter 120 may extend to provide apertures 68 for admitting the prongs 70 of a corresponding face plate 20. In this manner, a snap-on, screwless face plate 20 may be retrofitted to typical power receptacles and switches.

An adapter 120 in accordance with the present invention may be formed of any suitable material. In selected embodiments, the adapter 120 may be formed by stamping sheet metal. In an alternative embodiment, the adapter 120 may be a molded polymer or composite.

Figure 25:
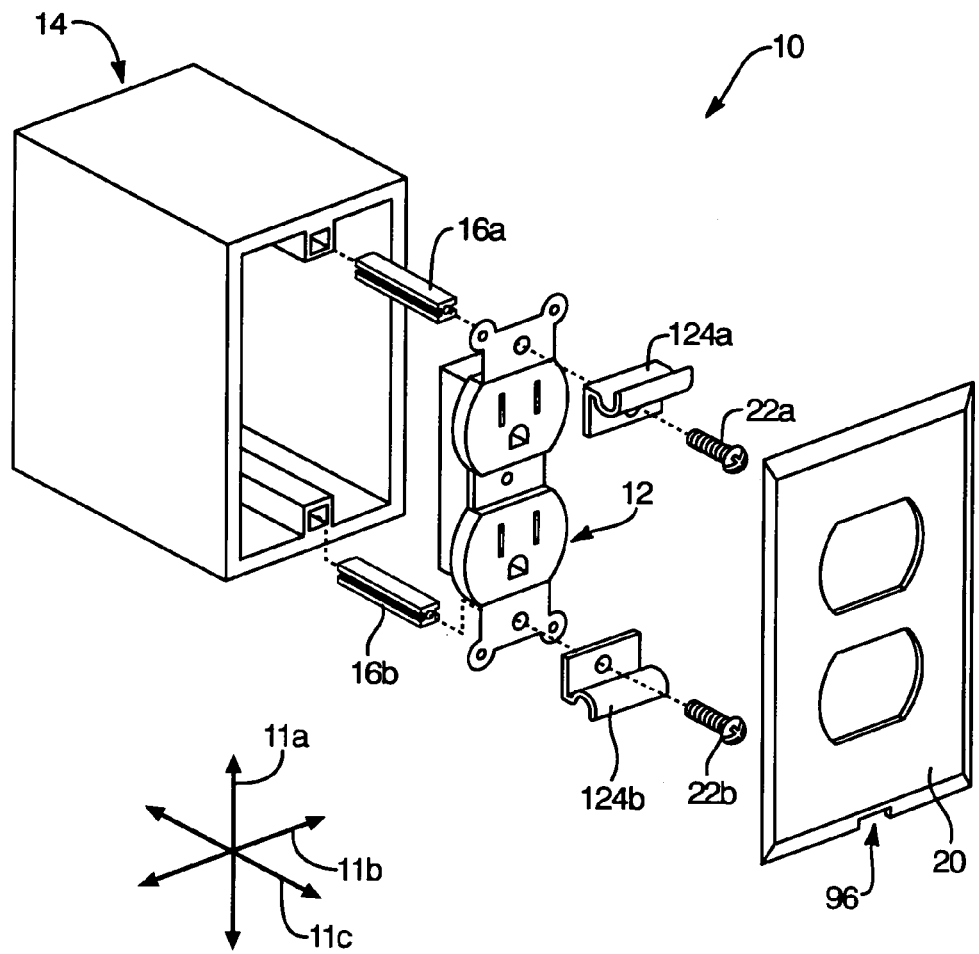
FIG. 25 is an exploded perspective view of one embodiment of a connection box assembly having clips enabling the attachment of a screwless face plate in accordance with the present invention.

Referring to FIG. 25, in certain embodiments, clips 124 may be attached to an electrical fixture 12 to retain a face plate 20 without the use of screws or other similar retainers. For example, clips 124a, 124b may be attached to an electrical fixture 12 using the fasteners 22a, 22b used to attach the anchors 16a, 16b. In an alternate embodiment, the clips 124a, 124b may be held in place by the fasteners 22a, 22b directly engaging the connection box 14.

The clips 124 may receive and retain the face plate 20 while remaining hidden from sight behind the face of the face plate 20. In certain embodiments, a notch 96 or other access point 96 may be provided to enable the insertion of a tool, finger, or other device to apply pressure to one of the clips 124 to enable the release of the face plate 20 from the electrical fixture 12 or connection box 14. The notch 96 may be located on the face plate 20 such that it is substantially hidden or inconspicuous. For example, the notch 96 may be located on the bottom of the face plate 20 where it may be substantially hidden from the view.

Figure 26:
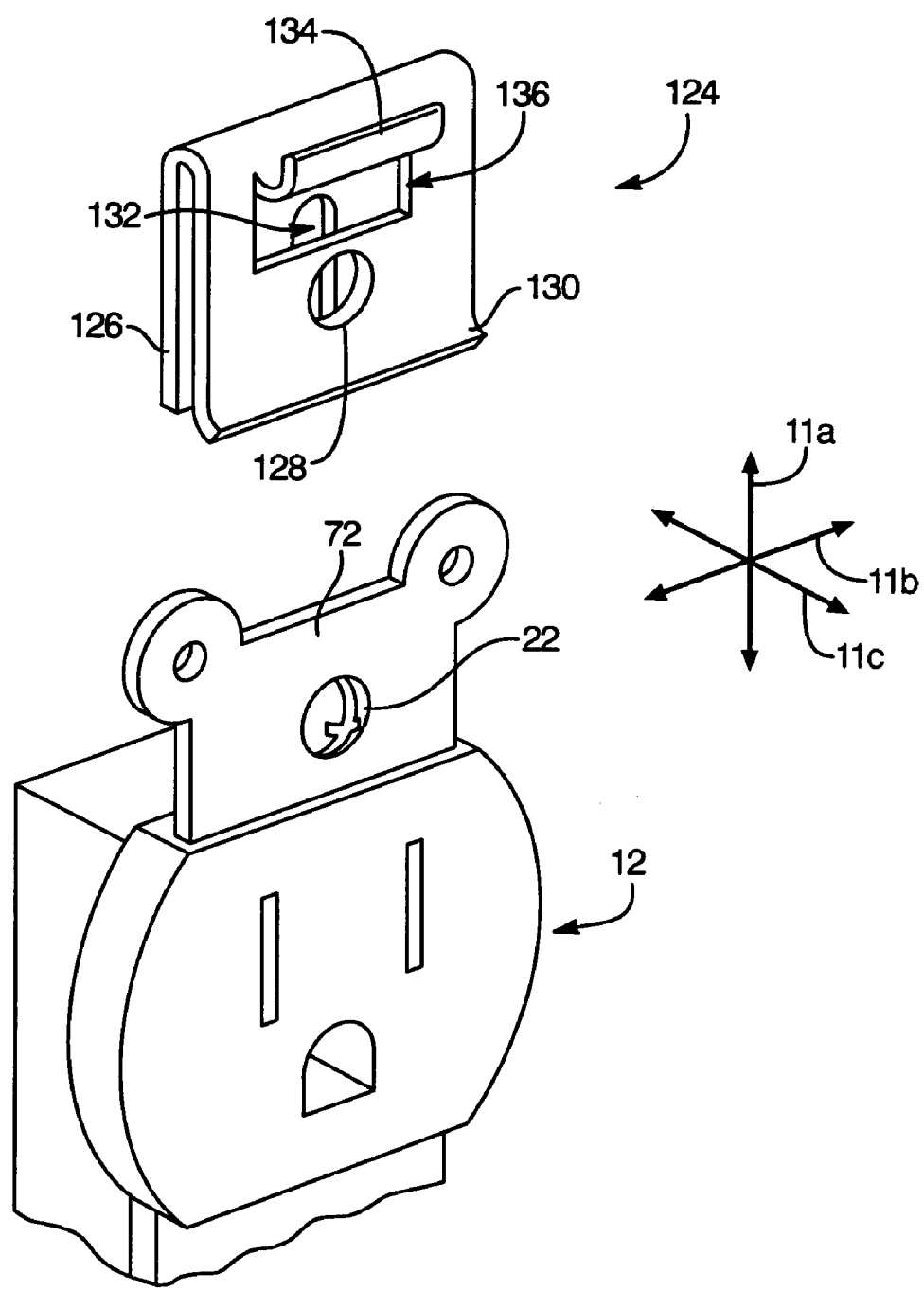
FIG. 26 is a perspective view an embodiment of a clip that attaches to an electrical fixture in accordance with the present invention.

Referring to FIG. 26, a clip 124 may have a shape selected to engage the flange 72 of the fixture 12. For example, the clip 124 may be curved or shaped to include a back face 126 in order to sandwich a flange 72 of the electrical fixture 12. This design may be useful to retrofit existing electrical fixtures 12 to receive a screwless face plate 20.

A clip 124 in accordance with the present invention may be formed of any suitable material. For example, a clip 124 may be formed from a single sheet or panel of metal (e.g. steel), plastic, or the like. Likewise, the clip may be formed (e.g. molded, extruded, cast, machined, stamped, or the like) as needed using any suitable method.

A clip 124 may include an aperture 128 that may accommodate a fastener 22. The aperture 128 may provide clearance for the fastener 22, thus, enabling the clip 124 to sit flush with the surface of the flange 72. The aperture 128 may also interact with the fastener 22 to form a detent mechanism. That is, the fastener 22, in conjunction with the aperture 128, may act as a piloting mechanism to effectively align and situate the clip 124 with respect to the flange 72.

Since the clip 124 may be used to retrofit an installed electrical fixture 12, a fastener 22 may already be positioned before the installation of the clip 124. Thus, in certain embodiments, the clip 124 may be shaped to include a lip 130. The lip 130 may enable the clip 124 to slide over a fastener 22 until the fastener 22 is aligned with the aperture 128. Because the fastener 22 may extend from the electrical fixture 12 to an connection box 14 or other object 14, a slot 132 may be provided in the back face 126 to enable the clip 124 to slide over the threaded portion of the fastener 22.

A retainer 134 in accordance with the present invention may extend from the clip 130 to engage a face plate 20. As stated hereinabove, the clip 124 may be formed from a single metal or other uniform stock material. Thus, a retainer 134 may be bent, shaped, stamped, or the like from the clip 124, leaving an opening 136. Nevertheless, the clip 124 may be formed using other methods, such as casting, extrusion, molding, machining, or the like, and need not be limited to the example described herein.

Figure 27:
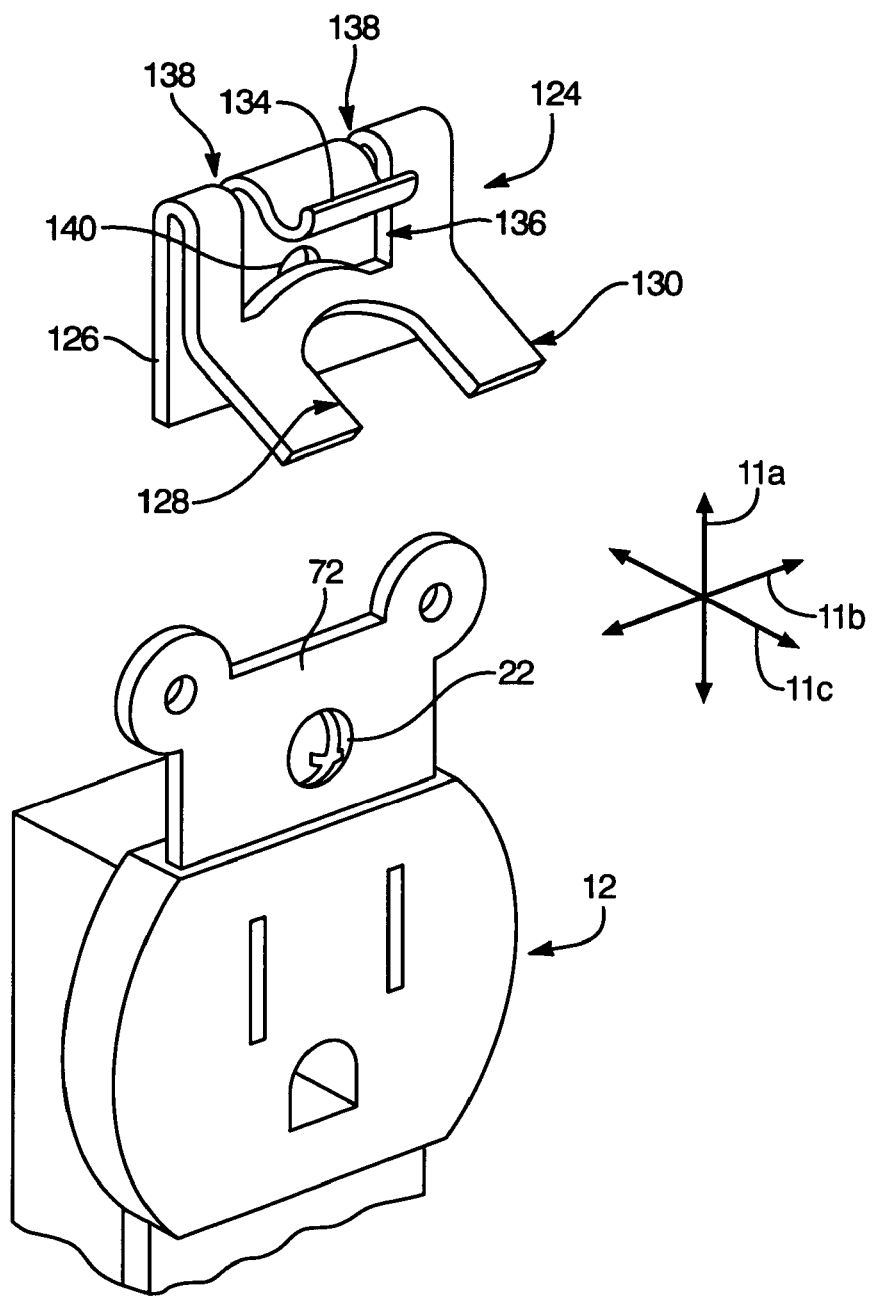
FIG. 27 is a perspective view an alternative embodiment of a clip that attaches to an electrical fixture in accordance with the present invention.

Referring to FIG. 27, clips 130 in accordance with the present invention may be formed in any manner that may aid in ease of assembly and increase the integrity of the engagement between the clip 30 and the face plate 20. For example, slots 138 may be formed where the retainer 134 connects to the rest of the clip 124. If desired, the slots 138 may extend a selected distance into the back face 126. The slots 138 may increase flexibility and deflection of the retainer 134, thus providing a smoother engagement with the face plate 20. In certain embodiments, the slots 138 may terminate in a rounded end to resist the formation of a stress riser upon deflection of the retainer 134.

In certain embodiments, a lip 130 may be formed to extend a substantial distance from the clip 124. An extended lip 130 may provide a spring biasing the retainer 134 into a firm engagement with the face plate 20. That is, the lip 130 may act as a spring to substantially remove the play between the retainer 134 and the face plate 20. If desired, an aperture 140 may be formed in the back face 126 of the clip 124 to permit a fastener 22 to pass therethrough.

Figure 28:
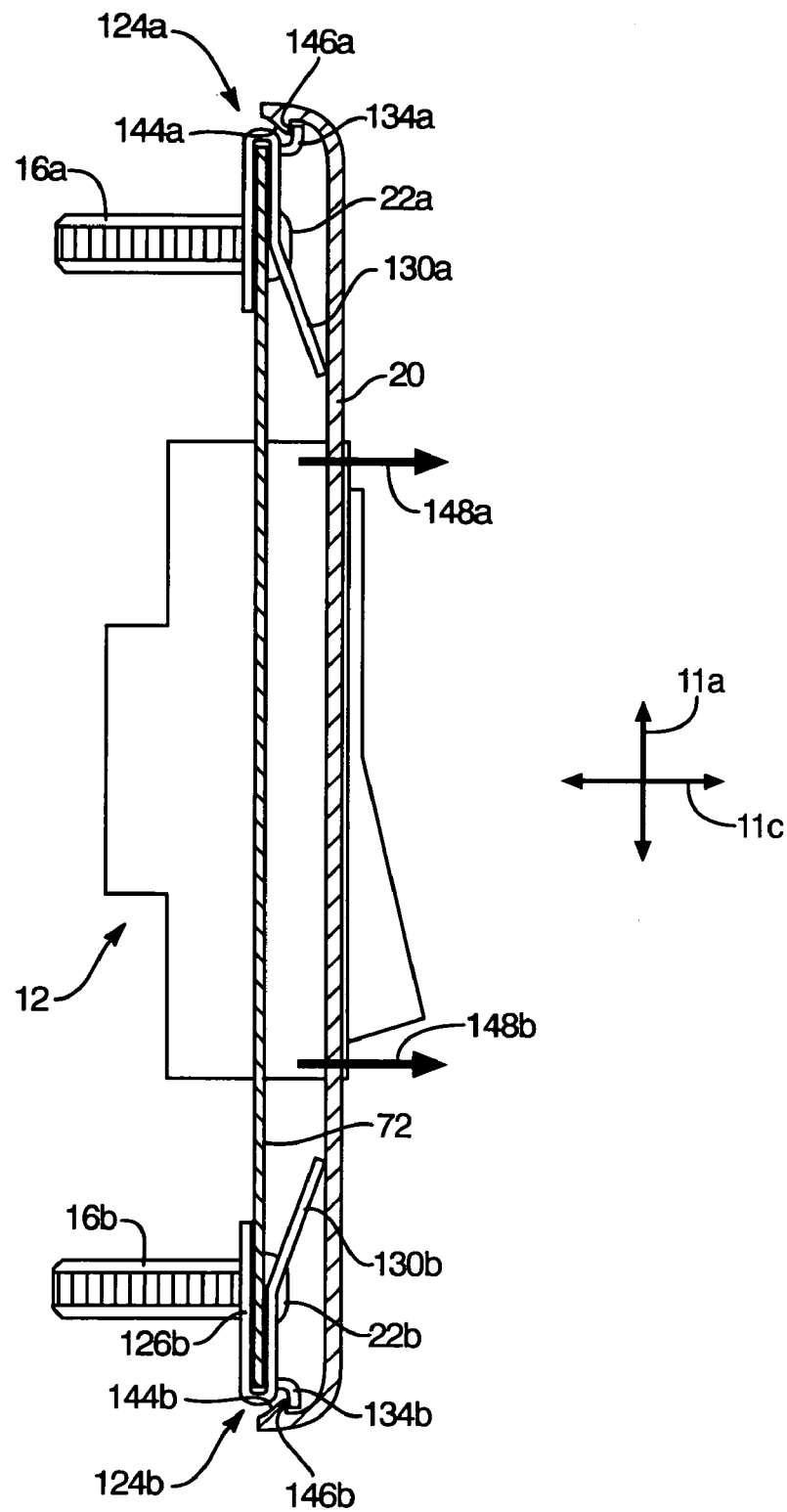
FIG. 28 is a side cross-sectional view of the clip embodiment of FIG. 27 applied to an electrical fixture and a face plate.

Referring to FIG. 28, a face plate 20 may include one or more barbs 142 located to engage the retainers 134. The barbs may include a ramp 144 and an engagement edge 146.

When a face plate 20 is applied to an electrical fixture 12, the retainers 134 may deflect while sliding along the ramps 144 until passing over the engagement edges 146. Once the retainer 134 has engaged the engagement edge 146, the lips 130a, 130b may exert forces 148a, 148b on the face plate 20. The forces 148a, 148b may urge the retainers 134a, 134b against engagement edges 146a, 146b, thus reducing the play that may be present in the engagement of the fixture 12 with the face plate 20.

In an alternative embodiment, one of the clips 124 may be formed of a substantially rigid material (e.g. substantially non-deflectable material) and the other 124 may be formed from a comparatively deflectable material. Thus, in this embodiment, a substantially rigid clip 124 may be initially placed over a first engagement edge 146a and a deflectable clip 124 slide along the ramp 144b until it engages a second engagement edge 146b.

As previously described, a notch 96 may provide access to the retainer 134. Thus, a tool, finger, or other device may mechanically urge deflection of the retainer 134, thereby releasing the face plate 20 from the electrical fixture 12.

Figure 29:
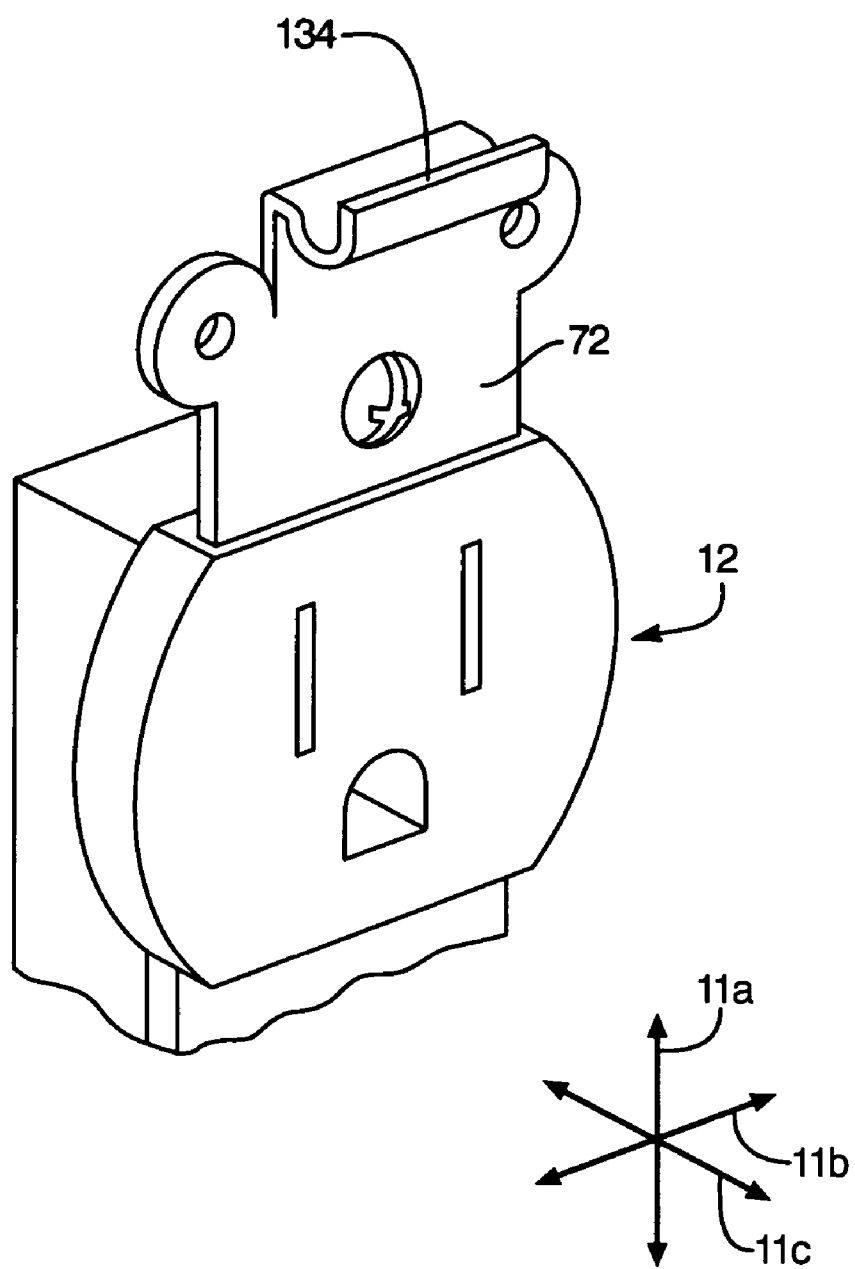
FIG. 29 is a perspective view of a retainer integrally formed as part of the flange of a electrical fixture for attaching a screwless face plate in accordance with the present invention.

Referring to FIG. 29, in instances where a retrofitted solution is not needed, an electrical fixture 12 may include a retainer 134 formed as part of a flange 72. The retainer 134 and flange 72 may be formed (e.g. molded, extruded, cast, machined, stamped, or the like) from a single homogenous material. In addition, the number, bulk, and inconvenience of multiple components may be reduced.

Figure 30:
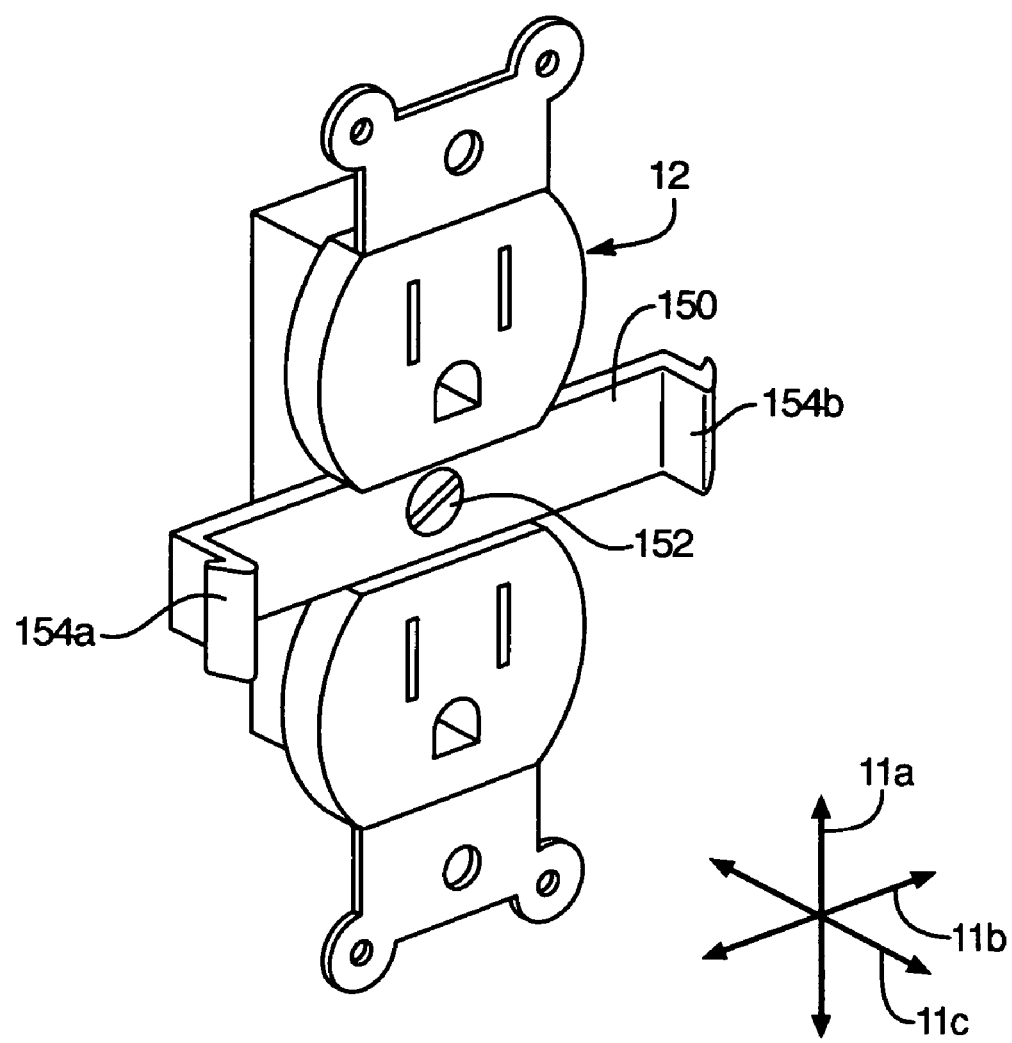
FIG. 30 is a perspective view of an embodiment of an adapter that may be used to attach a screwless face plate to an electrical fixture in accordance with the present invention.

Referring to FIG. 30, in other embodiments, an adapter 150 for use with a screwless face plate 20 may be attached to an electrical fixture 12 using a fastener 152. For example, a screw 152 normally used to attach a face plate 20 to an electrical fixture 12 may be used (e.g. at the factory) to attach an adapter 150 to the fixture 12. The adapter 150 may include one or more barbs (e.g. teeth, hooks) 154a, 154b to receive and retain a screwless face plate 20. In the illustrated embodiment, the barbs 154a, 154b may engage the interior side edges of the face plate 20. However, the adapter 150 may be alternatively configured to contact the face plate 20 in one or more of other locations.

Figure 31:
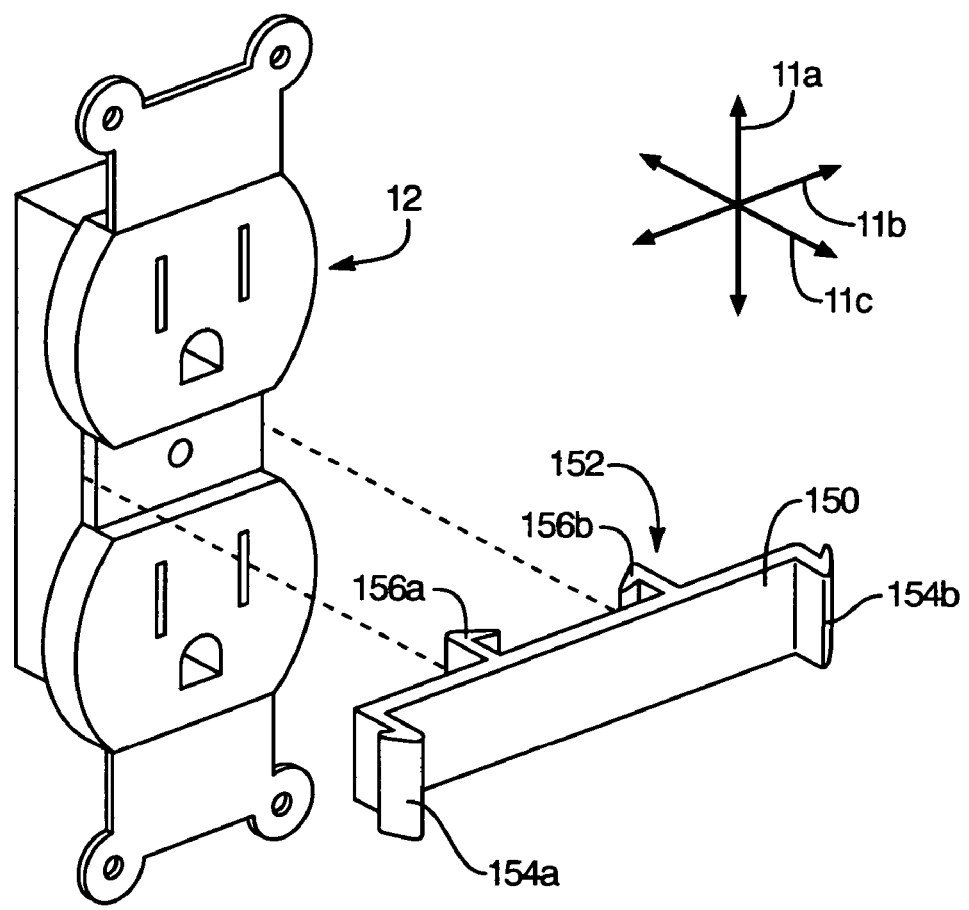
FIG. 31 is a perspective view of an alternative embodiment of an adapter that may be attached to an electrical fixture without the use of tools in accordance with the present invention.
Figure 32:
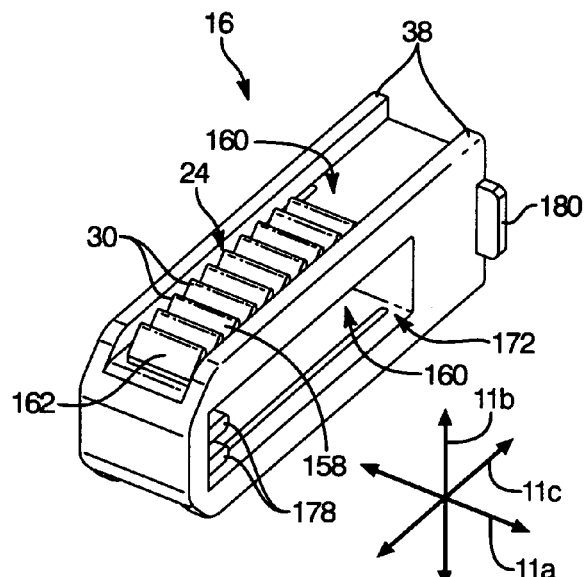
FIG. 32 is a perspective view of an embodiment of an anchor having cantilevered engagement mechanisms in accordance with the present invention.
Figure 33:
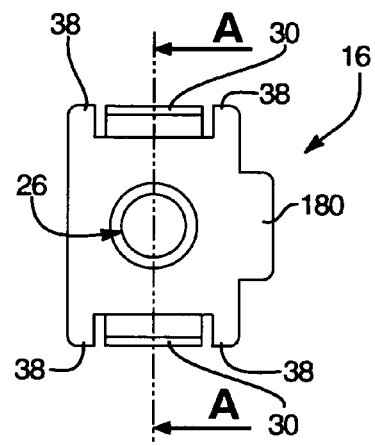
FIG. 33 is an end elevation view of the anchor in FIG. 32.
Figure 34:
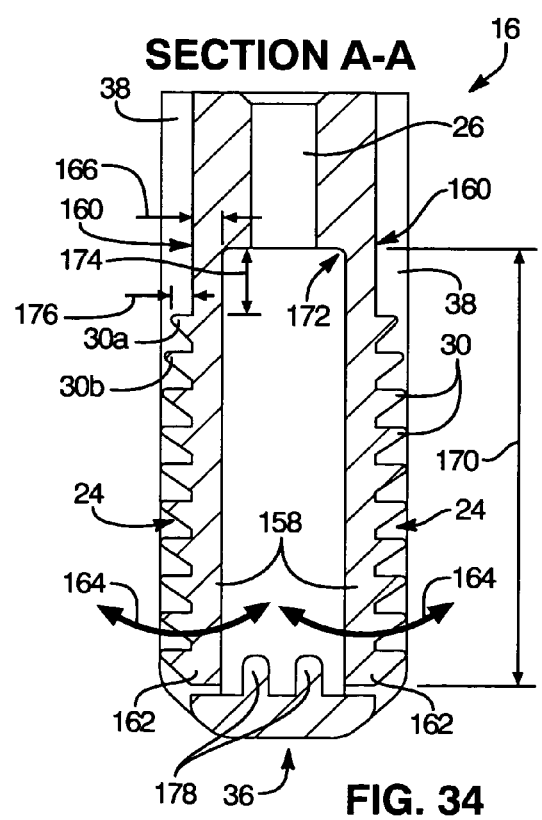
FIG. 34 is a cross-sectional view of the anchor in FIG. 32.
Figure 35:
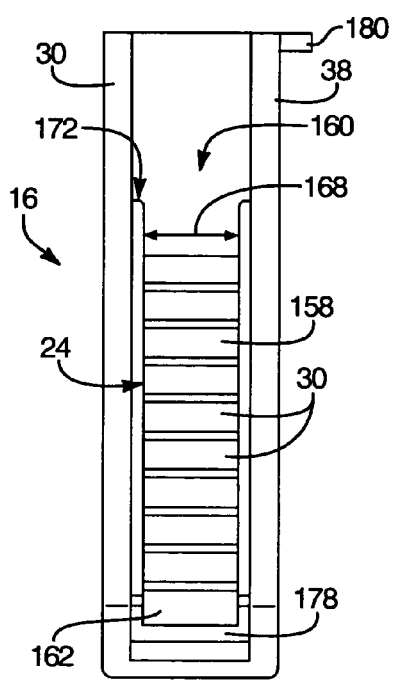
FIG. 35 is a side elevation view of the anchor in FIG. 32.

Referring to FIG. 31, in another embodiment, a fastener 152 may support securement of the adapter 150 to the electrical fixture 20 without the use of tools. For example, a fastener 152 may include clips 156a, 156b formed as an integral part of an adapter 150. The clips 156a, 156b may clip onto or attach to the fixture 12. Thus, the adapter 150 may both attach to the fixture 12 and to the face plate 20 without the use of tools.

Referring to FIGS. 32–35, in certain embodiments, upon insertion, the engagement mechanism 24 of the anchor 16 may structurally interfere with the engagement mechanism 39 of the receiver 18. Thus, further insertion of the anchor 16 into the receiver 18 may be problematic. For example, in embodiments where the interference between the teeth 30 and barbs 44 becomes an issue, either the anchor 16, the receiver 18, or both the anchor 16 and the receiver 18 may flex or deflect to ameliorate the resistance to insertion.

In selected embodiments, an anchor 16 in accordance with the present invention may be dynamic when interacting with the receiver 18. For example, the engagement mechanism 24 of the anchor 16 may be formed as a cantilever 158. The cantilever 158 may secure to the rest of the anchor 16 at a flex point 160. A distal end 162 of the cantilever 158 may extend in the transverse direction 11b away from the flex point 160. Thus, the distal end 162 of the cantilever 158 may resiliently flex in a lateral arc 164 providing deflection of the engagement mechanism 24 in substantially the lateral direction 11b.

A cantilever 158 may have any configuration to provide a desired resiliency, strength, deflection amplitude, spring constant, and the like. For example, the cantilever 158 may have a thickness 166 and a width 168 selected to provide an effective spring constant for deflection of the distal end 162 of the cantilever 158. Generally, the thicker and wider the cantilever 158, the greater the spring constant for any material. If desired, the thickness and/or width of the cantilever 158 may vary along a length 170 thereof. The length 170 of the cantilever may also be varied to control the spring constant of the cantilever 158. In certain embodiments, fillets 172 or radiused corners 172 may be employed at the flex point 160 to resist the formation of stress risers that may result in premature failure of the cantilever 158.

The location of the engagement mechanism 24 on the cantilever 158 may be varied to provide a desired performance. Points on the cantilever 158 closer to the flex point 160 deflect less distance in the lateral direction 11b than do points on the cantilever 158 closer to the distal end 162. The engagement mechanism 24 may be positioned to take advantage of this disparity in deflection along the length 170 of the cantilever 158. For example, in certain embodiments, the engagement locations 30 may be spaced a selected distance 174 from the flex point 160. The spacing 174 may increase the deflection of the engagement locations 30 in the lateral direction 11a while decreasing the force necessary for causing that deflection.

In certain embodiments, even after the engagement locations 30 are spaced a selected distance 174 from the flex point 160, interference between the engagement locations 30 and the engagement mechanism 39 of the receiver 18 may be excessive. In such embodiments, additional adaptations to the engagement locations 30 may be applied. For example, in embodiments where the engagement locations 30 are teeth 30, the teeth 30a, 30b proximate the flex point 160 may gradually decrease in height 176. Thus, while proximate teeth 30a, 30b do not deflect as far as the distal teeth 30 near the distal end 162, the proximate teeth 30a, 30b, may have less height 176 to clear the barbs 44 of the receiver 18. In other embodiments, where the number of necessary engagement locations 30 is limited, the teeth 30a, 30b closest to the flex point 160 may be omitted, thus, effectively increasing the spacing 174.

In selected embodiments, various stops may be incorporated into the anchor 16 design to improve performance. For example, a deflection stop 178 may be placed on the anchor 16 to resist or limit how far the distal end 163 of a cantilever 158 may inwardly deflect. In other embodiments, an insertion stop 180 may be added to a suitable location on the anchor 16. The insertion stop 180 may resist over insertion of the anchor 16 in the receiver 18. An insertion stop 18 may be formed for easy removal (e.g. by breaking or tearing) so that in certain applications, the anchor 16 may have no barrier to insertion. If desired, an insertion stop 180 may be positioned to facilitate its removal even after installation. Thus, if necessary, once the insertion stop 180 is removed, the anchor 16 may be pushed completely through, and out of, the receiver 18.

Figure 36:
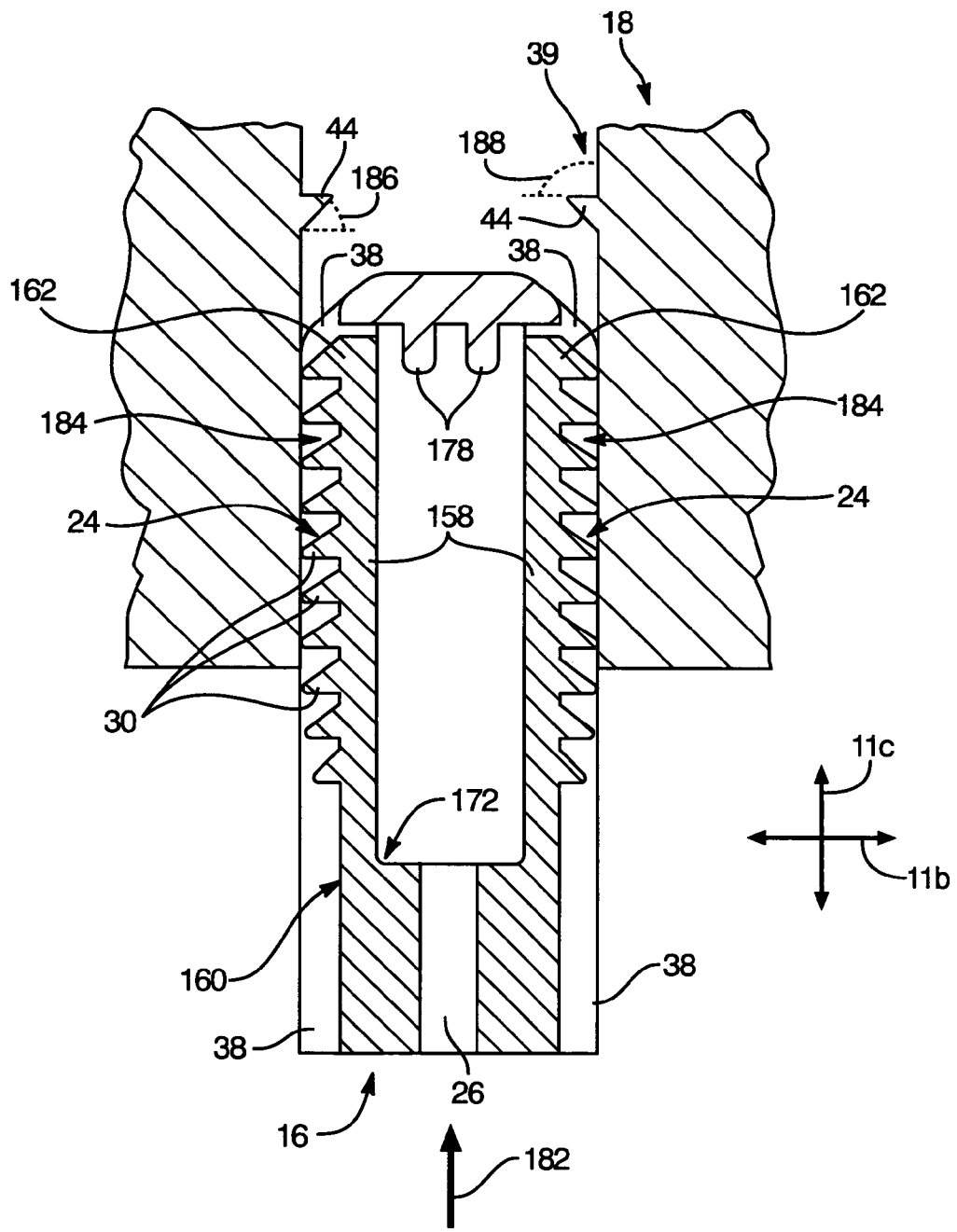
FIG. 36 is a cross-sectional view of the anchor of FIG. 32, with the cantilevers in the neutral position, being inserted into a receiver in accordance with the present invention.
Figure 37:
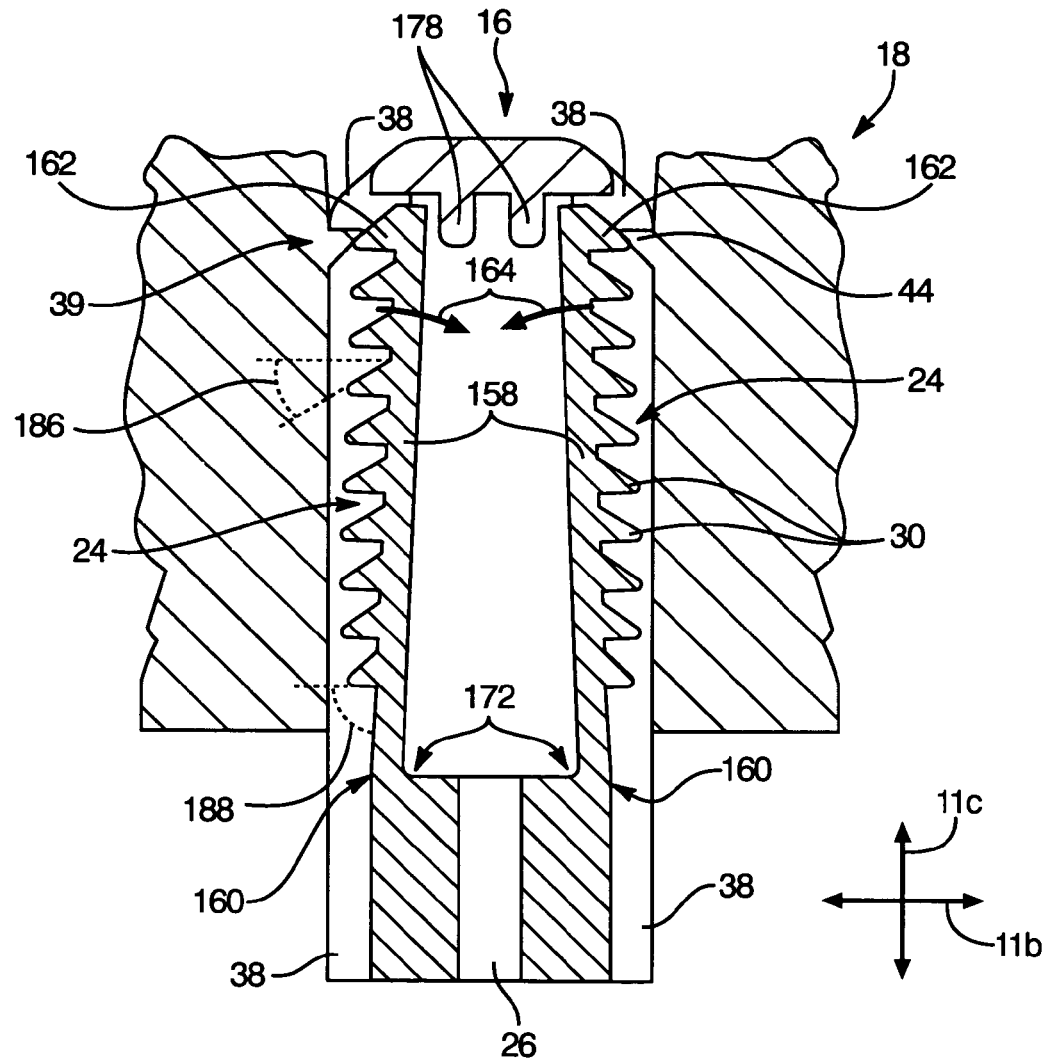
FIG. 37 is a cross-sectional view of the anchor of FIG. 32, with the cantilevers in a medium deflection position, being inserted into a receiver in accordance with the present invention.
Figure 38:
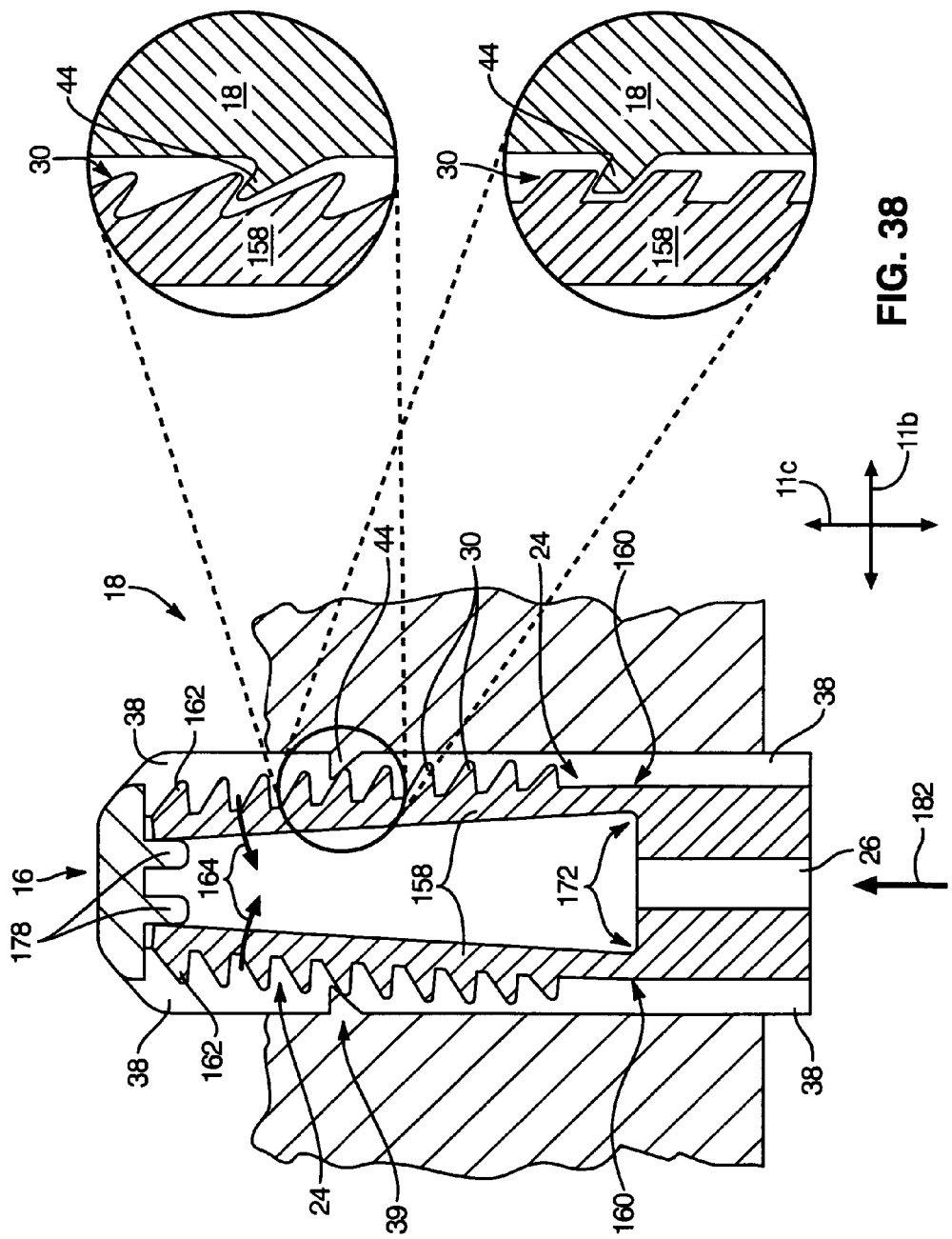
FIG. 38 is a cross-sectional view of the anchor of FIG. 32, with the cantilevers deflected to contact the deflection stops, being inserted into a receiver and illustrating various engagement configurations in accordance with the present invention.
Figure 39:
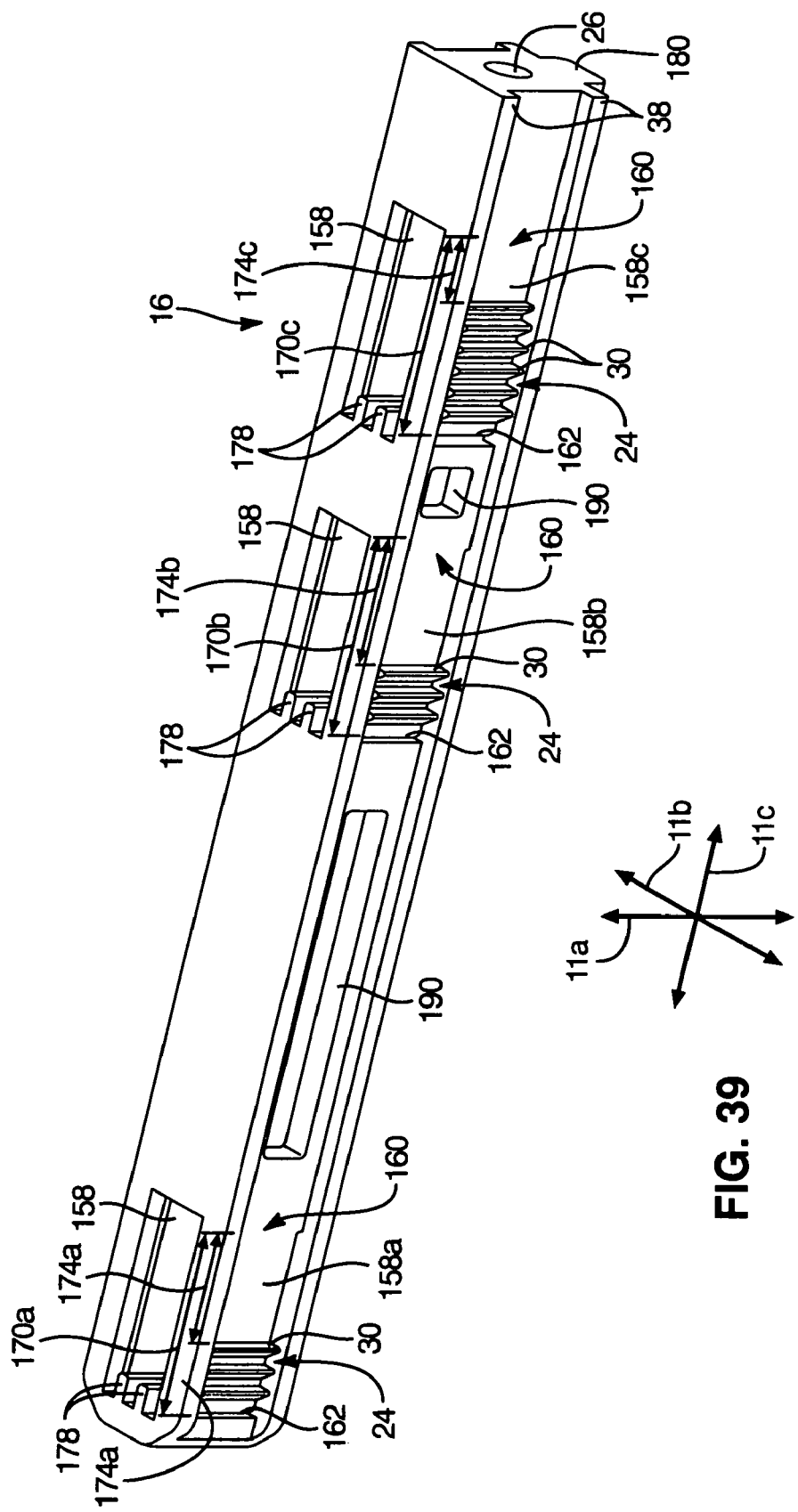
FIG. 39 is a perspective view of an alternative embodiment of an anchor having a cantilevered engagement mechanism in accordance with the present invention.

Referring to FIGS. 36–38, a dynamic anchor 16 in accordance with the present invention may be formed of any suitable material. Characteristics that may be considered when selecting a material for a dynamic anchor 16 may include, cost, resilience, toughness, strength, and the like. In certain embodiments, a dynamic anchor 16 is molded from a polymer material.

When a dynamic anchor 16 is inserted 182 into a receiver 18, the cantilevers 158 may remain in their neutral positions 184. In certain embodiments, the neutral position 184 results in the engagement mechanism 24 of the anchor 16 structurally interfering with the engagement mechanism 39 of the receiver 18. For example, the teeth 30 of the anchor 16 come in contact with the barbs 44 of the receiver 18. With continued insertion 182, the distal ends 162 of the cantilevers 158 begin to deflect inwardly in lateral arcs 164 to pass over the barbs 44.

In selected embodiments, after each tooth 30 passes over the barb 44, the resiliency of the cantilever 158 returns the engagement mechanism 24 to the neutral position. The barb 44 may then engage the most recent tooth 30 to pass over and resist motion in a direction opposite that of insertion 182. If the anchor 16 is not yet in the desired position, insertion 182, and the resulting cantilever 158 deflection, may continue until the anchor 16 reaches the desired depth of insertion.

In embodiments where the engagement mechanism 24 is teeth 30, the teeth 30 and barbs 44 may have any have any suitable shape. For example, the teeth 30 and barbs 44 may have face angles 186 selected to lower the insertion force necessary for the teeth 30 to slide over the barbs 44. Face angles 186 between zero and ninety degrees may be suitable. In selected embodiments the face angles are approximately forty-five degrees. Similarly, the teeth 30 and barbs 44 may have back angles 188 selected to encourage engagement when the anchor 16 is pulled in a direction opposite that of insertion 182. Back angles 188 between zero and ninety degrees may be suitable. In certain embodiments, the back angles 188 are approximately ninety degrees, but lower values encourage engagement.

In selected embodiments, the teeth 30 are formed with an undercut 189. A corresponding barb 44 may have a similar shape. Thus, when the anchor 16 is pulled in a direction opposite the direction of insertion 182, the teeth 30 and barb 44 provide a self-energizing engagement. That is, under a retracting force, the undercut 189 tends to draw the teeth 30 and barb 44 together into a deeper engagement. An undercut 189 design may counteract the tendency of the cantilever 158 to bend away from the barb 44 under a retracting force, and thus, provide a firmer engagement without requiring a greater insertion force.

In selected embodiments, the teeth 30 and barbs 44 may included buttressing 191 or thickening 191. Buttressing 191 may increase strength and durability of the teeth 30 and barbs 44. Buttressing 191 may thus permit an engagement between an anchor and a receiver to withstand larger retraction forces.

In certain embodiments, the spring constant of the cantilever 158 may cause a gradual increase in the insertion force necessary for the each consecutive tooth 30 to pass over a corresponding barb 44. In selected embodiments, a deflection stop 178 may be positioned to stop deflection of the distal end 162 of the cantilever 158 before all the teeth 30 have passed over their corresponding barbs 44. A deflection stop 178 so arranged may increase resistance to the insertion of the anchor 16 above that expected with the spring constant of the cantilever 158. That is, when the distal end 162 deflects to contact the deflection stop 178, the cantilever 178 behaves as the superposition of a cantilever and a simply supported beam (i.e. a beam supported on both ends thereof).

The placement of a deflection stop 178, and thus the superposition of a cantilever and a simply supported beam, may be used to increase the insertion force necessary to advance the anchor 16. A tooth 30 passing over a barb 44 in a superposition arrangement must overcome both the cantilever forces originally imposed as well as the beam bending (bowing) forces that begin when the distal end 162 of the cantilever 158 contacts the deflection stop 178. In selected embodiments, the deflection stops 178 may be positioned so that the superposition effect begins as the anchor 16 nears a point of maximum insertion into the receiver 18. In certain embodiments where superposition effect is undesirable, the deflection stops 178 may be positioned to provide adequate deflection of the cantilever 158 or the deflection stops 178 may be omitted entirely.

Referring to FIGS. 39–42, an anchor 16 in accordance with the present invention may have any suitable number of cantilevers 158. In certain applications, one cantilever 158 may be sufficient. In other applications, more engagement mechanisms 24, and thus more cantilevers 158, may be needed to meet load requirements. In selected embodiments, two cantilevers 158 are used in mirror relation to one another to provide a balanced engagement. In applications requiring a longer anchor 16, multiple mirrored cantilever 158 pairs may be incorporated. In one embodiment, three mirrored pairs of cantilevers 158 are positioned at various locations along the anchor 16.

In certain embodiments, different cantilevers 158 may perform different functions. Each cantilever 158 may be formed to best perform the function assigned. For example, longer anchors 16 support fixtures 12 while maintaining sufficient spacing between the fixture 12 and the connection box 14 to permit an installer to connect wires and the like. Long anchors 12 may be particularly helpful for installing overhead fixtures 12.

To take advantage of the length of the long anchors 16, an engagement mechanism 24 located on a first cantilever 158a may be positioned near the tip 36 of the anchor 16. Thus, with minimal insertion, the engagement mechanism 24 of the anchor 16 may engage the engagement mechanism 39 of the receiver 18. When all the appropriate wiring has been completed, the installer may desire to insert the anchor 16 into the receiver 18 further than the first cantilever 158a may support. To insert the anchor 16 deeper into the receiver 18, the engagement mechanism 24 on the first cantilever 158a must completely pass over the engagement mechanism 39 of the receiver.

To make a complete pass over the engagement mechanism 39 of the receiver 18 with minimal effort, the number of engagement locations 30 may be limited, thus limiting the number of obstacles to overcome. Additionally, the spacing 174a of the engagement locations 30 from the flex point 160 may be sufficiently large to ensure that a small deflection of the cantilever 158a provides clearance for all the engagement locations 30. A small deflection of the cantilever 158a requires a relatively small force. Thus, the force needed to advance the anchor 16 may be correspondingly small.

If desired, an intermediate engagement mechanism 24 may be positioned on a second cantilever 158b. The intermediate engagement mechanism 24 may permit an installer to position the fixture 12 a selected distance from the connection box 14. If an installer desires to insert the anchor 16 into the receiver 18 further than the second cantilever 158b may support, then the engagement mechanism 24 on the first cantilever 158b must completely pass over the engagement mechanism 39 of the receiver.

To limit the force need to advance the second cantilever 158b over the engagement mechanism 39 of the receiver 18, the number of engagement locations 30 may be limited, thus limiting the number of obstacles to overcome. Additionally, the spacing 174b of the engagement locations 30 from the flex point 160 may be sufficiently large to ensure that a small deflection of the cantilever 158b provides clearance for all the engagement locations 30. As discussed hereinabove, a small deflection of the cantilever 158b requires a comparatively small force. Thus, the force needed to advance the anchor 16 may correspond.

As a long anchor 16 nears complete insertion, a final engagement mechanism 24 may be positioned on a third cantilever 158c. The third cantilever 158c may provide more engagement locations 30, so an installer may fine tune the final securement location of the fixture 12 with respect to the connection box 14. The spacing 174c of the engagement locations 30 from the flex point 160 may be smaller than the spacings 174a, 174b on the first and second cantilevers 158a, 158b, because it may be less likely that an installer will desire to force the anchor 16 any deeper into the receiver 18. Thus, the force required to achieve such movement may be of less a concern.

An anchor 16 in accordance with the present invention may be designed to provide efficient use of materials. For example, in embodiments where an anchor 16 is molded from a polymer, various apertures 190 and cavities 190 may be formed therein to conserve the polymer. The apertures 190 and cavities 190 may be positioned to minimize their affect on the structural integrity of the anchor 16.

Figure 43:
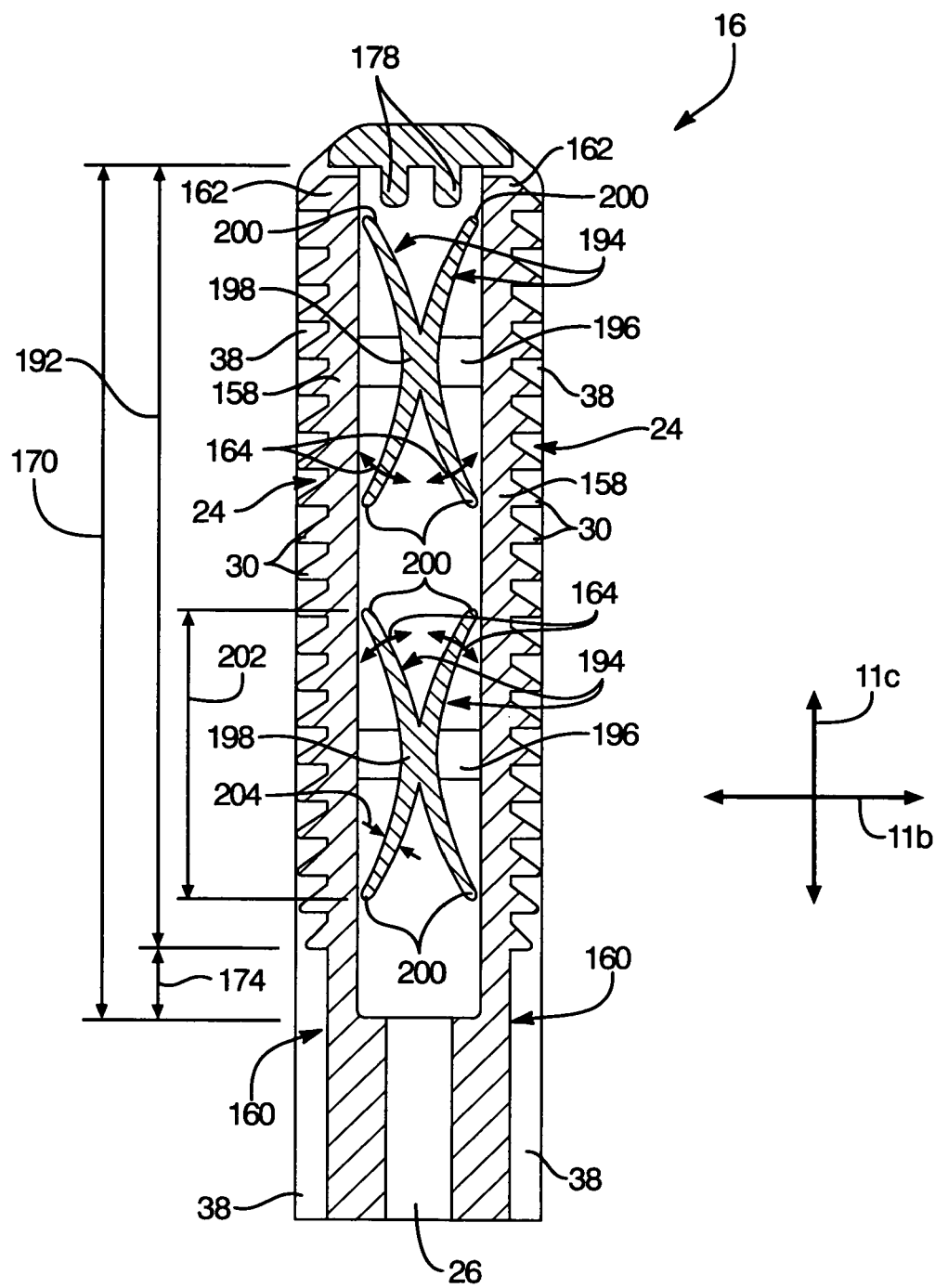
FIG. 43 is a cross-sectional view of an alternative embodiment of an anchor having cantilevered engagement mechanisms and biasing members in accordance with the present invention.
Figure 44:
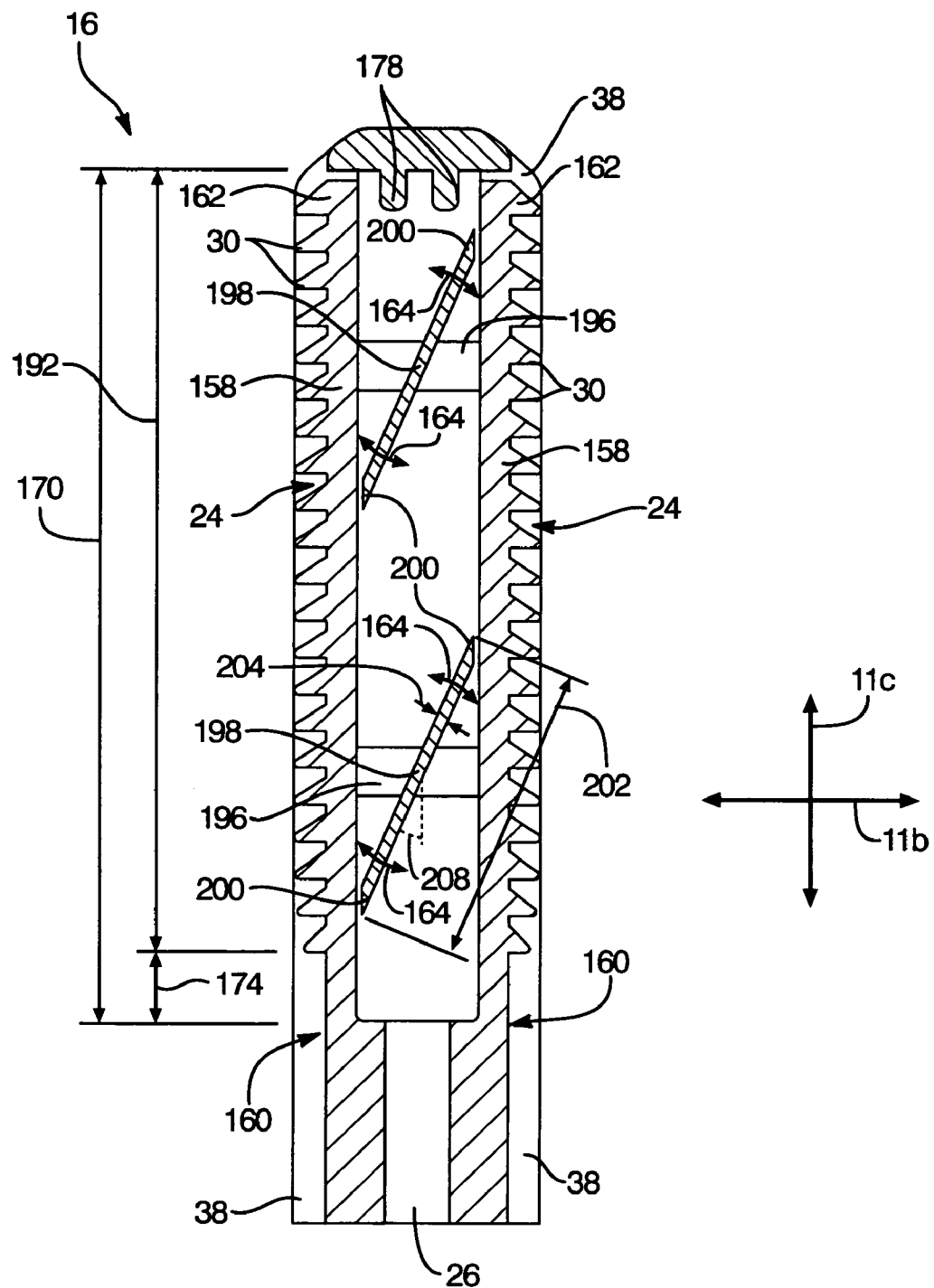
FIG. 44 is a cross-sectional view of an another alternative embodiment of an anchor having cantilevered engagement mechanisms and biasing members in accordance with the present invention.

Referring to FIGS. 43 and 44, in certain applications it may be desirable to have a relatively long anchor 16 having a continuous array of engagement locations 30 spanning a selected length 192. A relatively long cantilever 158 may be used to support the continuous array of engagement locations 30. The length 170 of such a cantilever 158 may result in a relatively small spring constant for loads applied at any significant distance from the flex point 160. Thus, it may be helpful to supplement the resiliency of the cantilever 158 with an additional biasing member 194.

A biasing member 194 in accordance with the present invention may be any mechanism for supplementing the resiliency of the cantilever 158. Suitable biasing members 194 may include coil springs of any material, leaf springs of any material, elastomers, and the like. In certain embodiments, the biasing member 194 may be a leaf spring 194 integrally molded with the rest of the anchor 16.

If more than one cantilever 158 is employed in an anchor 16, a biasing member 194 may support one or more of the cantilevers 158. Additionally, more than one biasing member 194 may support a single cantilever 158. In one embodiment, mirrored cantilevers 158 may be supported by mirrored, integrally molded leaf springs 194. In such an embodiment, a bridge 196 may secure the base 198 or a center point 198 of the leaf springs 194. For example, the bridge 196 may extend in the lateral direction 11b from one sliding surface 38 to another. The bridge 196 may hold the base 198 relatively stationary while flexing ends 200 of the leaf springs 194 extend from the base 198 towards the cantilevers 158. In selected embodiments, mirrored leaf springs 194 may share a common base 198.

The length 202 and width 204 of the leaf springs 194 may be selected to provide a desired spring constant. Shorter and wider leaf springs 194 may be stiffer and provide a higher spring constant. Longer and thinner leaf springs 194 may be more flexible and provide a smaller spring constant. If desired, the width 204 of the leaf springs 194 may vary with their length 202. In certain embodiments, the leaf springs 194 may form an arc. In other embodiments, the leaf springs may be straight to form a "V" pattern. In other embodiments, the biasing member 194 may be two cantilevered beams 194 extending at an angle 206 from the bridge 196 towards the cantilevers 158. The two cantilevered beams 194 may extend along a common line and share a base 198 or flex point 198. The cantilevered beams 194 may have a length 202 and a width 204 selected to provide a desired spring constant.

In certain embodiments, as the cantilevers 158 deflect inward, the cantilevers 158 contact the biasing members 194. The biasing members 194 may provide resistance to the continued inward deflection of the cantilevers 158. The amount of deflection of a cantilever 158 before contacting a biasing member 194 may be selected to provide a desired deflection resistance. Thus, by selecting the length 202, width 204, angle 206, number, location, spacing, and the like of the biasing members 194, the deflection of the cantilevers 158 may be controlled to provide a desired insertion force, retraction resistance, and the like between an anchor 16 and a receiver 18 in accordance with the present invention.

Figure 45:
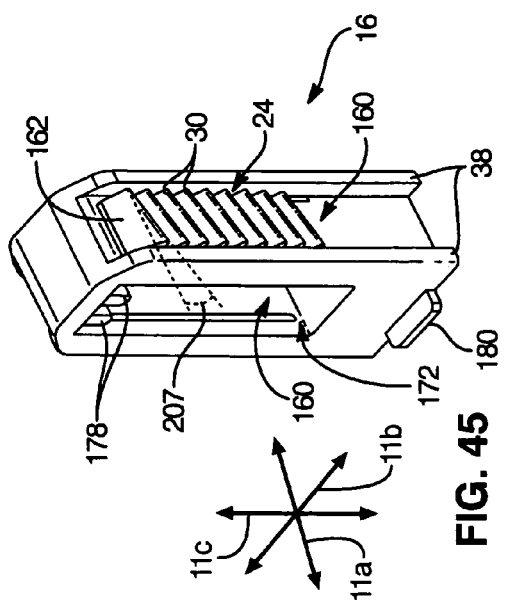
FIG. 45 is a perspective view of an embodiment of an anchor having cantilevered engagement mechanisms with the teeth posited at an angle in accordance with the present invention.

Referring to FIG. 45, as mentioned hereinabove, the present invention may be embodied in various forms. In selected embodiments, modifications to the previously described embodiments may be helpful. For example, in certain embodiments, it may be desirable to have non-perpendicular engagement locations 30. That is, the engagement locations 30 may be positioned at an angle 207. The shape and position of the engagement mechanism 44 of the receive may be designed accordingly. In certain embodiments, engagement locations 30 at an angle 207 may reduce the requisite insertion force.

Figure 46:
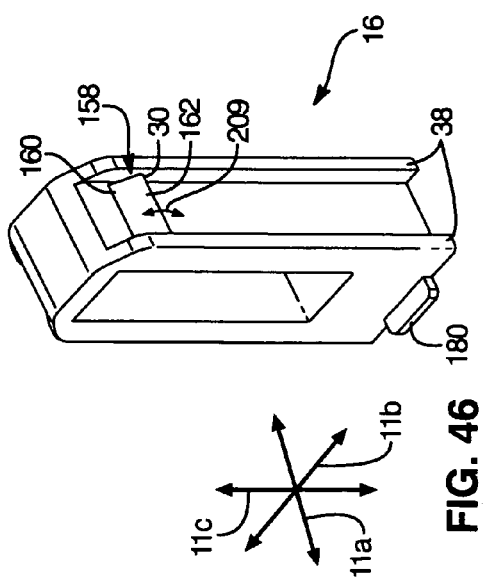
FIG. 46 is a perspective view of an embodiment of an anchor having an alternative embodiment of a cantilevered engagement mechanism in accordance with the present invention.

Referring to FIG. 46, in certain embodiments, cantilevers 158 may be formed to extend in the lateral direction 11b from an anchor 16. Cantilevers 158 extending laterally may flex in transverse arcs 209 to pass over the engagement mechanism 44 of the receiver 18. If desired, a laterally extending cantilever 158 in accordance with the present invention may extend in the transverse direction 11c as well. The transverse component of extension may allow the engagement location 30 to be inserted past a barb 44 of the receiver 18, yet firmly engage the barb 44 when a retraction force is applied.

In selected embodiments, laterally extending cantilevers 158 may be integrally formed with the anchor 16. For example, a laterally extending cantilever 158 may be molded as a continuous part of the anchor 16. In another embodiment, the laterally extending cantilever 158 may be formed as a material dissimilar from that of the rest of the anchor 16. For example, a laterally extending cantilever 158 may be a resilient metal extension 158. A resilient metal extension 158 may be incorporated into the anchor 16 in an insert molding process. In another embodiment, a resilient metal extension 158 may be formed to bine or otherwise secure to the anchor 16 after the anchor has been formed.

Figure 47:
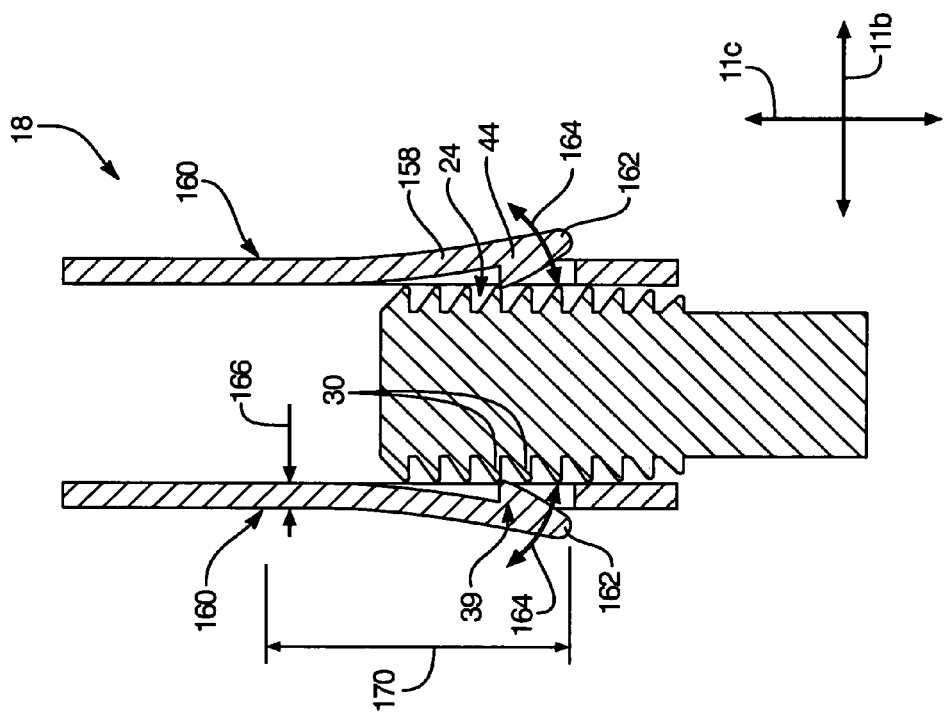
FIG. 47 is a cross-sectional view of an anchor inserted into an embodiment of a receiver having a cantilevered engagement mechanism in accordance with the present invention.

Referring to FIG. 47, in selected embodiments, a receiver 18 in accordance with the present invention may be dynamic when interacting with an anchor 16. For example, the engagement mechanism 39 of the receiver 18 may be formed as a cantilever 158. The cantilever 158 may secure to the rest of the receiver 18 at a flex point 160. A distal end 162 of the cantilever 158 may extend in the transverse direction 11c away from the flex point 160. Thus, the distal end 162 of the cantilever 158 may resiliently flex in a lateral arc 164 providing deflection of the engagement mechanism 39 in substantially the lateral direction 11b.

The cantilever 158 may have a thickness 166 and a length 170 selected to provide an effective spring constant for deflection of the distal end 162 of the cantilever 158. Generally, the thicker and shorter the cantilever 158, the greater the spring constant. If desired, the thickness of the cantilever 158 may vary along the length 170.

When an anchor 16 is inserted 182 into a dynamic receiver 18, the cantilevers 158 may remain in their neutral positions. In certain embodiments, the neutral position results in the engagement mechanism 24 of the anchor 16 structurally interfering with the engagement mechanism 39 of the receiver 18. For example, the teeth 30 of the anchor 16 come in contact with the barbs 44 of the receiver 18. With continued insertion 182, the distal ends 162 of the cantilevers 158 begin to deflect outward in lateral arcs 164 to pass over the teeth 30.

In selected embodiments, after the barb 44 passes over each tooth 30, the resiliency of the cantilever 158 returns the engagement mechanism 39 to the neutral position. The barb 44 may then engage the most recent tooth 30 to pass under and resist motion in a direction opposite that of insertion 182. If the anchor 16 is not yet in the desired position, the insertion 182, and the resulting cantilever 158 deflection, may continue until the anchor 16 reaches the desired depth of insertion.

A dynamic receiver 18 in accordance with the present invention may provide a substantially uniform insertion force with out regard to the length of the anchor 16. Additionally, a dynamic receiver 18 permits an anchor 16 to have a large array of engagement locations 30 along the length of the anchor 16 from which an installer may select when positioning a fixture 12 with respect to a connection box 14.

Figure 48:
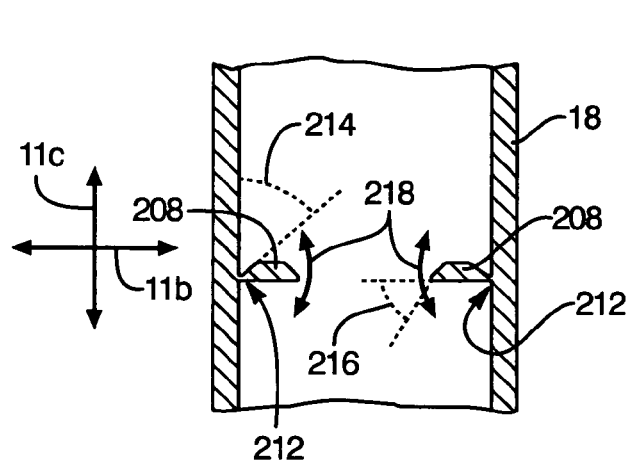
FIG. 48 is a partial cross-sectional view of an alternative embodiment of a receiver having cantilevered engagement mechanisms in the neutral position in accordance with the present invention.
Figure 49:
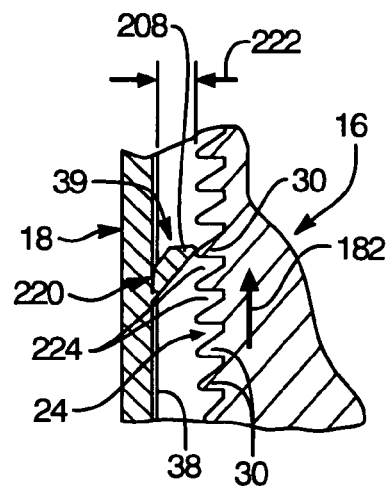
FIG. 49 is a partial cross-sectional view of an anchor inserted into the receiver of FIG. 48 with the cantilevered engagement mechanisms near the maximum deflection position in accordance with the present invention.
Figure 50:
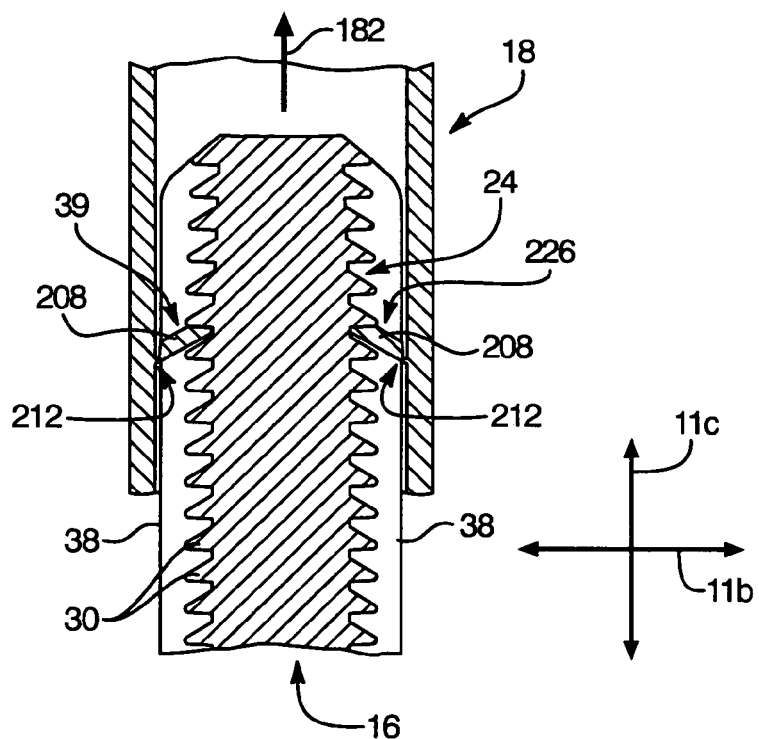
FIG. 50 is a partial cross-sectional view of an anchor inserted into the receiver of FIG. 48 with the cantilevered engagement mechanisms near the engagement position in accordance with the present invention.

Referring to FIGS. 48–50, in certain applications, it may be advantageous to have a dynamic receiver 18 that may be easily formed. For example, it may be advantageous to have a dynamic receiver 18 and a connection box 14 that made be formed as a single unit of a polymer in a two-piece mold.

In certain embodiments, a dynamic receiver 18 is formed by a two-piece mold to form one or more extensions 208. An extension 208 may be formed in a neutral position 210 at the location were the two mold halves meet. The extension 208 may be formed with a narrow neck 212 connecting the extension 208 to the rest of the receiver 18. The extension 208 may taper to the narrow neck 212 to form a vertex or folding angle 214. In certain embodiments, an extension 208 may be formed with an engagement angle 216. The engagement angle 216 may be selected to provide a firm engagement with the engagement locations 30 of a corresponding anchor 16.

Upon insertion 182 of an anchor 16 into the receiver 18, the extension 208 may contact the engagement locations 30 or teeth 30 and flex in a transverse arc 218 at the narrow neck 212. The magnitude of the folding angle 214 may determining how far the extension 208 may deflecting in a maximum flex position 220. In certain embodiments, the engagement locations 30 or teeth 30 may be recessed from the sliding surfaces 38 a selected recess distance 222. The recess distance 222 and the folding angle 214 may be selected to provide the extension 208 with enough deflection and clearance to pass over the teeth 30 during insertion of an anchor 16. That is, the recess distance 222 may provide enough clearance for the extension 208 in the maximum flex position 220 to pass over the teeth 30.

In selected embodiments, the recess distance 222 may be selected to slightly interfere with an extension 208 in a maximum flex position 220. Thus, as each tooth 30 passes the extension 208, there is a resiliency urging the extension 208 into the recesses 224 between the teeth 30 toward an engagement position 226. In an engagement position 226, when the anchor 16 is pulled in a direction opposite that of insertion 182, the extension 208 engages the last tooth 30 to pass by. The extension 208 act as a two force member resisting further retraction of the anchor 16.

Figure 51:
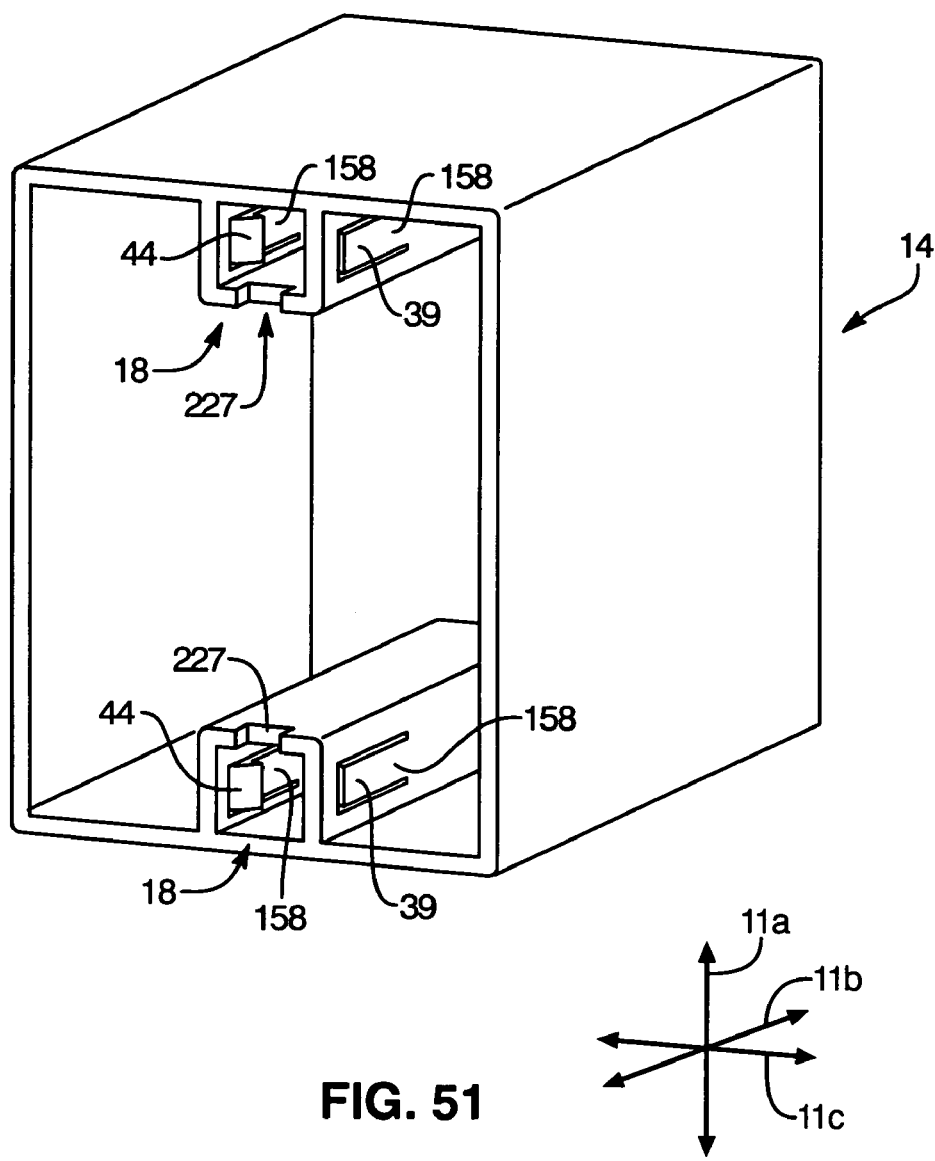
FIG. 51 is a perspective view of a connection box having receivers with the cantilevered engagement mechanisms of FIG. 47.

Referring to FIG. 51, a dynamic receiver 18 in accordance with the present invention may be formed in a connection box 14 of any suitable material. Characteristics that may be considered when selecting a material for a connection box 14 having a dynamic receiver 18 may include cost, electrical properties, heat resistance, fire resistence, resilience, toughness, strength, and the like. In certain embodiments, a dynamic receiver 18 is molded from a polymer material as an integral part of the connection box 14.

In certain embodiments, a notch 227 may be formed in the receiver 18. The notch 227 may provide a recess to receive an insertion stop 180 on the anchor 16. Thus, permitting the anchor 16 to be inserted until flush with the face of the receiver 18.

Figure 52:
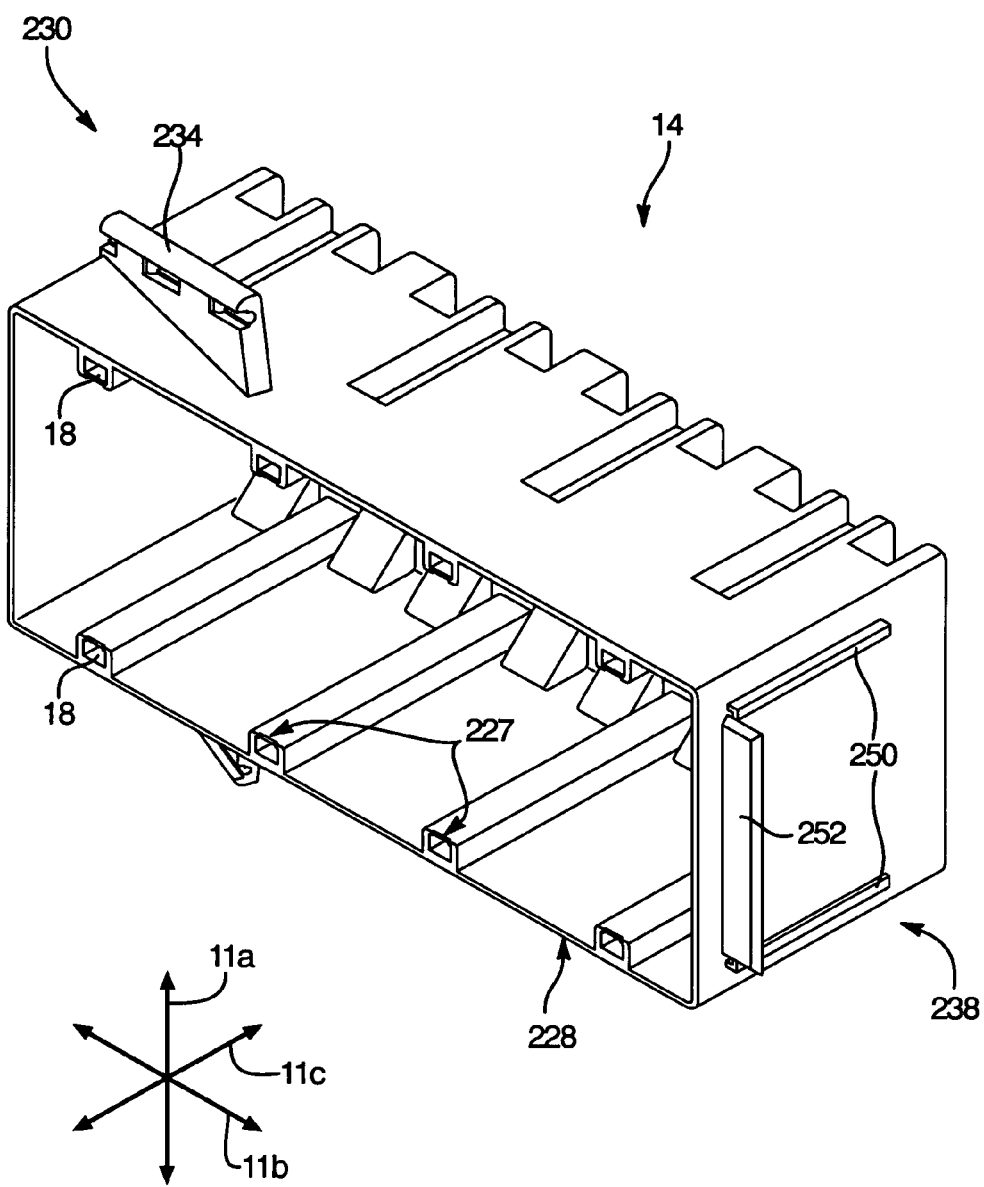
FIG. 52 is a perspective view of a multi-gang connection box having a slide in accordance with the present invention.
Figure 53:
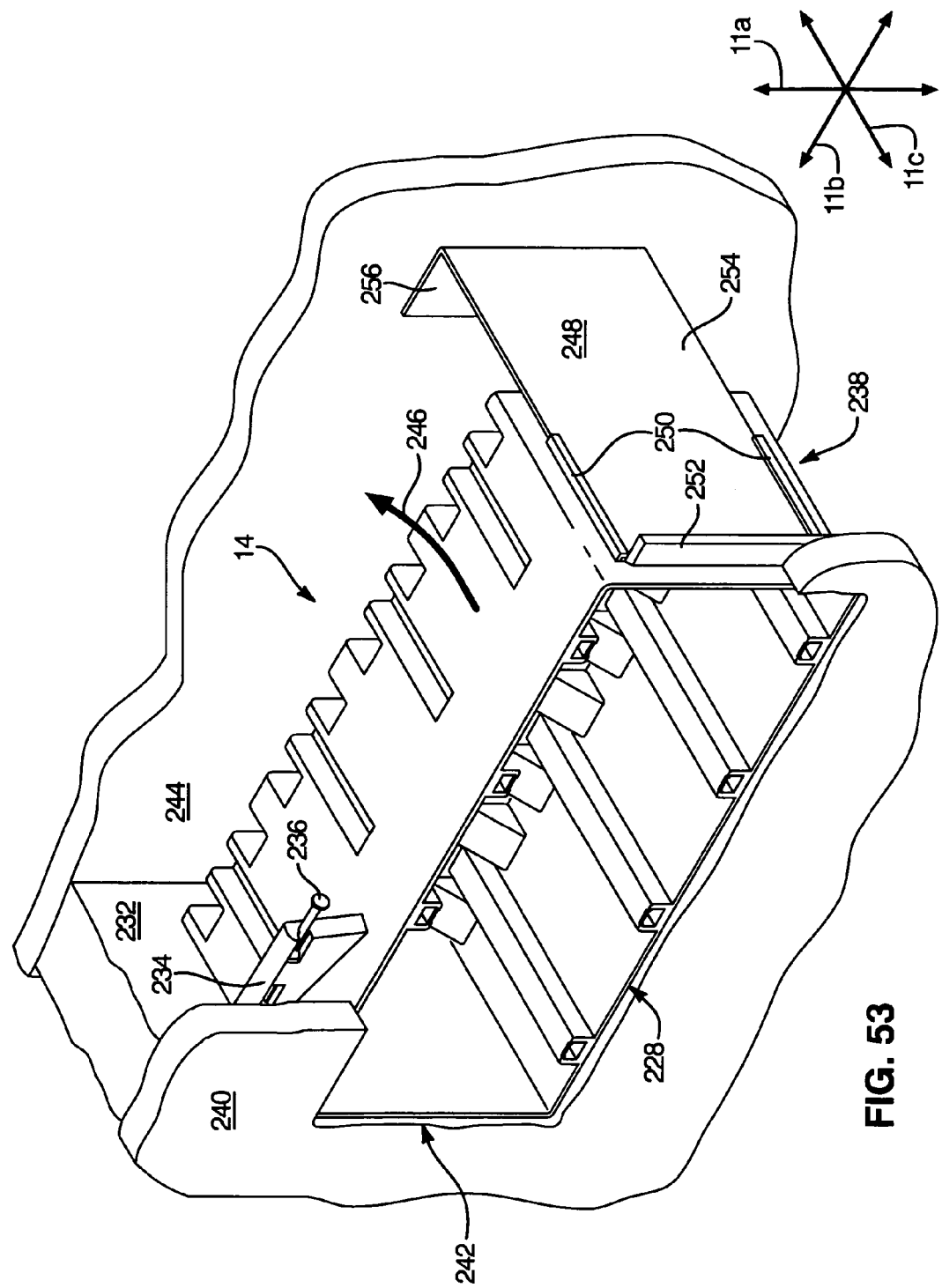
FIG. 53 is a partial perspective view of the connection box of FIG. 50 secured to a structural member located between front and back panels and supporting a spacer in accordance with the present invention.
Figure 54:
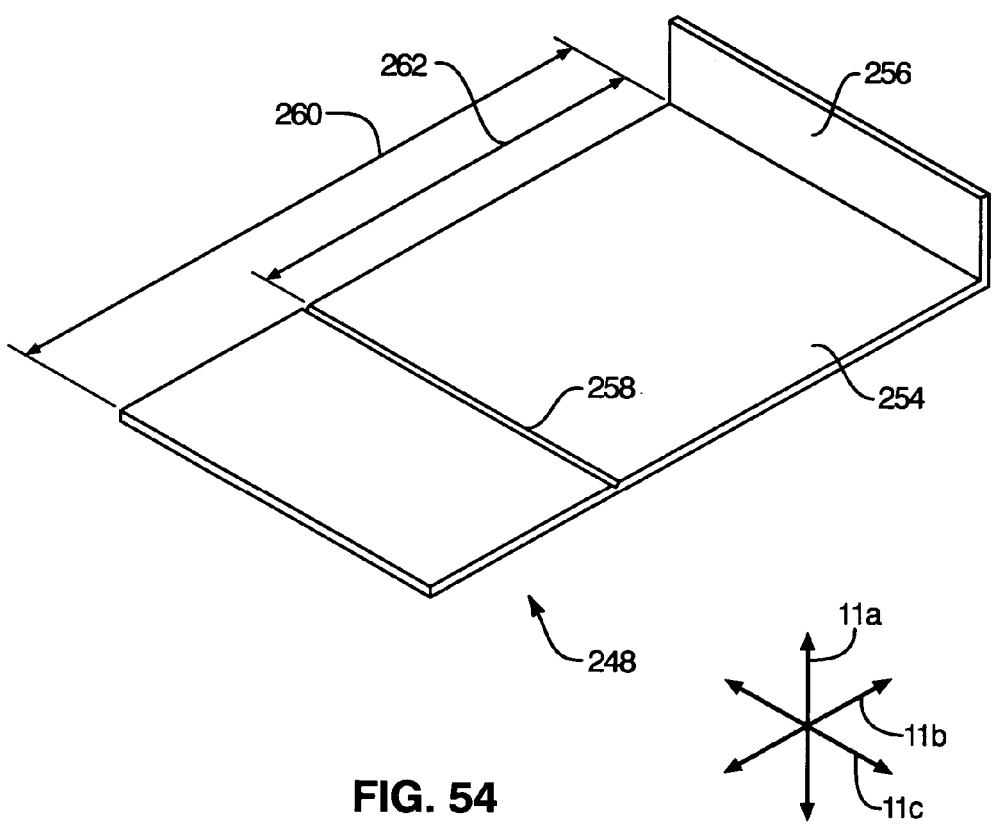
FIG. 54 is a perspective view of a spacer having a scored or weakened line and foot in accordance with the present invention.

Referring to FIGS. 52–54, in certain applications, a connection box 14 may have an open face 228. A proximal end 230 of a connection box 14 may be formed to engage a structural member 232 (e.g. wall stud, floor joist). For example, the proximal end 230 may have an extension 234 to support a fastener 236. The fastener 236 (e.g. nail, screw) may in turn engage the structural member 232 and thus secure the connection box 14. The connection box 14 may have a distal end 238 extending in the lateral direction 11*b* away from the proximal end 230 and the structural member 232.

In selected applications, a front panel 240 may secure to the structural member 232. In one embodiment, the face panel 240 may have an aperture 242 formed therein to expose the open face 228 of the connection box 14. A back panel 244 may secure to the structural member 232 opposite the face panel 240. The face and back panels 240, 244 may vary in form from application to application. For example, in selected applications the face and back panels 240, 244 may be drywall, wood paneling, concrete, some combination of drywall, wood, and concrete, and the like.

Typically, when a fixture 12 is installed, the face panel 240 is already in place and all that is visible of the connection box 14 is the open face 228. An attempt to insert an anchor 16 into a connection box 14 so arranged may cause the box 14 to deflect inwardly 246. The face panel 240 may prevent a user from gaining access to the connection box 14 and stopping the inward deflection 246. Inward deflection 246 is usually permitted by less than perfect engagement between the connection box 14 and the structural member 232. The inward deflection 246 is most noticeable on long multi-gang connection boxes 14. In certain situations, the inward deflection 246 may preclude an installer from properly installing a fixture 12.

In certain embodiments, a connection box 14 in accordance with the present invention may be formed with a standoff, foot, or spacer 248 to resist inward deflection 246. The spacer 248 may extend from the connection box 14 to contact the back panel 244, thus resisting inward deflection 246 in that direction. In selected embodiment, the connection box 14 and spacer 248 may be formed as separate pieces. For example, a connection box 14 may have a slide 250 secured to, or integrally formed with, the distal end 238 of the connection box 14. The slide 250 may receive the spacer 248 and maintain the spacer 250 directed towards the back panel 244. The slide 250 may permit an installer of the connection box 14 to install the spacer 248 on site. Thus, the spacer 248 may only be applied to connection boxes 14 that may need it.

If desired, a face panel alignment stop 252 may act as a register for the spacer 248 with respect to the slide 250. That is, alignment stops 252 are often included on connection boxes 14 to register the open face 228 of the connection box 14 with respect to the face panel 240. It may be a simple matter to position the slide 250 so that the alignment stop 252 will register the spacer 248 and thus maintain the connection box 14 fixed in the transverse direction 11c away from the back panel 244. Additionally, the slide 250 may be formed to resist the removal of the spacer 248. In one embodiment, the slide 250 has sufficient frictional engagement with the spacer 248 to prevent inadvertent removal.

A spacer 248 in accordance with the present invention may be formed of any suitable material. Additionally, a spacer 248 may have any suitable configuration. For example, in one embodiment, the spacer 248 may have an extension 254 and a foot 256. The extension 254 may provide the spacing while the foot 256 may resist penetration of the spacer 248 into the back panel 244.

Spacers 248 in accordance with the present invention may have extensions 254 of various lengths. In one embodiment, an extension 254 may have scores 258 or weakened lines 258 at various lengths associated with distances commonly found between the face and back panels 240, 244. For example, the distances between the face and back panels 240, 244 are often characteristic of the dimensions of the structural member 232. Thus, an extension 254 may have a first length 260 for fitting a 2×6 stud 232 and a score 258 at a second length 262 for fitting a 2×4 stud 232. The extension 254 may be used as is for a 2×6 wall and may be broken on the score 258 for use with a 2×4 wall.

From the above discussion, it will be appreciated that the present invention provides an apparatus and method for fast and simple connection box assembly without screw rotation and the time or tools associated therewith. An embodiment in accordance with the present invention may provide an apparatus for securing a fixture to a connection box.

In a factory manufacturing process an anchor may be secured to a fixture. The anchor may have an engagement mechanism formed therewith. A connection box may be provided to house wires proceeding from a source to terminate therein. A receiver may be associated with the connection box. The receiver may have an engagement mechanism formed to receive and retain the engagement mechanism of the anchor. Thus, the anchor and receiver may be intermediaries in the securement of the fixture to the connection box.

Face plates in accordance with the present invention may have engagement prongs. These prongs may be inserted through apertures in a corresponding fixture to maintain the face plate aligned securely thereagainst. A face plate may be installed by simply pressing the engagement prongs through the appropriate apertures in the fixture. Alternatively, a fixture may be fitted with clips having retainers for engaging corresponding barbs formed in the face plates. In such an embodiment, a face plate may be installed by pressing a fixture thereagainst until the retainers engage the barbs.

Once a fixture has been wired, whether or not a face plate has been applied thereto, the resulting assembly may be secured to the connection box by inserting one or more of the attached anchors into corresponding receivers associated with the connection box. The anchor may be inserted a depth into the receiver selected to properly position the electrical device, face plate, or both. Insertion of an anchor into a receiver may be accomplished without the aid of tools.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An assembly defining longitudinal, lateral, and transverse directions substantially orthogonal to one another, the assembly comprising;
   a connection box having a proximal end shaped to receive a fastener to support the connection box and a distal end, spaced in the lateral direction from the proximal end and having a stop and a slide;
   a spacer shaped to insert exclusively by linear translation, without tools, within the slide to the stop;
   the spacer extending from the distal end to support the connection box in the transverse direction when inserted into the slide against the stop; and
   the spacer having at least one fracture region providing controlled fracture, in response to bending stress, to adjust the length thereof.

2. The assembly of claim 1, wherein the stop extends in the lateral direction from an exterior surface of the distal end of the connection box to register the connection box with respect to a wall panel.

3. The assembly of claim 2, wherein the slide is positioned on the exterior surface of the distal end of the connection box.

4. The assembly of claim 1, wherein the connection box is further provided with an aperture to receive transmission lines from a signal source and terminating therewithin.

5. The assembly of claim 4, wherein the connection box is a multi-gang connection box.

6. The assembly of claim 5, wherein the connection box is homogeneously molded of a material selected from the group consisting of a polymer and a reinforced polymer.

7. The assembly of claim 6, wherein the at least one fracture region comprises a source of a stress concentration riser.

8. The assembly of claim 7, wherein the source of stress concentration riser comprises a scored line extending across the spacer.

9. The assembly of claim 8, wherein the spacer is homogeneously molded of a material selected from the group consisting of a polymer and a reinforced polymer.

10. The assembly of claim 9, wherein the slide has a frictional engagement with the spacer providing a resistance value selected to resist inadvertent removal of the spacer from the slide.

11. The assembly of claim 10, wherein the spacer comprises an extension portion projecting in the transverse direction flow proximate the connection box to a foot portion extending in at least one of the lateral direction and longitudinal direction to resist penetration of the spacer into a solid material positioned thereagainst.

12. The assembly of claim 11, wherein the scored line is positioned on the spacer to promote fracture at a location selected to space the foot from the stop a distance corresponding to the width of a building stud of a first standard size.

13. The assembly of claim 12, wherein the extension has an unbroken length selected to space the tot from the stop a distance corresponding to the width of a building stud of a second standard size.

14. The assembly of claim 13, further comprising a fixture for delivery of a signal to a consuming device.

15. The assembly of claim 14, further comprising an anchor, removably secured to the fixture and having a first engagement mechanism.

16. The assembly of claim 15, wherein the connection box further comprises a receiver to receive the anchor and having a second engagement mechanism to engage the first engagement mechanism without tools.

17. The assembly of claim 16, wherein the connection box is generally rectangular in shape, having an open face on one side thereof.

18. The assembly of claim 17, wherein the stop registers the open face of the connection box.

19. The assembly of claim 13, wherein the building stud of a first standard size comprises a two-by-four and the building stud of a second standard size comprises a two-by-six.

20. The assembly of claim 1, wherein the connection box is further provided with an aperture to receive transmission lines from a signal source and terminating therewithin.

21. The assembly of claim 1, wherein the connection box is a multi-gang connection box.

22. The assembly of claim 1, wherein the connection box is homogeneously molded of a material selected from the group consisting of a polymer and a reinforced polymer.

23. The assembly of claim 1, wherein the at least one fracture region comprises a source of a stress concentration riser.

24. The assembly of claim 23, wherein the source of stress concentration riser comprises a scored line extending across the spacer.

25. The assembly of claim 1, wherein the spacer is homogeneously molded of a material selected from the group consisting of a polymer and a reinforced polymer.

26. The assembly of claim 1, wherein the slide has a frictional engagement with the spacer providing a resistance value selected to resist inadvertent removal of the spacer from the slide.

27. The assembly of claim 1, wherein the spacer comprises an extension portion projecting in the transverse direction from proximate the connection box to a foot portion extending in at least one of the lateral direction and longitudinal direction to resist penetration of the spacer into a solid material positioned thereagainst.

28. The assembly of claim 27, wherein teat least one fracture region comprises a scored line positioned on the spacer to promote fracture at a location selected to space the foot portion from the stop a distance corresponding to the width of a building stud of a first standard size.

29. The assembly of claim 28, wherein the extension portion has an unbroken length selected to space the foot portion from the stop a distance corresponding to the width of a building stud of a second standard size.

30. The assembly of claim 1, further comprising a fixture for delivery of a signal to a consuming device.

31. The assembly of claim 30, further comprising an anchor, removably secured to the fixture and having a first engagement mechanism.

32. The assembly of claim 31, wherein the connection box further comprises a receiver to receive the anchor and having a second engagement mechanism to engage the first engagement mechanism without tools.

33. The assembly of claim 32, wherein the connection box is generally rectangular in shape, having an open face on one side thereof.

34. The assembly of claim 33, wherein the stop registers the open face of the connection box.

35. A connection box assembly defining longitudinal, lateral, and transverse directions substantially orthogonal to one another, the assembly comprising:
　a connection box having an aperture shaped to receive transmission lines to terminate therewithin, having a proximal end provided with an aperture to receive a fastener to support the connection box, and having a distal end, spaced in the lateral direction from the proximal end and formed to have a stop and a slide;
　a spacer matingly insertable into the slide, without the use of tools, to engage the stop and sized to frictionally engage the slide to resist removal therefrom;
　the spacer having at least one fracture region extending longitudinally thereacross to provide directed stress concentration fracture in response to bending, to adjust the length thereof; and
　the spacer extending from the distal end of the connection box in the transverse direction when inserted into the slide and abutted against the stop.

36. A method for applying a connection box to a structural member defining longitudinal, lateral, and transverse directions substantially orthogonal to one another, the method comprising:
　providing a connection box having a proximal end and a distal end spayed from one another, the distal end having a stop and a slide;
　selecting a structural member extending in the longitudinal direction and having a width in the transverse direction;
　providing a spacer shaped to be received by the slide and characterized by a length;
　fracturing the spacer to adjust the length thereof to correspond to the width of the structural member;
　securing the spacer to the connection box without the use of tools by inserting the spacer within the slide unit the spacer contacts the stop; and
　securing the proximal end of the connection box to the structural member.

* * * * *